United States Patent
Glade et al.

(10) Patent No.: US 7,992,038 B1
(45) Date of Patent: Aug. 2, 2011

(54) FAILURE PROTECTION IN AN ENVIRONMENT INCLUDING VIRTUALIZATION OF NETWORKED STORAGE RESOURCES

(75) Inventors: Bradford B. Glade, Harvard, MA (US); David W. Harvey, Newton, MA (US); John Kemeny, Westford, MA (US); Lee W. VanTine, Oxford, MA (US); Matthew D. Waxman, Waltham, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 12/828,609

(22) Filed: Jul. 1, 2010

Related U.S. Application Data

(63) Continuation of application No. 11/540,336, filed on Sep. 29, 2006, now Pat. No. 7,770,059, and a continuation-in-part of application No. 11/479,649, filed on Jun. 30, 2006, now Pat. No. 7,620,775, and a continuation-in-part of application No. 10/810,988, filed on Mar. 26, 2004, now Pat. No. 7,206,863.

(51) Int. Cl.
  *G06F 11/00* (2006.01)
(52) U.S. Cl. ............. 714/11; 714/4.11; 714/6.3; 714/13
(58) Field of Classification Search ............... 714/47, 714/7, 6.3, 4.11, 11, 13
  See application file for complete search history.

(56) References Cited

U.S. PATENT DOCUMENTS

| | | | |
|---|---|---|---|
| 6,959,373 | B2 | 10/2005 | Testardi |
| 6,973,549 | B1 | 12/2005 | Testardi |
| 6,985,956 | B2 | 1/2006 | Luke et al. |
| 6,986,015 | B2 | 1/2006 | Testardi |
| 7,013,379 | B1 | 3/2006 | Testardi |
| 7,379,990 | B2 | 5/2008 | Tsao |
| 7,409,495 | B1 | 8/2008 | Kekre et al. |
| 7,818,515 | B1 | 10/2010 | Umbehocker et al. |
| 2002/0156613 | A1 * | 10/2002 | Geng et al. ................ 703/23 |
| 2002/0188711 | A1 * | 12/2002 | Meyer et al. .............. 709/223 |
| 2003/0126132 | A1 | 7/2003 | Kavuri et al. |
| 2003/0130832 | A1 * | 7/2003 | Schulter et al. ............ 703/23 |
| 2003/0202510 | A1 * | 10/2003 | Witkowski et al. ........ 370/386 |
| 2003/0217129 | A1 | 11/2003 | Knittel et al. |
| 2004/0133634 | A1 | 7/2004 | Luke et al. |
| 2005/0025075 | A1 | 2/2005 | Dutt et al. |
| 2005/0138184 | A1 | 6/2005 | Amir |
| 2006/0224844 | A1 | 10/2006 | Kano et al. |
| 2006/0242378 | A1 | 10/2006 | Kano |
| 2010/0274963 | A1 | 10/2010 | Innan et al. |

OTHER PUBLICATIONS

Using VSANs and Zoning in the Cisco MDS 9000 family of Multilayer Fibre Channel Switches, Feb. 2008, Cisco Systems, pp. 1-11.*

* cited by examiner

*Primary Examiner* — Scott T Baderman
*Assistant Examiner* — Chae Ko
(74) *Attorney, Agent, or Firm* — Krishnendu Gupta; Joseph D'Angelo

(57) ABSTRACT

An architecture for protecting against failure in a switched storage network using virtualization.

20 Claims, 41 Drawing Sheets

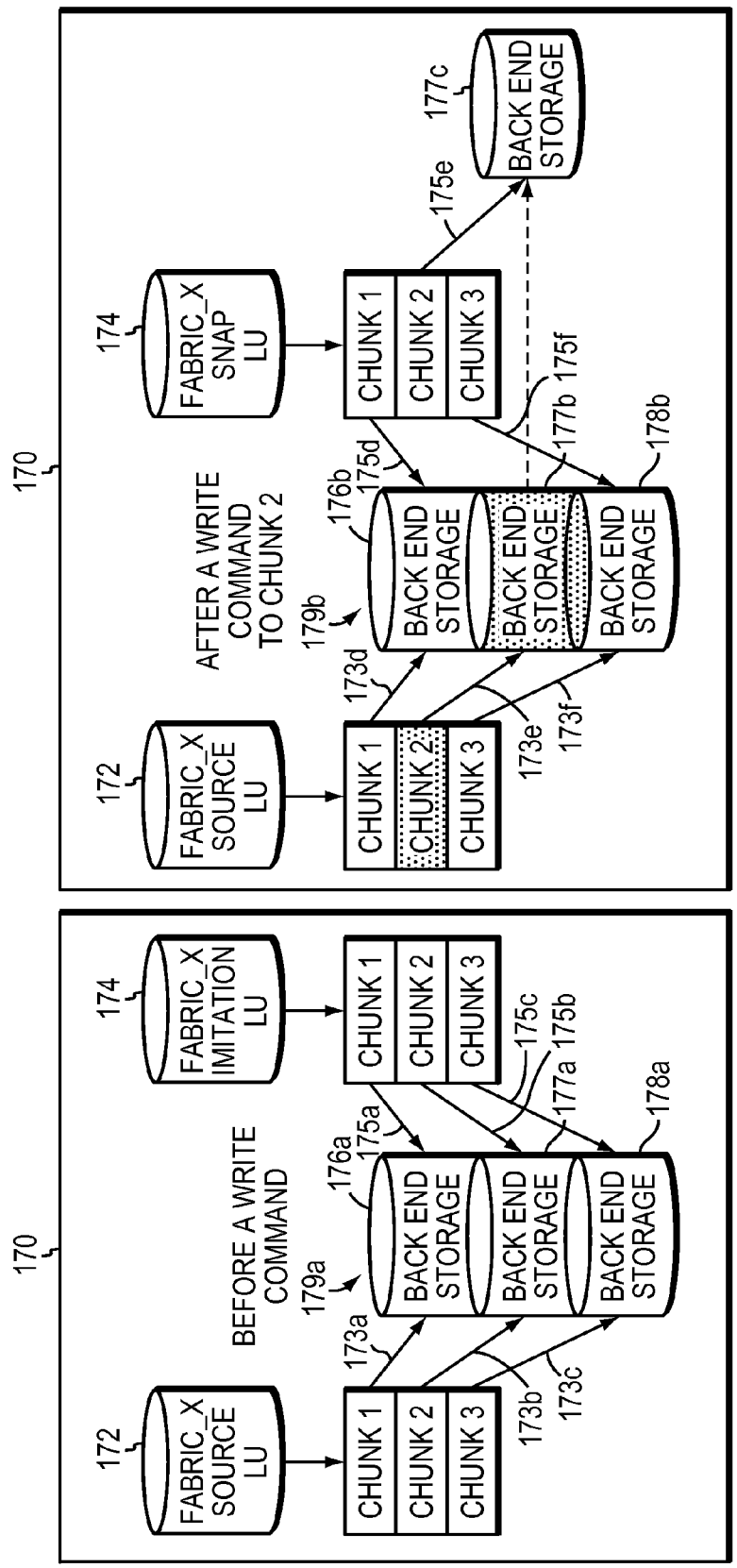

FAILURE PROTECTION IN AN ENVIRONMENT INCLUDING VIRTUALIZATION OF NETWORKED STORAGE RESOURCES

RELATED APPLICATIONS

This application is a Continuation of prior application Ser. No. 11/540,336, filed on Sep. 29, 2006. This application is also a continuation-in-part of U.S. patent application Ser. No. 10/810,988, filed on Mar. 26, 2004, and entitled "System and Method for Managing Storage Networks and for Managing Scalability of Volumes in such a Network" and which is assigned to the same assignee as this application. It is also a continuation-in-part of U.S. patent application Ser. No. 11/479,649, filed on Jun. 30, 2006, and entitled "System And Method For Managing Storage Networks And Providing Virtualization Of Resources In Such A Network Using One Or More Asics" and which is assigned to the same assignee as this application. Each of these above-referenced applications, for which the present application is a continuation-in-part of, is each incorporated in their entirety by this reference.

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

It is related to U.S. patent application Ser. No. 11/541,262, entitled "System and Method for Virtualization of Networked Storage Resources," which is filed on even date, and which is assigned to the same assignee as this application. It is also related to U.S. patent application Ser. No. 11/540,416, entitled "Architecture for Virtualization of Networked Storage Resources," which is filed on even date, and which is assigned to the same assignee as this application.

FIELD OF THE INVENTION

This invention relates generally to managing and analyzing data in a data storage environment, and more particularly to a system and method for managing physical and logical components of storage area networks.

BACKGROUND OF THE INVENTION

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

To leverage the value of MSS, these are typically networked in some fashion, Popular implementations of networks for MSS include network attached storage (NAS) and storage area networks (SAN). In NAS, MSS is typically accessed over known TCP/IP lines such as Ethernet using industry standard file sharing protocols like NFS, HTTP, and Windows Networking. In SAN, the MSS is typically directly accessed over Fibre Channel switching fabric using encapsulated SCSI protocols.

Each network type has its advantages and disadvantages, but SAN's are particularly noted for providing the advantage of being reliable, maintainable, and being a scalable infrastructure but their complexity and disparate nature makes them difficult to centrally manage. Thus, a problem encountered in the implementation of SAN's is that the dispersion of resources tends to create an unwieldy and complicated data storage environment. Reducing the complexity by allowing unified management of the environment instead of treating as a disparate entity would be advancement in the data storage computer-related arts. While it is an advantage to distribute intelligence over various networks, it should be balanced against the need for unified and centralized management that can grow or scale proportionally with the growth of what is being managed. This is becoming increasingly important as the amount of information being handled and stored grows geometrically over short time periods and such environments add new applications, servers, and networks also at a rapid pace.

SUMMARY

To overcome the problems described above and to provide the advantages also described above, the present invention in one embodiment includes a system for protecting against failures in a plurality of storage area networks including a plurality of data storage volumes and one or more hosts, wherein the volumes are in a switched storage network in the storage area networks. The system includes one or more processors in communication with switching capability for the switched storage network, wherein the one or more processors include program logic for carrying out failure protection by virtualizing data storage volumes and providing more than one virtualization service that can be related to each virtualized data storage volume, so that in the event of a failure of virtualization service another virtualization service can substitute for the failed virtualization service and virtualized data storage volumes may be associated with the substituted virtualization service.

In another embodiment, the invention is embodied as a method for carrying out steps carried out by the system described above.

BRIEF DESCRIPTION OF THE DRAWINGS

The above and further advantages of the present invention may be better under stood by referring to the following description taken into conjunction with the accompanying drawings in which:

FIG. 9 shows an example of SNAP Processing at a time in the environment of FIG. 1;

FIG. 10 shows another example of SNAP Processing at another time in the environment of FIG. 1;

DETAILED DESCRIPTION OF THE PREFERRED EMBODIMENT

The methods and apparatus of the present invention are intended for use in Storage Area Networks (SAN's) that include data storage systems, such as the Symmetrix Integrated Cache Disk Array system or the Clariion Disk Array system available from EMC Corporation of Hopkinton, Mass. and those provided by vendors other than EMC.

The methods and apparatus of this invention may take the form, at least partially, of program code (i.e., instructions) embodied in tangible media, such as floppy diskettes, CD-ROMs, hard drives, random access or read only-memory, or any other machine-readable storage medium, including transmission medium. When the program code is loaded into and executed by a machine, such as a computer, the machine becomes an apparatus for practicing the invention. The methods and apparatus of the present invention may be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code (software-based logic) for carrying out the method is embodied as part of the system described below.

Overview

The embodiment of the present invention denominated as FabricX architecture allows storage administrators to manage the components of their SAN infrastructure without interrupting the services they provide to their clients. This provides for a centralization of management allowing the storage infrastructure to be managed without requiring Host-based software or resources for this management. For example, data storage volumes can be restructured and moved across storage devices on the SAN while the Hosts accessing these volumes continue to operate undisturbed.

The new architecture also allows for management of resources to be moved off of storage arrays themselves, allowing for more centralized management of heterogeneous data storage environments. Advantages provided include: (1) centralized management of a storage infrastructure; (2) storage consolidation and economical use of resources; (3) common replication and mobility solutions (e.g., migration) across heterogeneous storage subsystems; and (4) storage management that is non-disruptive to Hosts and storage subsystems.

Architecture

Figure 1:
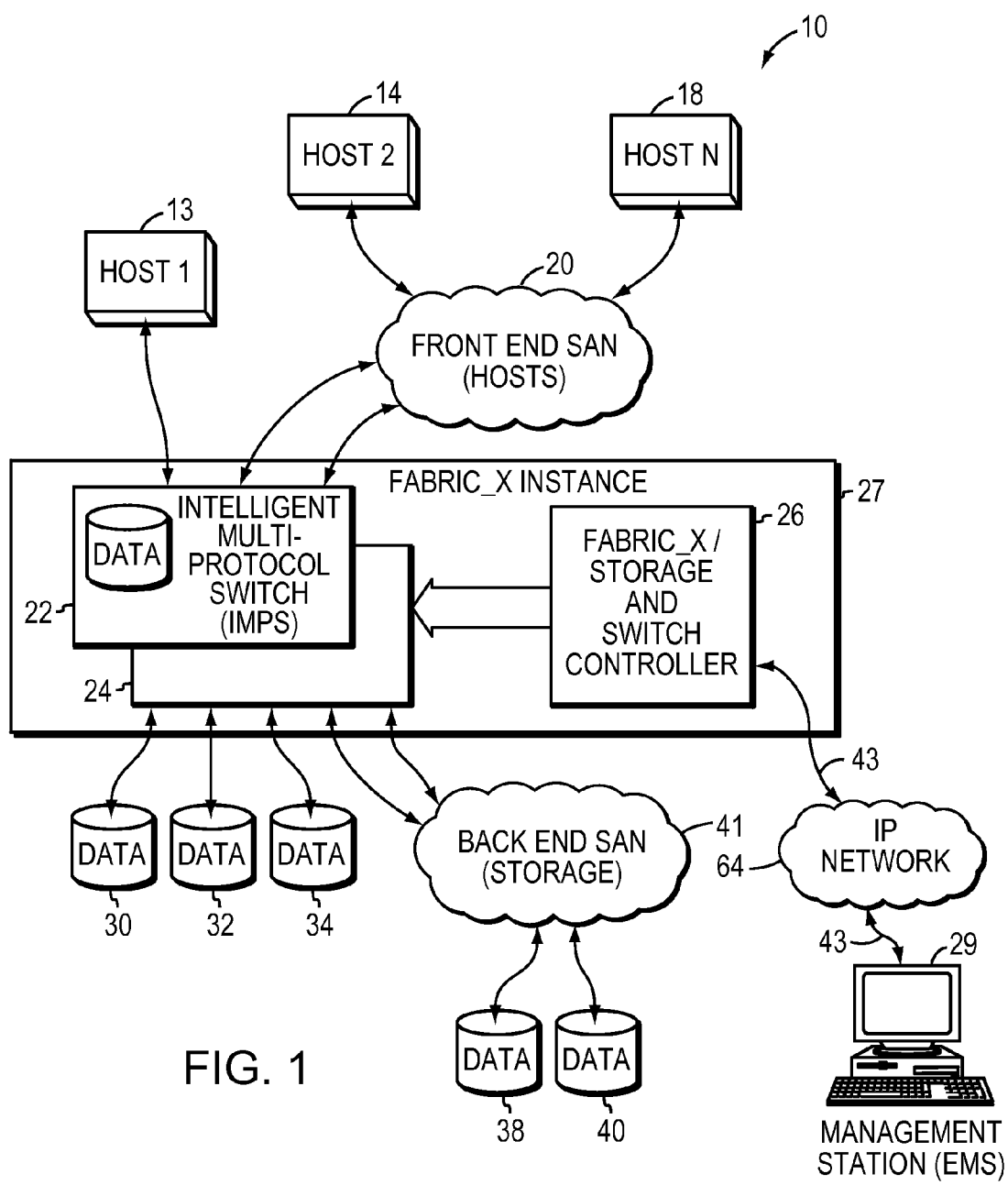
FIG. 1 is a block diagram showing a Data Storage environment including a new architecture embodying the present invention and which is useful in such an environment.

Referring now to FIG. 1, reference is now made to a data storage environment 10 including an architecture including the elements of the front-end storage area network 20 and a plurality of Hosts 1-N shown as Hosts 13, 14, and 18, wherein some Hosts may communicate through the SAN and others may communicate in a direct connect fashion, as shown. The architecture includes two intelligent multi-protocol switches (IMPS's) 22 and 24 and storage and switch controller 26 to form a combination 27 which may also be denominated as a FabricX Instance 27. In communication with the Instance through an IP Network 64 and management interface 43 is an element management station (EMS) 29, and back-end storage network 42. Such back-end storage may include one or more storage systems, such as the EMC Clariion and Symmetrix data storage systems from EMC of Hopkinton, Mass.

Generally such a data storage system includes a system memory and sets or pluralities and of multiple data storage devices or data stores. The system memory can comprise a buffer or cache memory; the storage devices in the pluralities and can comprise disk storage devices, optical storage devices and the like. However, in a preferred embodiment the storage devices are disk storage devices. The sets represent an array of storage devices in any of a variety of known configurations. In such a data storage system, a computer or Host adapter provides communications between a Host system and the system memory and disk adapters and provides pathways between the system memory and the storage device pluralities. Regarding terminology related to the preferred data storage system, the Host or Host network is sometimes referred to as the front-end and from the disk adapters toward the disks is sometimes referred to as the back-end. Since the invention includes the ability to virtualize disks using LUNs as described below, a virtual initiator may be interchanged with disk adapters. A bus interconnects the system memory, and communicates with front and back-end. As will be described below, providing such a bus with switches provides discrete access to components of the system.

Referring again to FIG. 1, the Data Storage Environment 10 provides architecture in a preferred embodiment that includes what has been described above as a FabricX Instance. Pairs of the IMPS switch are provided for redundancy; however, one skilled in the art will recognize that more or less switches and processors could be provided without limiting the invention and that the Controller could also be provided in redundancy. Storage from various storage subsystems is connected to a specific set of ports on an IMPS. As illustrated, the imported storage assets and these back-end ports make up the Back-End SAN 41 with a networked plurality of data storage arrays 38, and 40, and which also may be directly connected to either IMPS, as shown with arrays 30-34 so connected to the Instance 27 through IMPS 24, but although not shown could also be connected directly to the Storage and Switch Controller.

It is known in SAN networks using Fibre Channel and/or SCSI protocols that such data devices as those represented by disks or storage 30-40 can be mapped using a protocol to a Fibre Channel logical unit (LUN) that act as virtual disks that may be presented for access to one or more Hosts, such as Hosts 13-18 for I/O operations. LUN's are also sometimes referred to interchangeably with data volumes which at a logical level represent physical storage such as that on storage 30-40. Although SCSI protocols are discussed throughout, one skilled in the art will recognize these are applicable to iSCSI protocols or the like as well.

Over the referred IP Network 64 and by communicating through the management interface 43, a Storage Administrator using the EMS 29 may create virtual LUN's (Disks) that are composed of elements from the back-end storage. These virtual devices which may be represented, for example by a disk icon (not shown) grouped with the intelligent switch, are made available through targets created on a specific set of intelligent switch ports. Client Host systems connect to these 'front-end' ports to access the created volumes. The client Host systems, the front-end ports, and the virtual LUN's all form part of the Front-End SAN 20. Note Hosts, such as Host 13 may connect directly to the IMPS.

The combined processing and intelligence of the switch and the FabricX Controller provide the connection between the client Hosts in the front-end SAN and the storage in the back-end SAN. The FabricX Controller runs storage applications that are presented to the client Hosts. These include the Volume Management, Data Mobility, Snapshots, Clones, and Mirrors, which are terms of art known with EMC's Clariion data storage system. In a preferred embodiment the FabricX Controller implementation is based on the CLARiiON Barracuda storage processor and the CLARiiON Flare software implementation which includes Layered drivers that are discussed below.

Hardware Components

Figure 2:
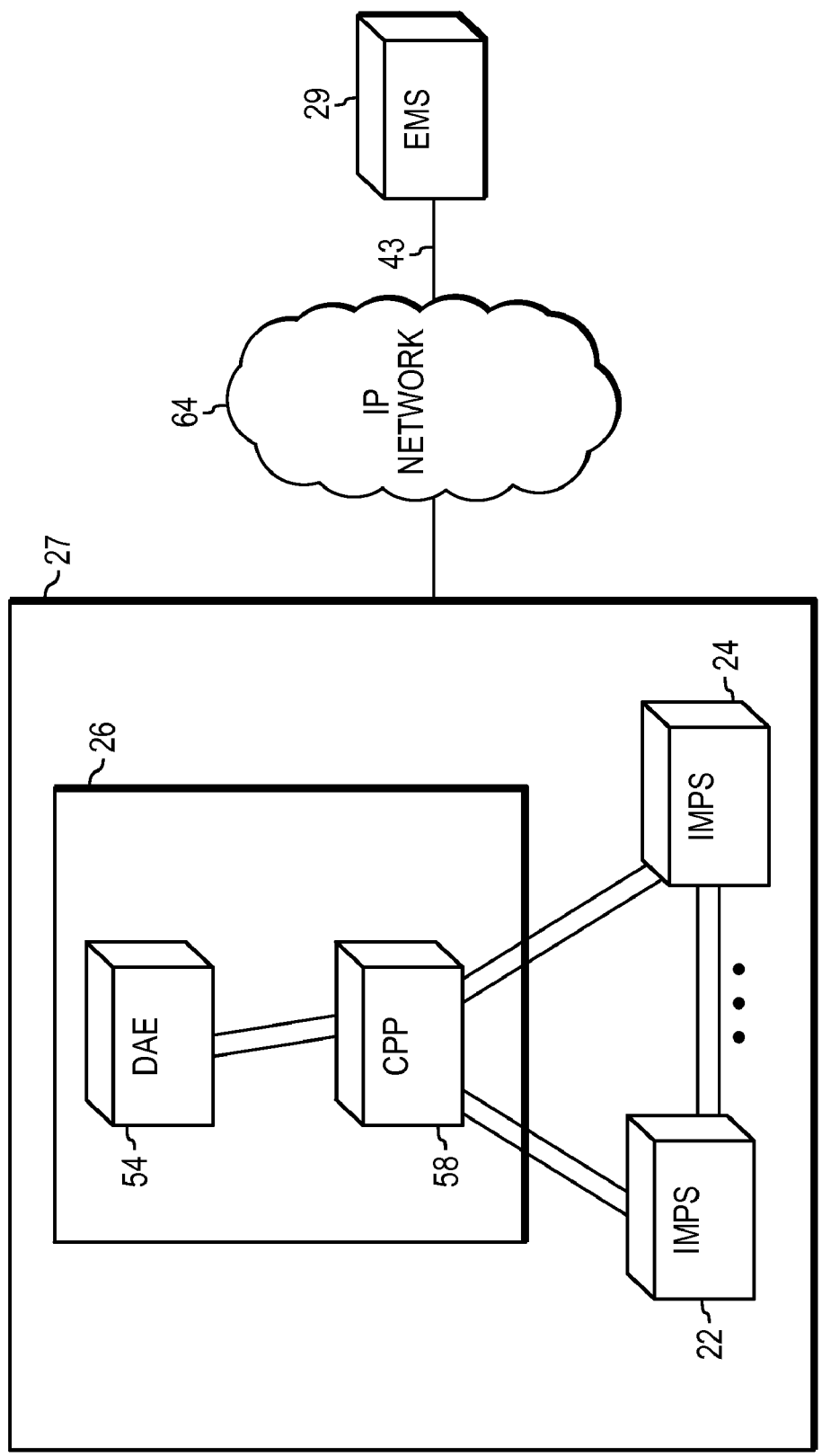
FIG. 2 is another block diagram showing hardware components of the architecture shown in FIG. 1.

Referring to FIG. 2, hardware components of the architecture in the environment shown in FIG. 1 are now described in detail. A FabricX instance 27 is comprised of several discrete hardware subsystems that are networked together. The major subsystems include a Control Path Processor (CPP) 58 and a Disk Array Enclosure (DAE) 54, each described in more detail in FIGS. 3 and 4.

The CPP provides support for storage and switch software applications and runs the software that handles exceptions that occur on the fast-path. Regarding where software runs, in the exemplary embodiment, software for management by the Storage and Switch Controller is shown running on the CPP; however, that is merely an example and any or all software may be loaded and run from the IMPS or anywhere in the networked environment. Additionally the CPP supports management interfaces used to configure and control the instance. The CPP is composed of redundant storage processors and is further described with reference to FIG. 3.

The DAE, together with the disks that it contains provide the persistent storage of the meta-data for the FabricX instance. The meta data includes configuration information that identifies the components of the instance, for example, the identities of the intelligent switches that make up the instance, data describing the set of exported virtual volumes, the software for the Controller, information describing what Hosts and initiators are allowed to see what volumes, etc. The DAE is further described with reference to FIG. 4. The IMPS 22 or 24 provide storage virtualization processing in the datapath (also known as fast-path processing), and pass control to the CPP when exceptions occur for requests that it cannot handle.

Referring to FIG. 2, each FabricX instance may be managed by an administrator or user using EMS 29. Preferably, a given EMS is capable of managing one or more FabricX instances and communicates to the FabricX instance components through one or more IP networks.

Figure 3:
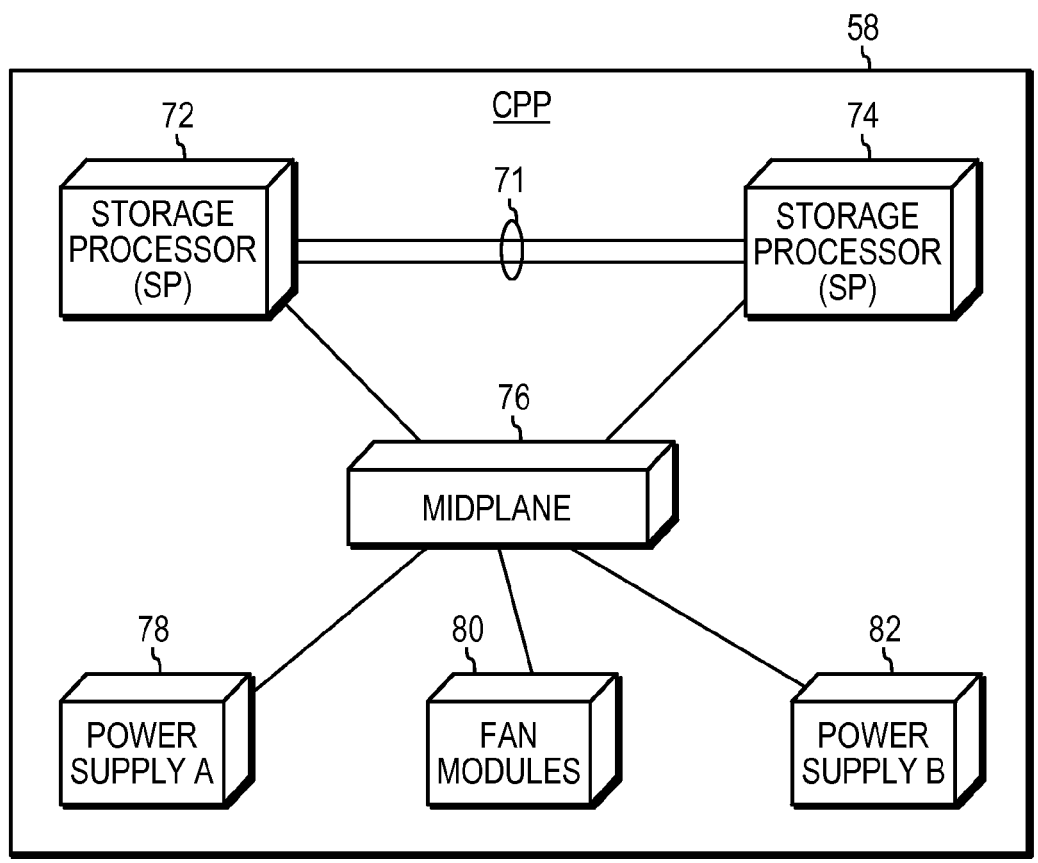
FIG. 3 is another block diagram showing hardware components of a processor included in the architecture and components of respective FIGS. 1 and 2.

Referring to FIG. 3, CPP 58 preferably includes two storage processors (SP's) 72 and 74, which may be two Intel Pentium IV microprocessors or similar. The two storage processors in the CPP communicate with each other via links 71, which may be for example redundant 2 Gbps Fibre Channel links, each provided in communication with the mid-plane 76. Each CPP contains fan modules 80 that connect directly to the mid-plane 76. The CPP contains two power supplies 78 and 82 (Power Supply A and B). In a preferred embodiment, the power supplies are redundant, have their own line cord, power switch, and status light, and each power supply is capable of providing full power to the CPP and its DAE. During normal operation the power supplies share load current. These redundant standby power supplies provide backup power to the CPP to ensure safety and integrity of the persistent meta-data maintained by the CPP.

Figure 4:
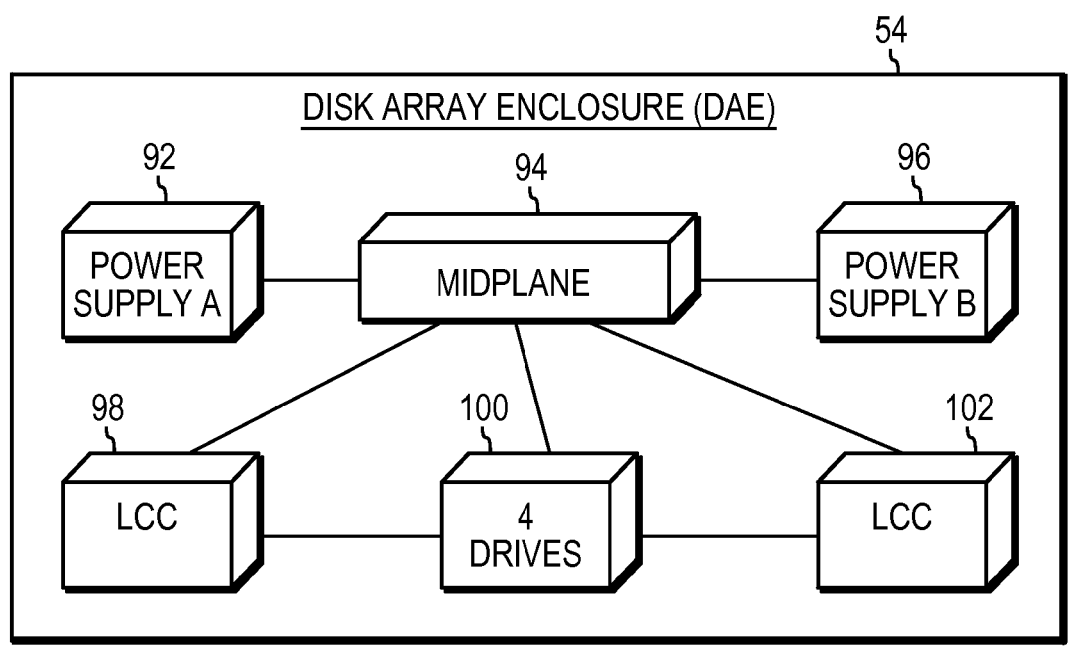
FIG. 4 is another block diagram showing hardware components of a disk array included in the architecture and components of respective FIGS. 1 and 2.

Referring to FIG. 4, the DAE 54 is shown. A FabricX instance 27 preferably has a single DAE 54, which is loaded with four disk drives 100 (the number of drives is a variable choice, however). These disk drives provide the persistent storage for meta-data of the instance, wherein the meta-data is used for certain management and control functions. None of this storage is directly accessible or visible to Hosts on the front-end. The meta-data on the disk drives is three-way mirrored to provide protection from disk failures. Each SP has a single arbitrated loop that provides its connection to the DAE. Each Link Control Card or LCC 98 and 102 connects the FabricX SP's to the meta-data storage devices or disk drives within the Disk Array Enclosure.

Figure 5:
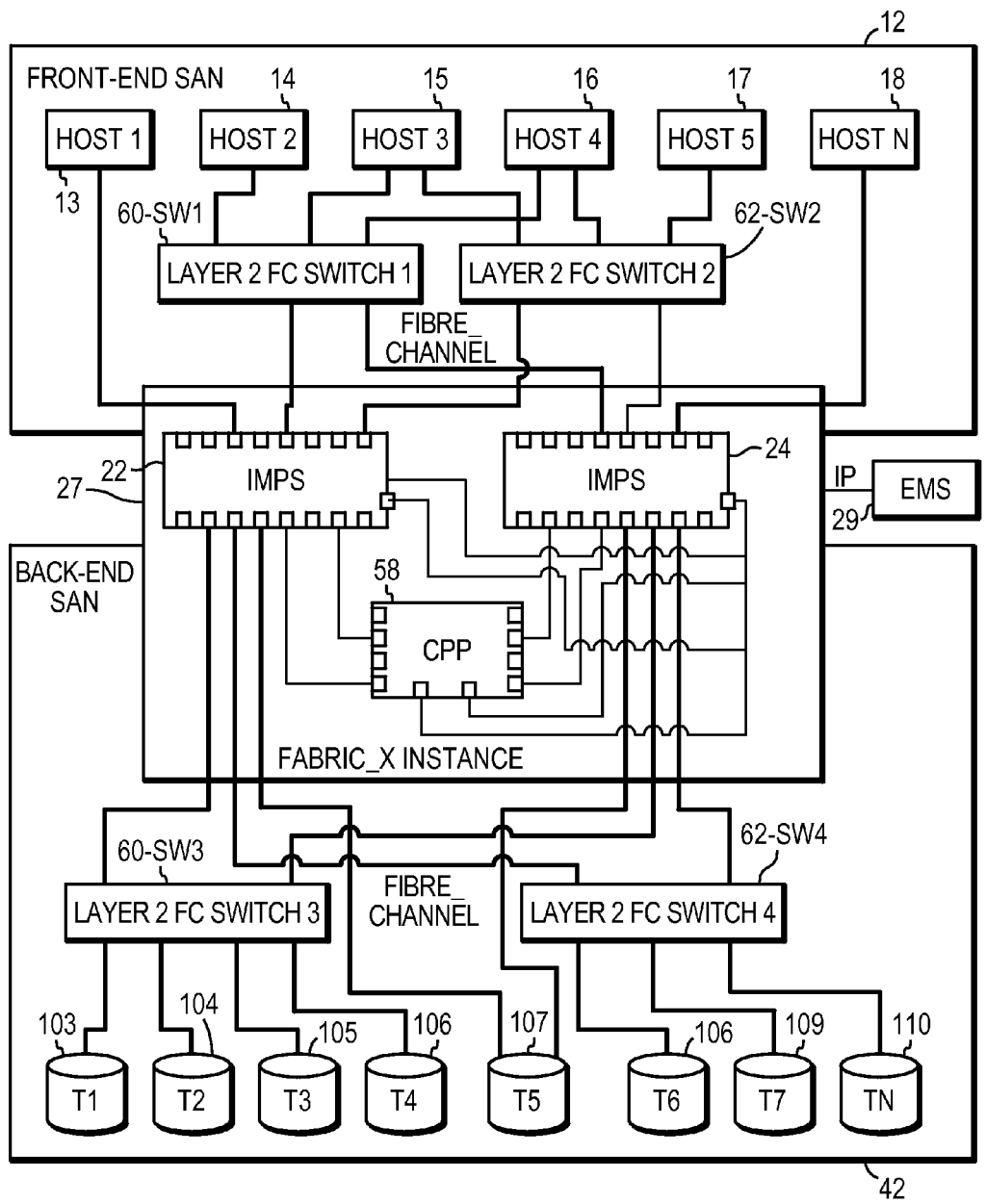
FIG. 5 is a schematic illustration of the architecture and environment of FIG. 1.

FIG. 5 shows a schematic illustration of the architecture and environment of FIG. 1 in detail with preferred connectivity and in a preferred two IMPS configuration (IMPS 22 and IMPS 24). Host Systems 13-18 preferably communicate with FabricX via a SCSI protocol running over Fibre Channel. Each Fibre Channel port of each IMPS is distinguished as being either a front-end port, a back-end port, a control-port, or an inter-switch port. Hosts connect to the FabricX instance 27 via front-end ports. Front-end ports support SCSI targets and preferably have virtualizing hardware to make up an intelligent port. The Host's connection to the port may be direct as in the case of labeled Host 1 or indirect such as Host 2 via Layer 2 Fibre Channel switches such as Switch 60-SW1 and Switch 62-SW2. Hosts may establish multiple paths to their storage by connecting to two or more separate front-end ports for high availability and performance; however, the preferred FabricX instance architecture allows Hosts to be configured with a single path for the sake of simplicity. In some configurations, not shown for simplicity, the switches 60-SW1 and 62-SW2 could be combined and/or integrated with the IMPS without departing from the spirit of the invention.

An IMPS can be used to support virtual SAN's (VSAN's), to parse between front-end SAN's and back-end SAN's even if such SAN's are not physically configured. In general, switches that support VSANs allow a shared storage area network to be configured into separate logical SANs providing isolation between the components of different VSANs. The IMPS itself may be configured in accordance with specifications from such known switch vendors as Brocade and Cisco.

Each intelligent switch preferably contains a collection of SCSI ports, such as Fibre Channel, with translation processing functions that allow a port or associated hardware to make various transformations on the SCSI command stream flowing through that port. These transformations are performed at wire-speeds and hence have little impact on the latency of the command. However, intelligent ports are only able to make translations on read and write commands. For other SCSI commands, the port blocks the request and passes control for the request to a higher-level control function. This process is referred to as faulting the request. Faulting also occurs for read and write commands when certain conditions exist within the port. For example, a common transformation performed by an intelligent port is to map the data region of a virtual volume presented to a Host to the data regions of back-end storage elements. To support this, the port maintains data that allows it to translate (map) logical block addresses of the virtual volume to logical back-end addresses on the back-end devices. If this data is not present in the port when a read or write is received, the port will fault the request to the control function. This is referred to as a map fault.

Once the control function receives a faulted request it takes whatever actions necessary to respond to the request (for example it might load missing map data), then either responds directly to the request or resumes it. The control function supported may be implemented differently on different switches. On some vendor's switches the control function is known to be supported by a processor embedded within the blade containing the intelligent ports, on others it is known to provide it as an adjunct processor which is accessed via the backplane of the switch, a third known configuration is to support the control function as a completely independent hardware component that is accessed through a network such as Fibre Channel or IP.

Back-end storage devices connect to FabricX via the Fibre Channel ports of the IMPSs that have been identified as back-end ports (oriented in FIG. 5 toward the back-end SAN). Intelligent ports act as SCSI initiators and the switch routes SCSI traffic to the back-end targets 103-110 respectively labeled T1-TN through the back-end ports of the respective IMPS's. The back-end devices may connect directly to a back-end IMPS if there is an available port as shown by T5, or they may connect indirectly such as in the case of T1 via a Layer 2 Fibre Channel switch, such as Switch 60-SW3, and Switch 62-SW4.

The EMS 29 connects to FabricX in a preferred embodiment through an IP network, e.g. an Ethernet network which may be accessed redundantly. The FabricX CPP 58 in a preferred embodiment has two 10/100 Mbps Ethernet NIC that is used both for connectivity to the IMPS (so that it can manage the IMPS and receive SNMP traps), and for connectivity to the EMS. It is recommended that the IP networks 624a-b provided isolation and dedicated 100 Mbps bandwidth to the IMPS and CPP.

The EMS in a preferred embodiment is configured with IP addresses for each Processor 72-74 in the FabricX CPP. This allows direct connection to each processor. Each Processor preferably has its own Fibre Channel link that provides the physical path to each IMPS in the FabricX instance. Other connections may also work, such as the use of Gigabit Ethernet control path connections between the CPP and IMPS. A logical control path is established between each Processor of the CPP and each IMPS. The control paths to IMPS's are multiplexed over the physical link that connects the respective SP of the CPP to its corresponding IMPS. The IMPS provides the internal routing necessary to send and deliver Fiber Channel frames between the SP of the CPP and the respective IMPS. Other embodiments are conceivable that could use IP connectivity for the control path. In such a case the IMPS could contain logic to route IP packets to the SP.

Software Components

Figure 6:
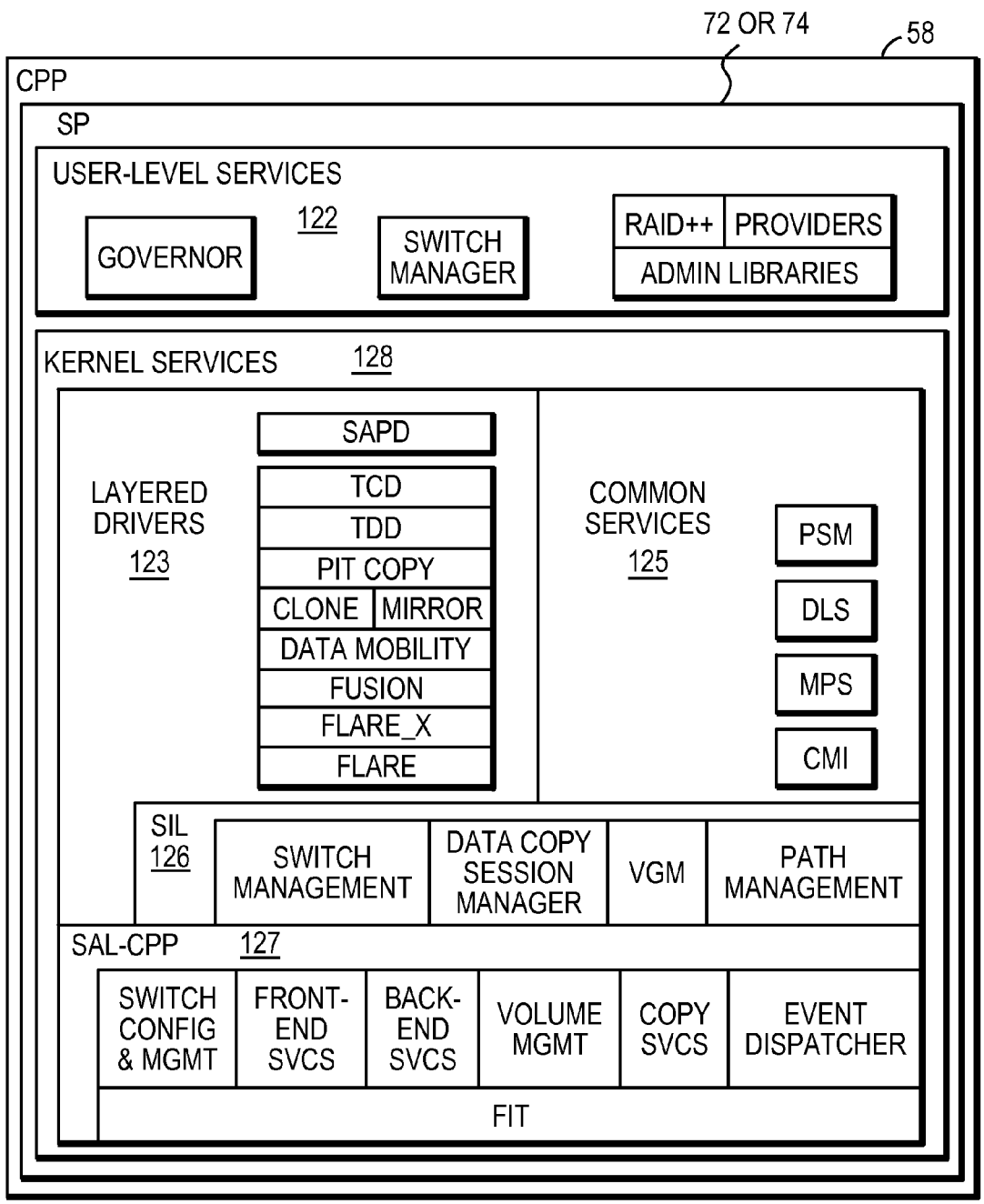
FIG. 6 is a functional block diagram showing software components of the processor shown in FIG. 3.
Figure 7:
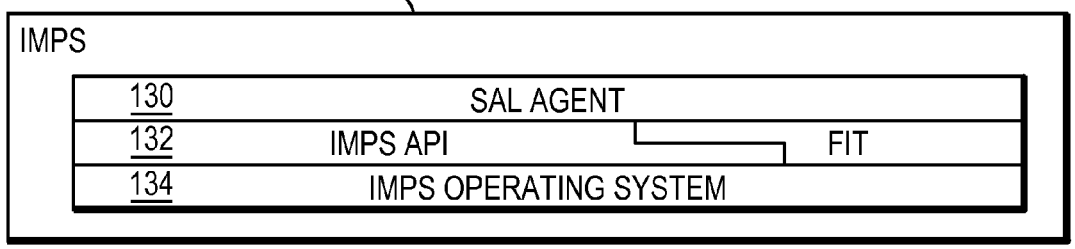
FIG. 7 is a functional block diagram showing software components of intelligent switches which are included in the architecture of FIG. 1 and which are also shown in the hardware components of FIG. 2.

Reference is made to FIGS. 6 and 7, showing a functional block diagram of software comprised in modules that run on the Storage Processors (SP) 72 or 74 within Control Path Processor (CPP) 58 and on the IMPS owned by the instance. Each of these storage processors operates as a digital computer preferably running Microsoft Window XP Embedded and Hosts software components. Software Components of each SP are now described.

The CPP-based software includes a mixture of User-Level Services 122 and Kernel-mode or Kernel services 128. The Kernel services include Layered Drivers 123, Common Services 125, Switch Independent Layer (SIL) 126, and Switch Abstraction Layer-Control Path Processor (SAL-CPP) 127. The IMPS-based software preferably runs on a control processor within the vendor's switch. This processor may be embedded on an I/O blade within the switch or implemented as a separate hardware module.

The SAL-CPP 127 provides a vendor-independent interface to the services provided by the IMPS's that form a FabricX instance. This software Layer creates and manages a IMPS Client for each IMPS that is part of the FabricX instance. The following services are provided by the SAL-CPP. There is a Switch Configuration and Management Services (SWITCH CONFIG & MGMT) in the SAL-CPP that provides uniform support for configuring the IMPS, zone configuration and management, name service configuration and management, discovering the ports supported by the IMPS, reporting management related events such as Registered State Change Notifications (RSCNs), and component failure notifications. The service interfaces combined with the interfaces provided by the user-level Switch Management service encapsulate the differences between different switch vendors and provide a single uniform interface to the FabricX management system. The Switch Adapter Port Driver (SAPD) of the Kernel Services 128 uses these interfaces to learn what ports are supported by the instance so that it can create the appropriate device objects representing these ports.

Referring to FIG. 6, the SAL-CPP 127 provides Front-End Services (FRONT-END SVCS) that include creating and destroying virtual targets, activate and deactivate virtual targets. Activation causes the target to log into the network while deactivation causes it to log out. Storage Presentation objects represent the presentation of a volume on a particular target. These Front-End Services also include LUN mapping and/or masking on a per initiator and per target basis.

Referring again to FIG. 6, the SAL-CPP 127 provides Back-End Services (BACK-END SVCS) that include discovering back-end paths and support for storage devices or elements, including creating and destroying objects representing such devices or elements. Back-End Services include managing paths to the devices and SCSI command support. These services are used by FlareX of the Layered Drivers 123 to discover the back-end devices and make them available for use, and by the Path Management of the Switch Independent Layer (SIL). The SW is a collection of higher-level switch-oriented services including managing connectivity to storage devices. These services are implemented using the lower-level services provided by the SAL-CPP.

SAL-CPP 127 provides a volume management (Volume MGMT) service interface that supports creating and destroying virtual volumes, associating virtual volumes with back-end Storage Elements, and composing virtual volumes for the purpose of aggregation, striping, mirroring, and/or slicing. The volume management service interface also can be used for loading all or part of the translation map for a volume to a virtualizer, quiescing and resuming IO to a virtual volume, creating and destroying permission maps for a volume, and handling map cache miss faults, permission map faults, and other back-end errors. These services are used by the volume graph Manager (VGM) in each SP to maintain the mapping from the virtual targets presented out the logical front of the instance to the Storage Elements on the back-end.

There are other SAL-CPP modules. The SAL copy service (COPY SVCS) functions provide the ability to copy blocks of data from one virtual volume to another. The Event Dispatcher is responsible for delivering events produced from the IMPS to the registered kernel-based services such as Path Management, VGM, Switch Manager, etc.

The Switch and Configuration Management Interface is responsible for managing the connection to an IMPS. Each Storage Processor maintains one IMPS client for each IMPS that is part of the instance. These clients are created when the Switch Manager process directs the SAL-CPP to create a session with a IMPS.

The Switch Independent Layer (SIL) 126 is a collection of higher-level switch-oriented services. These services are implemented using the lower-level services provided by the SAL-CPP. These services include:

Volume Graph Manager (VGM)—The volume graph Manager is responsible for processing map-miss faults, permission map faults, and back-end 10 errors that it receives from the SAL-CPP. The VGM maintains volume graphs that provide the complete mapping of the data areas of front-end virtual volumes to the data areas of back-end volumes. The Volume Graph Manager provides its service via a kernel DLL running within the SP.

Data Copy Session Manager—The Data Copy Session Manager provides high-level copy services to its clients. Using this service, clients can create sessions to control the copying of data from one virtual volume to another. The service allows its clients to control the amount of data copied in a transaction, the amount of time between transactions, sessions can be suspended, resumed, and aborted. This service builds on top of capabilities provided by the SAL-CPP's Data Copy Services. The Data Copy Session Manager provides its service as a kernel level DLL running within the SP.

Path Management—The path management component of the SIL is a kernel-level DLL that works in conjunction with the Path Manager. Its primary responsibility is to provide the Path Manager with access to the path management capabilities of the SAL-CPP. It registers for path change events with the SAL-CPP and delivers these events to the Path Manager running in user-mode. Note, in some embodiments, the Path Management, or any of the other services may be configured to operate elsewhere, such as being part of another driver, such as FlareX.

Switch Management—The switch management component of the SIL is a kernel-level DLL that works in conjunction with the Switch Manager. Its primary responsibility is to provide the Switch Manager with access to the switch management capabilities of the SAL-CPP.

The CPP also Hosts a collection of Common Services 125 that are used by the Layered application drivers. These services include:

Persistent Storage Mechanism (PSM)—This service provides a reliable persistent data storage abstraction. It is used by the Layered applications for storing their metadata. The PSM uses storage volumes provided by FlareX that are located on the Disk Array Enclosure attached to the CPP. This storage is accessible to both SPs, and provides the persistency required to perform recovery actions for failures that occur. Flare provides data-protection to these volumes using three-way mirroring. These volumes are private to a FabricX instance and are not visible to external Hosts.

Distributed Lock Service (DLS)—This service provides a distributed lock abstraction to clients running on the SPs. The service allows clients running on either SP to acquire and release shared locks and ensures that at most one client has ownership of a given lock at a time. Clients use this abstraction to ensure exclusive access to shared resources such as meta-data regions managed by the PSM.

Message Passing Service (MPS)—This service provides two-way communication sessions, called filaments, to clients running on the SPs. The service is built on top of the CMI service and adds dynamic session creation to the capabilities provided by CMI. MPS provides communication support to kernel-mode drivers as well as user-level applications.

Communication Manager Interface (CMI)—CMI provides a simple two-way message passing transport to its clients. CMI manages multiple communication paths between the SPs and masks communication failures on these. The CMI transport is built on top of the SCSI protocol which runs over 2 Gbps Fibre-Channel links that connect the SPs via the mid-plane of the storage processor enclosure. CMI clients receive a reliable and fast message passing abstraction. CMI also supports communication between SPs within different instances of FabricX. This capability will be used to support mirroring data between instances of FabricX.

The CPP includes Admin Libraries that provide the management software of FabricX with access to the functionality provided by the Layered drivers such as the ability to create a mirrored volume or a snapshot. The Admin Libraries, one per managed Layer, provide an interface running in user space to communicate with the managed Layers. The CPP further includes Layered Drivers 123 providing functionality as described below for drivers denominated as Flare, FlareX (FLARE_X), Fusion, Clone/Mirror, PIT Copy, TDD, TCD, and SAPD.

Flare provides the low-level disk management support for FabricX. It is responsible for managing the local Disk Array Enclosure used for storing the data of the PSM, the operating system and FabricX software, and initial system configuration images, packages, and the like. It provides the RAID algorithms to store this data redundantly.

The FlareX component is responsible for discovering and managing the back-end storage that is consumed by the FabricX instance. It identifies what storage is available, the different paths to these Storage Elements, presents the Storage Elements to the management system and allows the system administrator to identify which Storage Elements belong to the instance. Additionally, FlareX may provide Path Management support to the system, rather than that service being provided by the SIL as shown. In such a case, FlareX would be responsible for establishing and managing the set of paths to the back-end devices consumed by a FabricX instance. And in such a case it would receive path related events from the Back-End Services of the SAL-CPP and responds to these events by, for example, activating new paths, reporting errors, or updating the state of a path.

The Fusion Layered driver provides support for re-striping data across volumes and uses the capabilities of the IMPS have to implement striped and concatenated volumes. For striping, the Fusion Layer (also known as the Aggregate Layer), allows the storage administrator to identify a collection of volumes (identified by LUN) over which data for a new volume is striped. The number of volumes identified by the administrator determines the number of columns in the stripe set. Fusion then creates a new virtual volume that encapsulates the lower Layer stripe set and presents a single volume to the Layers above.

Fusion's support for volume concatenation works in a similar way; the administrator identifies a collection of volumes to concatenate together to form a larger volume. The new larger volume aggregates these lower Layer volumes together and presents a single volume to the Layers above. The Fusion Layer supports the creation of many such striped and concatenated volumes.

Because of its unique location in the SAN infrastructure, FabricX, can implement a truly non-disruptive migration of the dataset by using the Data Mobility Layer driver that is part of the Drivers 123. The client Host can continue to access the virtual volume through its defined address, while FabricX moves the data and updates the volume mapping to point to the new location.

The Clone driver provides the ability to clone volumes by synchronizing the data in a source volume with one or more clone volumes. Once the data is consistent between the source and a clone, the clone is kept up-to-date with the changes made to the source by using mirroring capabilities provided by the IMPS's. Clone volumes are owned by the same FabricX instance as the source; their storage comes from the back-end Storage Elements that support the instance.

The Mirror driver supports a similar function to the clone driver however, mirrors are replicated between instances of FabricX. The mirror Layered driver works in conjunction with the mirror driver in another instance of FabricX. This application provides the ability to replicate a source volume on a remote FabricX instance and keep the mirror volume in synch with the source.

The PIT (Point-In-Time) Copy driver, also known as Snap, provides the ability to create a snapshot of a volume. The snapshot logically preserves the contents of the source volume at the time the snapshot is taken. Snapshots are useful for supporting non-intrusive data backups, replicas for testing, checkpoints of a volume, and other similar uses.

The Target Class Driver and Target Disk Driver (TCD/TDD) Layer provides SCSI Target support. In FabricX these drivers mostly handle non-read and write SCSI commands (such as INQUIRY, REPORT_LUNS, etc). The drivers are also responsible for error handling, when errors cannot be masked by the driver Layers below, the TCD/TDD is responsible for creating the SCSI error response to send back to the Host. The TCD/TDD Layer also implements support for the preferred CLARiiON functionality which provides the means of identifying what LUNs each initiator should see. This is known as LUN masking. The feature also provides for LUN mapping whereby the Host visible LUN is translated to an instance-based LUN. Additionally such functionality when combined with a Host agent provides the ability to identify which initiators belong to a Host to simplify the provisioning of LUN masking and mapping.

The Switch Adapter Port Driver (SAPD) is presented as a Fibre-Channel Port Driver to the TCD/TDD (Target Class Driver/Target Disk Driver) drivers, but rather than interfacing with a physical port device on the SP, the driver interfaces with the SAL-CPP and creates a device object for each front-end port of each IMPS that is part of the FabricX instance. The SAPD registers with the SAL-CPP to receive non-IO SCSI commands that arrive. The SAL-CPP will deliver all non-IO SCSI commands received for LU's owned by this driver's SP to this SAPD. The SAPD runs as a kernel-mode driver.

The following services are user based: Governor and Switch Management. The Governor is an NT Service that is responsible for starting other user-level processes and monitoring their health and restarting them upon failure. The Switch Manager controls sessions created in the SAL-CPP for each IMPS. The Switch Manager is responsible for establishing the connections to the switches under its control and for monitoring and reacting to changes in their health. Each SP Hosts a single Switch Manager that runs as a User-level process and a Kernel-mode service within the SP.

Reference is made once again to FIG. 6. The Raid++ services encapsulates the legacy logic dealing with the configuration and management of the array logical components (such as storage group, LUNs, etc.) and physical components (such as cabinets, DAEs, disk drives, etc.). The Providers are plug-in modules to the CIMOM which provide the functionality for a particular set of managed objects. Providers represent the objects (class definitions and behaviors) as defined in the object model of the managed element. The Admin Libraries include an interface between the user space management tasks and the kernel mode drivers' instrumenting the management of FabricX. The Admin Libraries accept requests using a Tagged Length Data (TLD) self-describing message format from the management Layer and converts those requests into the specific IOCTL calls required to realize those requests. Responses are returned using the same format.

The Path Management is responsible for the construction and management of paths to back-end Storage Elements and is part of Kernel-mode services. It notes when paths change state; based on these state changes it applies its path management policies to take any adjusting actions. For example, upon receiving a path failure notification, the Path Management might activate a new path to continue the level of service provided for a back-end volume.

One function of FabricX Volume Management is to combine elements of the physical storage assets of the FabricX Instance into logical devices. The initial implementation of the FabricX Volume Manager is based on the Flare Fusion Driver. As in Flare, the basic building blocks of the volumes exported by FabricX are constructed from the back-end storage devices. Each device visible to the FabricX instance will be initially represented as an un-imported Storage Element. The storage administrator will able to bind the individual storage elements into single disk RAID Groups. From these RAID Groups the administrator can define Flare Logical Units (FLU). In the FabricX environment the FLU's will be exported by the FlareX component to the Layered drivers above.

Flare Fusion imports FLU's and aggregates them into Aggregate Logical Units (ALU). When a logical unit or SCSI Disk is presented to a client Host it is called a Host Logical Unit (HLU). HLU's can be created by: directly exporting a FLU; exporting an ALU created by concatenating two or more FLU's; and exporting an ALU created by striping two or more FLU's.

The FabricX Inter Process Communication Transport (FIT) provides the message passing support necessary for the SAL Agents running on the IMPS's to communicate with the SAL-CPP client instance running on each SP. This transport provides a model of asynchronous communication to its clients and is responsible for monitoring and reporting on the health of the communications network connecting the IMPSs to the CPPs. FIT uses a proprietary protocol developed on top of the SCSI/FC protocol stack to provide a control path between the SPs and the IMPS's. This protocol runs over the Fibre Channel connecting the SP to the IMPS's switch. FIT supports multiple transport protocols. In addition to SCSI/FC FIT also supports TCP/IP.

FIG. 7 shows the software components of the intelligent switch or IMPS 22 or 24. IMPS Software Components include an IMPS API and FIT 132, SAL Agent 130, and IMPS Operating System 134. Each switch vendor provides a software interface to the services provided by their switch that is the IMPS API and the SP's communicate with this API. This API provides support to application software that runs within the switch or blade and in some cases this interface is remote to the switch. FabricX isolates the storage application logic from these differences by defining the Switch Abstraction Layer (SAL-CPP) discussed with reference to FIG. 6. The SAL Agent 130 is an application from the perspective of the IMPS and works with SAL-CPP 127 (FIG. 6) and the FIT of the SAL-CPP and of the IMPS. The Agent 130 directly uses the native IMPS API to control and communicate with the switch. Its function is to provide access to the services of the switch to the Control Path Processors. The IMPS operating system varies from switch vendor to vendor. For example, Cisco's Intelligent Switches use Monte Vista Linux, while the Brocade switches use NetBSD.

FabricX preferably uses the Flare architecture from CLARiiON. This architecture uses a Windows driver stack. At the lowest Layer is the code, labeled FlareX (Flare_X) that interfaces to the back-end devices. The storage applications are logically Layered above FlareX as Windows device drivers, including Fusion, Mirror_View, Snap_View, Clone_View, and TCD/TDD. These Layers provide support for features such as volume concatenation, striping, clones, snapshots, mirrors, and data migration. These Layers also define virtualized Logical Unit objects.

This architecture includes replication Layers: Snap_View, Clone_View, and Mirror_View are Layered above the Fusion Layer of code and consume the logical units (volumes) presented by the Fusion Layer, they likewise present logical units to the Layers above. The replication Layers have no knowledge of back-end devices or data placement thereon.

The inventors have critically recognized that prior art storage arrays had limited processes to create clones, which are replicas stored within an array, and mirrors, which are replicas stored on different arrays. This is because the front-end of an array has no way to directly access to a back-end device in some other array. Remote mirroring in such prior art configurations is processed through two different arrays, one attached to a Host and one attached to remote back-end devices. These two arrays are then connected to each other via a WAN. However, the present invention being based on a switch and storage architecture does not have such limitations. Instead, all back-end devices are equivalent irregardless of their physical location though latency of access may vary. A back-end device may be connected to a back-end port of a switch through some WAN making it physically remote. With a switch-based architecture clones, which are replicas stored within the storage managed by the instance, can be created from storage that is physically remote from the Controller and switch hardware just as easily as creating it from storage which is physically close to this hardware. Only one FabricX instance is necessary, to create clones whether on physically local back-end devices or on physically remote back-end devices. However, if it is desirable to create replicas, mirrors, between instances of FabricX that is possible. For example, one might want to create a replica on another instance for the purpose of increasing data protection and providing a means to tolerate a failure of a FabricX instance, or to replicate data using an asynchronous protocol for very long distance replication.

Further Operation Details

Figure 8:
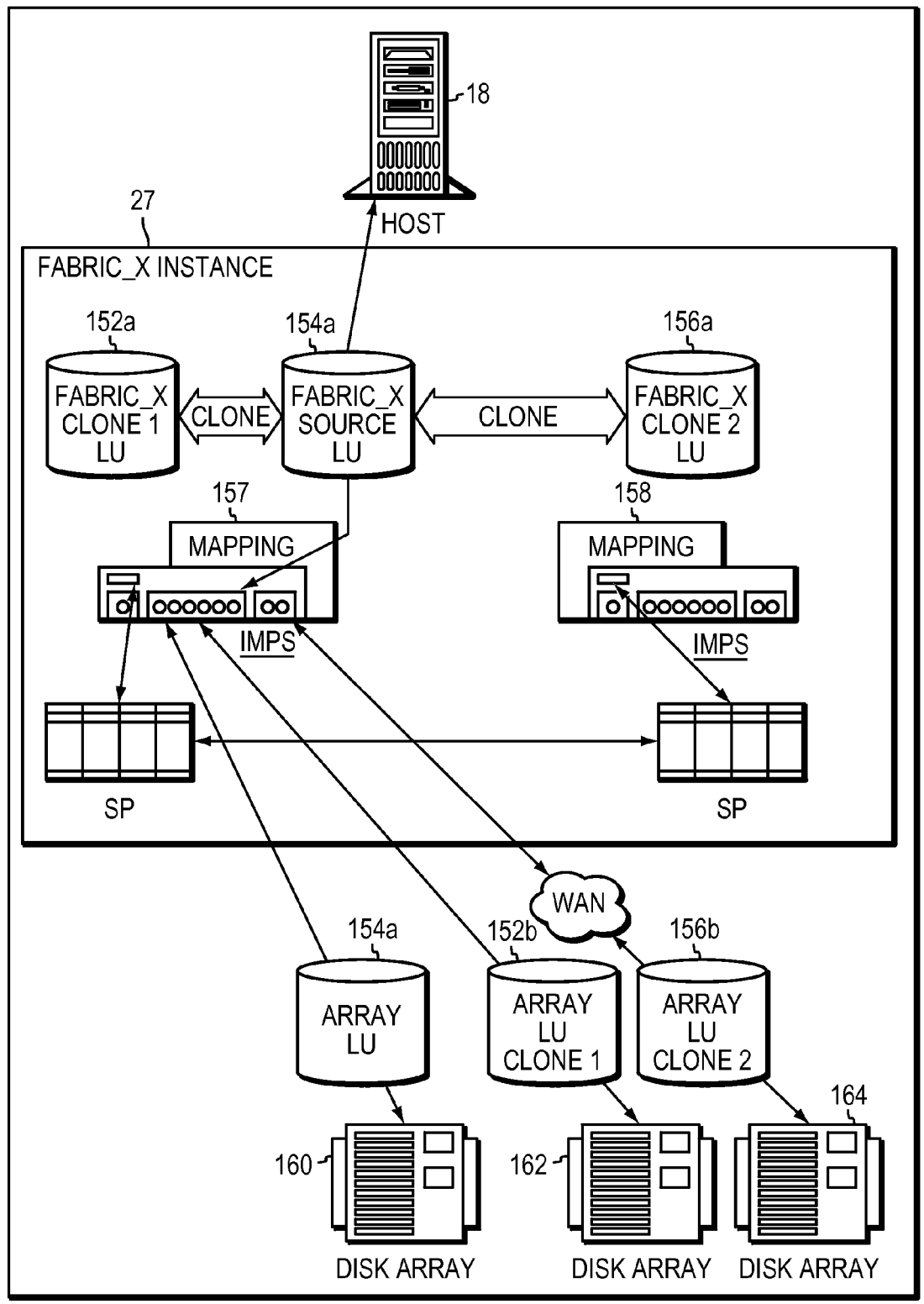
FIG. 8 shows an example of implementation of clones in the environment of FIG. 1.

FIG. 8 shows an example of creation and use of clones with a FabricX instance. In this example, a Source Logical Unit (LU) 154*a* is connected to a Host 18 together with two clones, Clone 1 152*a* and Clone 2 156*a* on FabricX Instance 27. The connection of the Host is shown directly, but it may also be indirect and/or via a SAN. Clone 1 is made on a back-end device provided by a locally attached array. Clone 2 is made on a remote device provided by an array located at some distance and connected to the local FabricX Instance 27 which can be accomplished by means such as Asynchronous Transfer Mode (ATM) or Dense Wave Division Multiplexing (DWDM) networks. Because these replicas are logically equivalent both are referred to as Clones. Clones made using one FabricX Instance can be accessed by Hosts connected to the same FabricX Instance mapped in respective mapping areas 157 and 158 of each IMPS controlled by a respective SP. Using the mapping 157 the respective FabricX instance presents the Source LU 154*a* to the Host 19, while maintaining the cloned replicas 152*b* and, via a WAN, the replica 156*b* related to respective arrays 160-164.

FIGS. 9 and 10 show an example of Snap replicas created using FabricX. Snaps are constructed by using a process called Copy On First Write (COFW). When a Snap is created it represents the state and contents of a volume as it existed at the time of creation. With the COFW technique a snap is initially just a map of pointers 173*a*-*c* and 175*a*-*c*. These map pointers initially refer to the blocks 176*a*-178*a* in the Source, a.k.a. Ancestor, volume 179*a*. Only when a block in the source volume is about to change is it necessary to actually create a copy of the data as it was when the Snap was instantiated. When a write is received for a chunk of data the sub-segment(s) that refer to the chunk are copied from the Source to another area on a back-end volume (BEV) that is assigned to the Snap.

FIG. 10 shows a volume consisting of three chunks of data after the Snap is created and before any write commands are received. Both the source and Snap maps point to the same three chunks of data on back-end storage, i.e., pointers 173*d*-*f* and 175*d*-*f* point to respective blocks 176*b*-178*b* on volume 179*b*. When a write is received, say for chunk 2, FabricX will block the write command. It will copy chunk 2 from the back-end storage to some newly allocated space on back-end storage and change the Snap's map to point to this new location. FabricX will then allow the write of chunk 2 to proceed to the old location. After the write is complete the mapping is as shown in FIG. 10.

Figure 11:
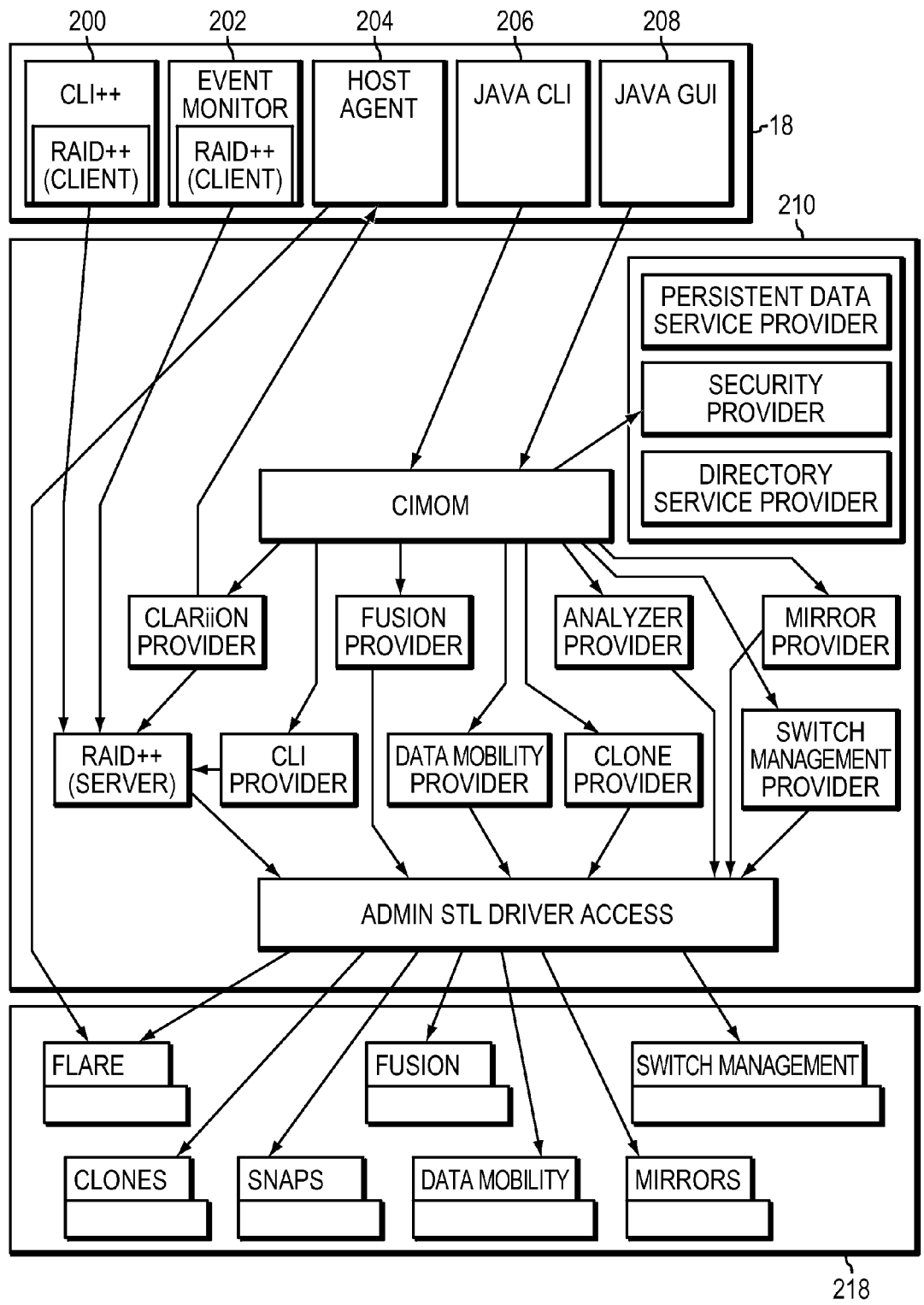
FIG. 11 shows a schematic block diagram of software components of the architecture of FIG. 1 showing location and relationships of such components to each other.

FIG. 11 shows a schematic block diagram of software components of the architecture of FIG. 1 showing location and relationships of such components to each other. The components reside within either the client (Host) computers or the CPP of FabricX and use various communications method and protocols. The following describe the function of each of the major components and their interfaces to associated functions.

Several components of FabricX System Management reside on Host computers (those using the storage services of FabricX and/or those managing FabricX), these are referred to as Client Components and are shown in group 18. One component in particular, Raid++, has both a client and server instance, shown respectively in Host/client group 18 or server group 210. The C++ Command Line Interface CLI 200—referred to here as CLI++) component resides on any system where the user wishes to manage FabricX using a text based command line interface. This component in conjunction with the Java based CLI provide the user with control over FabricX. The security model for the CLI++ is Host based; the user/IP address of the Host is entered into the FabricX registry to permit/limit the user's access to system management. The CLI++ uses a client instance of Raid++ to hold the model of the FabricX instance and to manipulate the configuration of FabricX. The client resident Raid++ communicates with the server based Raid++ using a messaging scheme over TCP/IP.

The Java CLI 206 provides commands that use a different management scheme from that used by the CLI++. The Java CLI captures the user command string, packages it into an XML/HTTP message and forwards it to the CIMOM on the server group 210. The CIMOM directs the command to the CLI Provider which decomposes the command and calls methods in the various CIM providers, primarily the CLARiiON provider, to effect the change.

The Java GUI 208 provides a windows based management interface. It communicates with CIMOM using standard CIM XML/HTTP protocol. The GUI effects its changes and listens for events using standard CIM XML/HTTP. The Host Agent 204 provides optional functionality by pushing down to FabricX information about the Host. The following information is forwarded by the Agent explicitly to the CPP: Initiator type, Initiator options, Host device name used for push, Hostname, Host IP address, Driver name, Host Bus Adapter (HBA) model, HBA vendor string, and Host ID.

The Event Monitor 202 resides on a Host and can be configured to send email, page, SNMP traps, and/or use a preferred EMC Call Home feature for service and support. The configuration is performed on the CPP and the configuration information is pushed back to the Event Monitor. The Event Monitor may also run directly on the CPP but due to memory constraints may be limited in function in comparison to running on a Host computer.

Referring again to FIG. 11, the server side management components shown in group 210 interact with the user interfaces and tools for administering the system configuration and operation and to report on system operation. The server side components are comprised of middleware which resides between the user and the storage management components of the system which implement FabricX storage features. The server side components are basically divided into two groups, the legacy Raid++ module which provides the majority of the management services and the CIMOM and its providers. The Raid++ module uses a proprietary transport to communicate with management clients such as the CLI++. The Raid++ module maintains an object model of the system that it uses for managing the system; it updates the model periodically and on demand by polling the system to rebuild the model. The CIMOM CLARiiON Provider is essentially a wrapper for the Raid++ classes and methods and translates GUI initiated CIM XML commands into calls to Raid++ to fulfill requests.

The management functions not provided by Raid++ are provided by a series of CIMOM providers which are attached to a CIMOM. The CIMOM provides common infrastructure services such as XML coding/decoding and HTTP message transport. The Hosted services exclusively implemented in CIMOM providers are:

Analyzer Provider—Provides statistics about performance of traffic on ports on the switch;

CLI Provider—This provider implements services to allow CLI clients to access CIM managed services such as Clone, Analyzer, Fusion, and switch management;

Clone Provider—Provides services to manage the configuration and operation of clones;

Data Mobility Provider—Provides services to manage the configuration and operation of data migration between storage volumes transparently to the Host applications using the storage;

Fusion Provider—Provides services to configure and manage the combining of LUNs to create new LUNs of larger capacity;

Mirror Provider—Provides services to manage the configuration and operation of mirrors; and Switch Management Provider—Provides services to configure and manage the attached intelligent switch components owned by FabricX.

The above-described providers periodically poll the system infrastructure to build a model of the existing component configuration and status. If any changes are detected in configuration or status between the existing model and the newly built model, registered observers are notified of the changes. The model is then updated with the new model and saved for queries by the provider. The services of these providers can be accessed from other providers by formulating XML requests and sending them to the CIMOM. This permits providers which require the services of other providers (such as Raid++ through the CLARiiON Provider or the CIM local services such as persistent storage, directory services, or security) to access those services. Additionally Admin STL Driver Access through the server side provides access to these providers to the drivers and services of an SP as shown in group 218, including to the following drivers: Flare, Clones, Snaps, Fusion, and mirrors and services for switch management and data mobility.

Other Service Providers are shown in group 212 of the server group 210, and include the Persistent Data Service Provider, Security Provider, and Directory Service Provider. The Persistent Data Service Provider provides the CIMOM with access to the kernel-based PSM. The CIMOM uses the PSM to store meta-data relevant to the management system for example user names and passwords. The Security Provider supports authentication of users and authorization of user roles. The Directory Service Provider is used to obtain the network addresses of the systems in a domain of managed FabricX instances.

Reference will be made below to FIGS. 12-20 to describe a problem solved with the architecture including the software components described above with reference to FIGS. 1-11; however a general overview is now given. The inventors have critically recognized that Intelligent Multi-Protocol Switches (IMPS) 22 or 24 generally have limited memory resources available to support mapping virtual storage extents to physical storage extents. A typical switch today is capable of storing 10,000 maps per translation unit. Certain storage applications, such as a volume snapshot application can consume large numbers of these maps in support of a single volume. This further reduces the set of volumes that a translation unit can support.

This problem is addressed with the architecture of the present invention by using memory with the FabricX Storage Processor 26 or 28 to supplement the memory resources of the IMPS's translation unit and more efficiently use memory of each. The translation unit's memory resources are used to store a subset of the full set of extent maps for the volumes exported by the translation unit. Maps are loaded to the translation unit from the CPP both on demand and ahead of demand in a technique denoted as being a virtualizer application which is preferably software running in a SP or on the IMPS. In this embodiment, sequential access is detected and future requests are predicted using protection maps to mark the edges of unmapped regions. Access to a marked region in combination with the detection of sequential access triggers the preloading of additional maps prior to the arrival of the actual request.

I/O requests that arrive to find no mapped region are handled by loading the map from the control-processor. The control processor uses access data collected from the intelligent multi-protocol switch to determine which data to replace. Supported cache replacement algorithms include least-recently used, least frequently used. The IMPS hardware is used to detect need for extents prior to access and statistical data is collected on volume access to select which cache entries to replace. The mechanism further identifies volumes whose extent maps have become fragmented and triggers a process to reduce this fragmentation.

Figure 12:
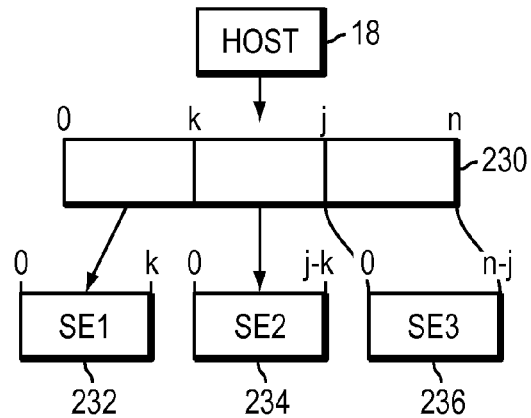
FIG. 12 shows an example of Virtualization Mapping from Logical Volume to Physical Storage employed in the Data Storage Environment of FIG. 1.

Referring to FIG. 12, Virtualization Mapping from a logical volume 230 to physical storage 232, 234, and 236 is shown. A Host 18 write to the volume in the region 0-K is mapped to physical block segment 232 (SE1), and likewise to the volume in the region 0-(j-k) to physical block segment 234 (SE2), and also to the volume in the region 0-(n-k) to physical block segment 236. In this simple example of Virtualization Mapping the Logical Volume 240a maps byte for byte with the storage element 242a. To be precise region 0 through k−1 of 230 is mapped to SE1 (232). Likewise region k through j−1 or 230 is mapped to SE2 (234) and region j through n−1 is mapped to SE3 (236).

Figure 13:
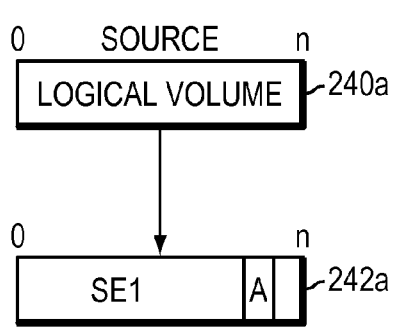
FIG. 13 shows an example of SNAP Processing employing another example of the Virtualization Mapping and showing before a SNAP occurs.
Figure 14:
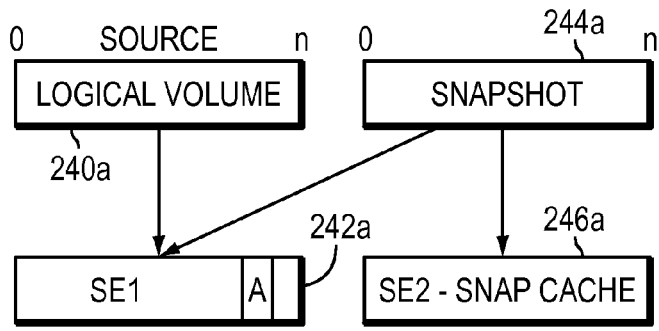
FIG. 14 shows another example of SNAP Processing employing the Virtualization Mapping of FIG. 12 and showing after a SNAPSHOT occurs but BEFORE a WRITE has taken place.

Referring to FIG. 13 and FIG. 14, such virtualization mapping is shown using the embodiment described above with reference to FIGS. 1-11, wherein FIG. 13 shows an example case of before a Snapshot or Snap, and FIG. 14 shows after a Snap where no writes have taken place. A source logical volume 240a (FIG. 13) is mapped to segment block 242a containing data "A" in the region 0-n. At the point when the Snap is created, the Snap Cache is merely associated with this Snap volume—the Snap volume does not actually map portions of its storage to the Snap Cache until a write takes place.

Figure 15:
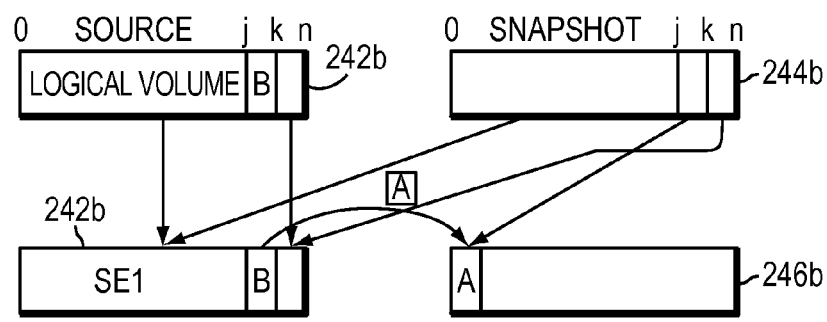
FIG. 15 shows another example of SNAP Processing employing the Virtualization Mapping of FIG. 12 and showing after a SNAPSHOT occurs and AFTER a WRITE has taken place.
Figure 16:
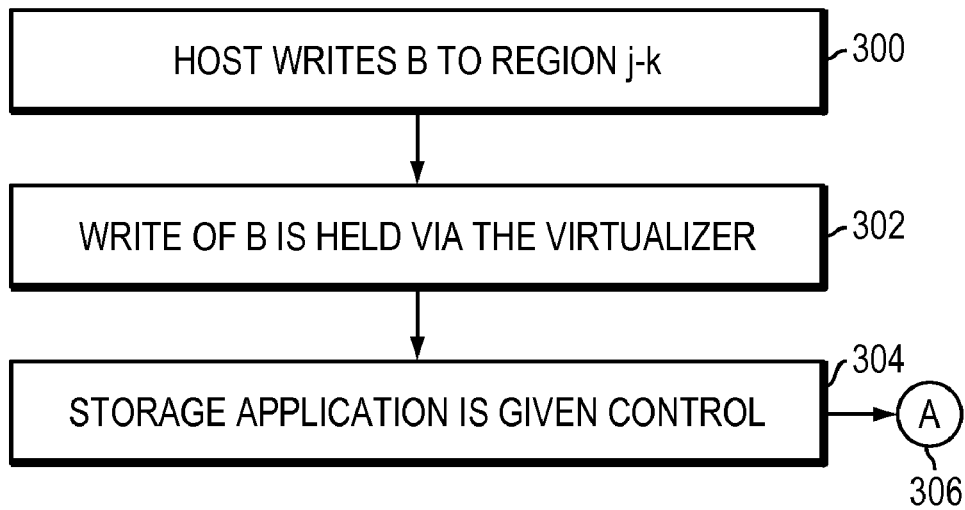
FIG. 16 is a flow logic diagram illustrating a method of managing the resources involved in the SNAP Processing shown in FIGS. 14-15.
Figure 17:
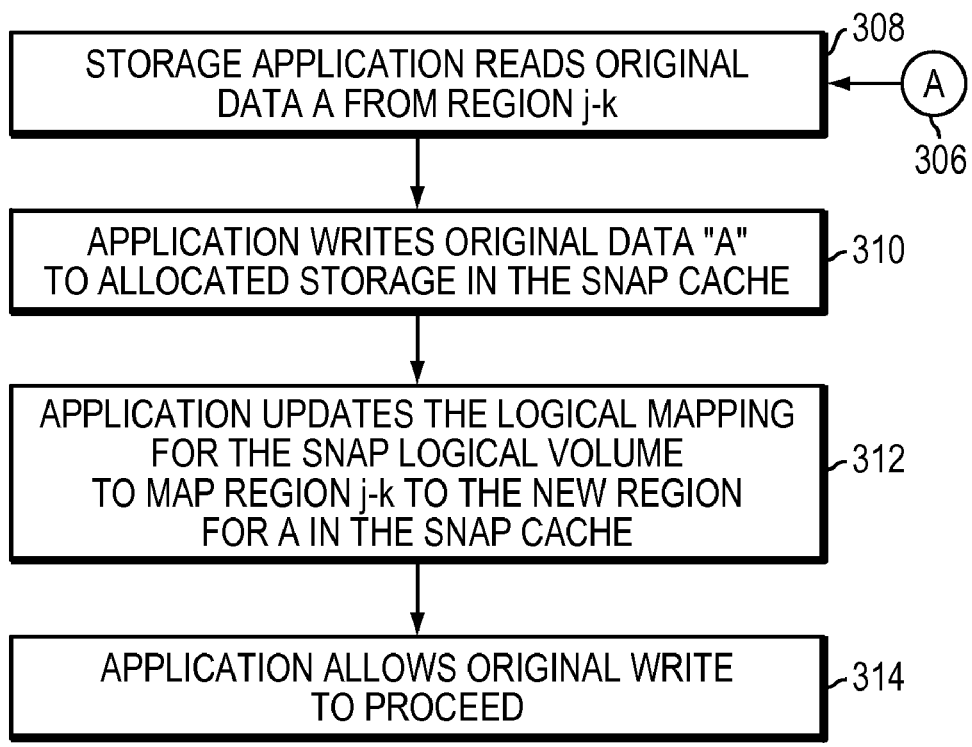
FIG. 17 is another flow logic diagram illustrating a method of managing the resources involved in the SNAP Processing shown in FIGS. 14-15.

An example of solving the problem described in general is shown with reference to FIG. 15, which depicts the example of a virtualization mapping case wherein a write takes place after the Snap. This example case is described in reference to method steps shown in Flow diagrams depicted in FIGS. 16 and 17. In step 300, the Host 18 writes data B to region j-k of logical volume 242b (FIG. 17). In step 302 the write of data B is held by the storage application. The application carrying out the methodology is given control in step 304 which flows into the "A" connecting step 306, which flows into its identically identified counterpart for FIG. 17.

Referring to FIG. 17, in steps 308 and 310, the application reads the original data A from region j-k of segment 242b and writes the data to the allocated storage in the snap cache 246b. In step 312, the application updates the logical mapping for the snap logical volume 244b to map region j-k to the new region for A in the snap cache 246b. Then in step 314 the application allows the original write to proceed.

Figure 18:
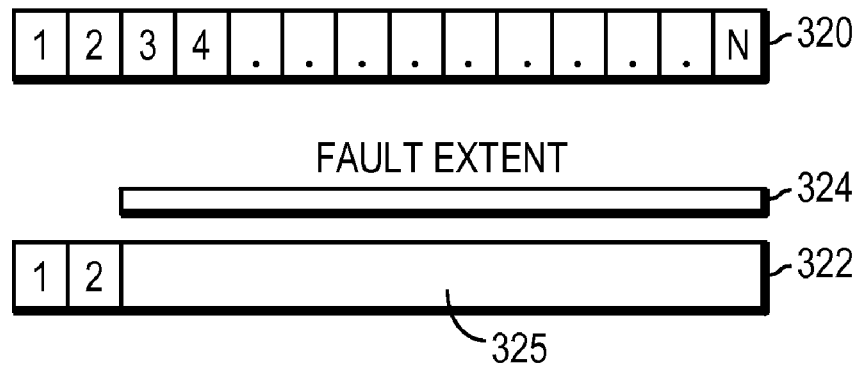
FIG. 18 is an example of a data structure involved in a process of identifying and handling volumes that have extent maps that have become fragmented during SNAP Processing and a process to reduce such fragmentation.
Figure 19:
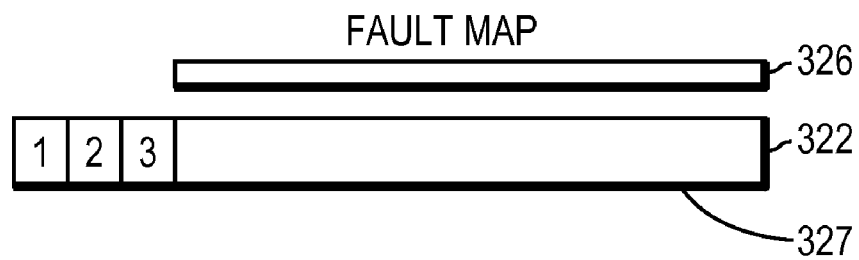
FIG. 19 is another example of a data structure involved in a process of identifying and handling volumes that have extent maps that have become fragmented during SNAP Processing and a process to reduce such fragmentation.
Figure 20:
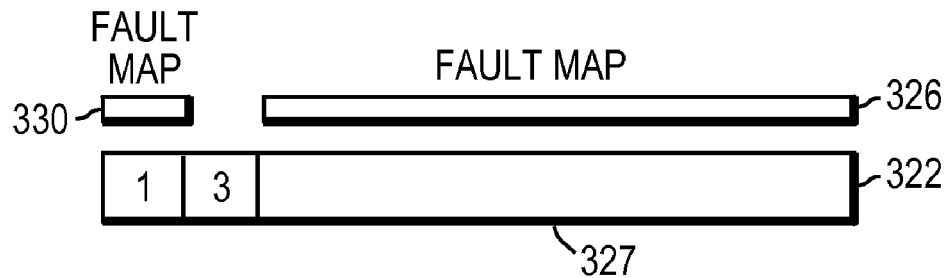
FIG. 20 is another example of a data structure involved in a process of identifying and handling volumes that have extent maps that have become fragmented during SNAP Processing and a process to reduce such fragmentation.

FIGS. 18-20 show fault extent mapping that is a further feature of the storage application. In this embodiment volumes whose extent maps have become fragmented are identified and a process to reduce this fragmentation is invoked. Referring to FIG. 18, volume 320 has been fragmented into N segments and volume 325 in conjunction with 324 represents a mechanism for preserving the image of 320. I/O operations to the region covered by 324 cause a fault which yields control of the I/O to the storage application. This simplified diagram illustrates a fault region that applies to both reads and writes however the switches and the SAL Agent and the IMPS API also support the ability to create fault-regions that apply only to reads or only to writes. In the example case, the CPP running the storage application takes the fault and updates the extent map for the volume to map region 3 and a fault map 326 is created for the region 327 (FIG. 19). To reduce fragmentation a new fault map 330 is created and the map entries 1 and 2 are combined (FIG. 20). This causes a reduction in the number of entries required to support the volume.

Figure 26:
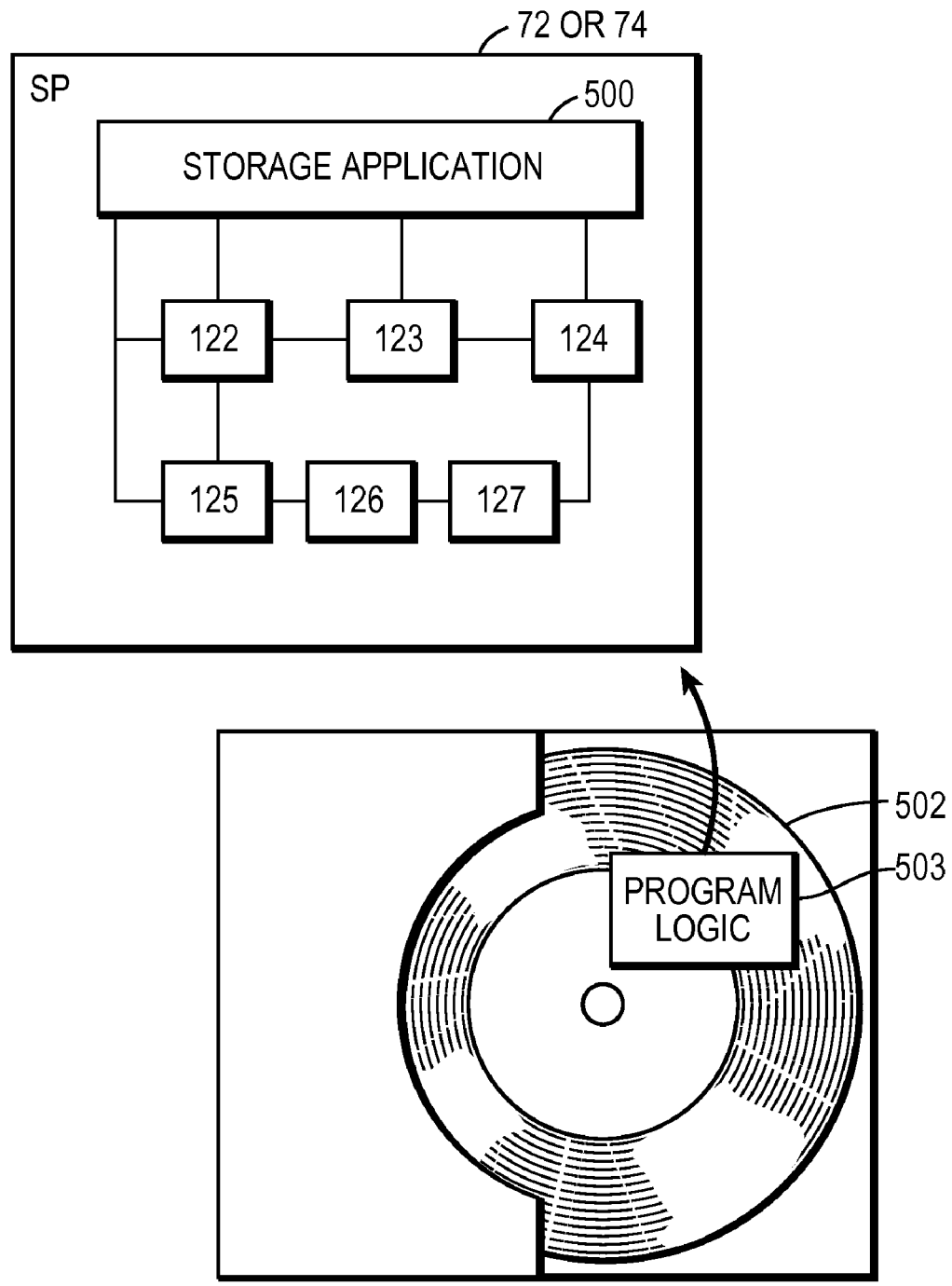
FIG. 26 shows a software application for carrying out the methodology described herein and a computer medium including software described herein.

FIG. 26 shows the storage software application 500 in an SP 72 or 74 and also including the software components 122-27 of FIG. 7. Computer-readable medium 502 includes program logic 503 that may include any or all of the software 122-127, and 500. Such a medium may be represented by any or all of those described at the beginning of this Detailed Description.

FIGS. 21-25 describe an embodiment for ensuring consistent error presentation to Hosts accessing virtualized volumes and for preserving structured error handling, and a general overview is now given. In general, it is recognized by the inventors that without this invention virtualizing intelligent switches process I/O requests from Host computers at wire speed and do not present these requests to storage applications. Errors that occur while processing these requests may present an inconsistent error behavior to the Hosts accessing the volume due to these errors originating from disparate back-end storage devices. Furthermore certain errors would be better handled and masked according to the structure and semantics of a virtual volume.

In this embodiment the storage application (FIG. 26) is given control of a request when exceptional conditions occur such as an error when processing the request. This invention provides a means of handling errors in a hierarchical manner allowing storage applications to be structured in a manner consistent with the structure of a virtual volume. Errors are presented to the applications using a bottom-up delivery algorithm that allows lower-level applications to mask errors from higher Layers. Applications are given the initial context of the I/O request along with the error allowing them to only incur additional overhead when exceptional conditions arise. The storage applications process and transform errors from disparate back-end devices and unify the presentation of these errors to make the volume appear as a single device to the Hosts that access it.

Figure 21:
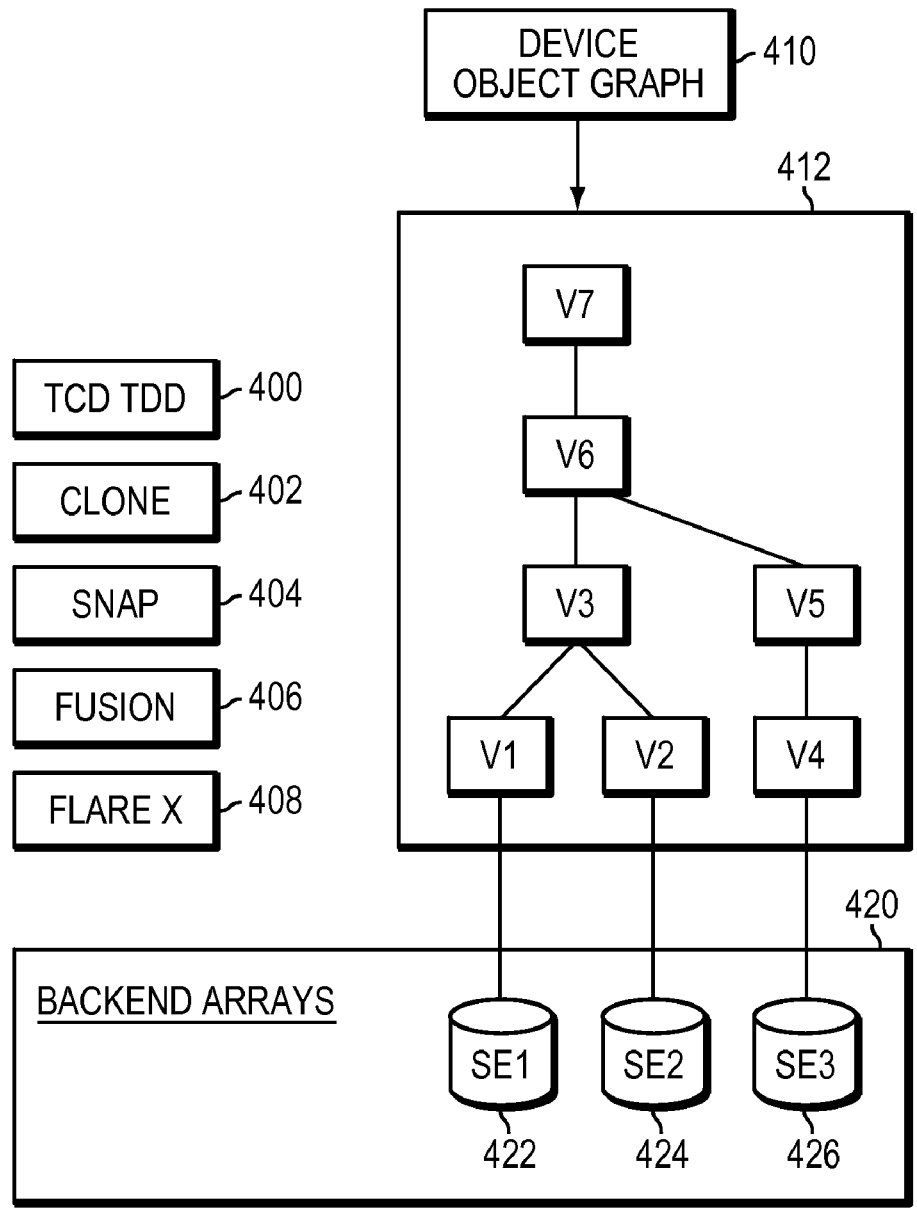
FIG. 21 is a schematic showing a hierarchical structure employed in the Data Storage Environment of FIG. 1 within the storage processor of FIG. 3 for allowing storage applications to be managed for consistent error presentation or handling.

Referring to FIG. 21, a schematic block diagram of elements of the architecture shown in the above-described Figures is presented to show the relationship of the Layered drivers with the Device Object Graph 410 and its logical volumes in group 412, and the relationship to Backend arrays 420 including physical volumes 422-426 to which the logical volumes are mapped. The Layered drivers TCD/TDD 400, Clone 402, Snap 404, Fusion 406 and FlareX 408 are part of Layered drivers 123 discussed above with reference to FIG. 6. Generally each driver presents volumes to the Layer above it. For example the FlareX driver imports storage extents from the back-end array and presents the identity of such extents to Layered drivers above, e.g. Fusion, and Clone drivers.

Regarding nomenclature used for presenting an example of how this embodiment functions, in the volume group 412, V7 represents a "top level" volume, or one that is capable of being presented to a Host. V6 represents a cloning volume. This volume has two children, V3 and V5, where V3 is the source for the clone and V5 is its replica. Similarly V1 and V2 are children of V3 while V4 is a child of V5. It is the children at the bottommost Layer that are presented by the bottommost driver in this example (FlareX) to map the storage extents of the back-end array that are of interest.

Figure 22:
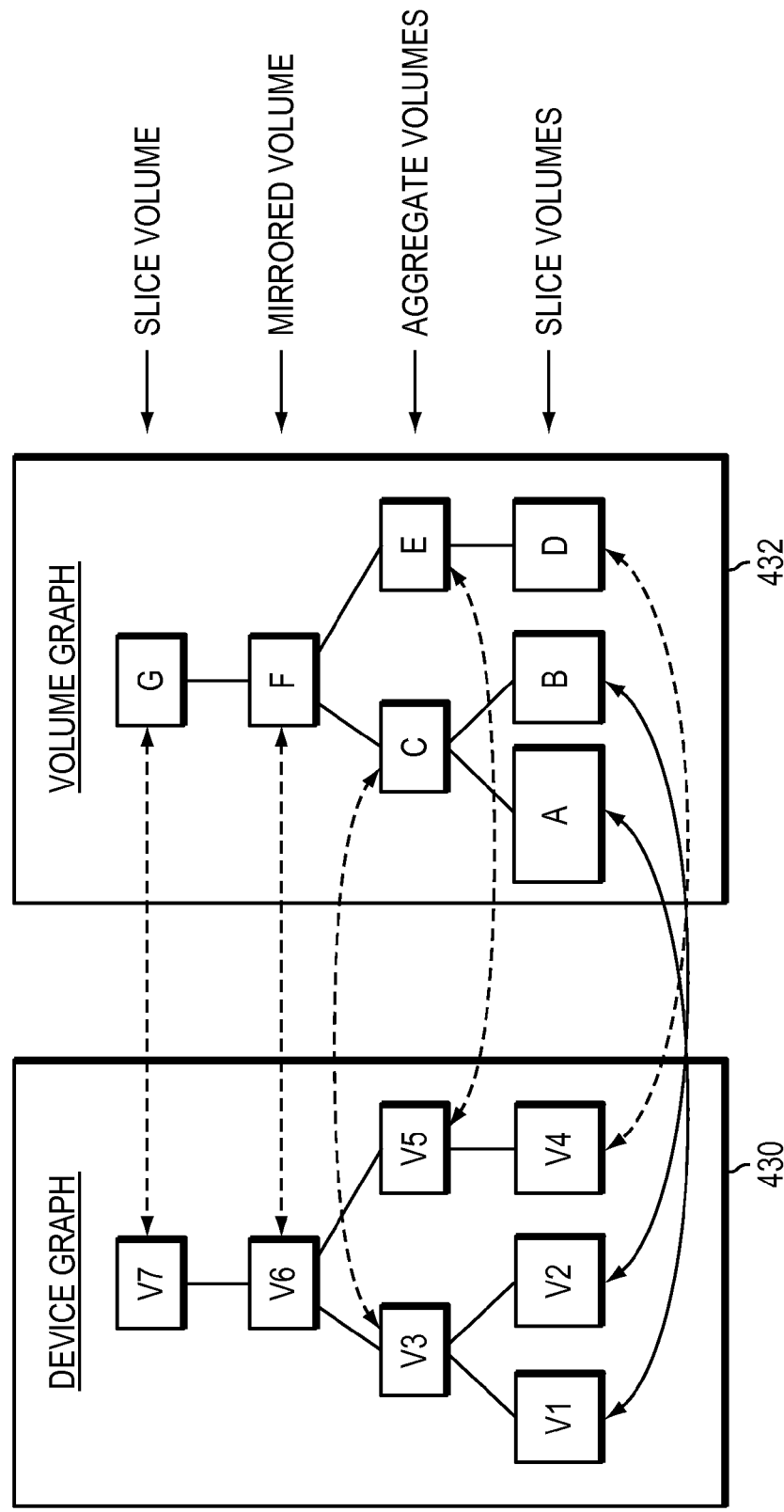
FIG. 22 is a schematic of associations present when handling errors for consistent error presentation or handling with the hierarchical structure of FIG. 21.

Referring now to FIG. 22, a Device Graph 430 and a Volume Graph 432 illustrate the relationship between drivers and volumes. The Volume Graph is a data structure that is the same as a known Device Graph in known Clariion architecture. The Volume Graph maps to the Device Graph in order to present information needed for virtualization by the IMPS, and provides a mechanism by which errors can be received and handled by the Device Drivers. In an effort to have the Host seamlessly communicate with software components discussed herein in the same way it would if communicating with a data storage system such as an EMC Symmetrix or Clariion. Virtualization Software in the SP accomplishes this goal and also by communicating with software in the IMPS to present information about the volumes consistently, including presentation and management of errors. The Volume Graph provides a mechanism by which an error can be introduced into the Device Graph and presented to the Host.

Information extracted from the IMPS through its API includes the type of I/O operation (e.g., read or write), a logical volume target or in this context a virtual target (VT), a virtual LUN (v-LUN), physical target, a physical LUN, block address of a physical device, length of request, and error condition. The error condition is received and that identifies the bottommost affected volume and delivered to the bottommost affected object.

Objects in the Volume Graph have one-to-one congruity with objects in the Device Graph, as follows. At the top Layer (V7) the Volume Graph Object G represents a slice volume. A slice volume represents a "slice" or partition of its child volume. It has only one child volume and presents a (possibly complete) contiguous subset of the data of this child volume. The next Layer down (V6) is congruently mapped to element F represents the mirrored volume. V3 represents an aggregated volume consisting of the concatenation of volumes V1 and V2. Volume V5 is a slice volume that presents the data of V4. Slice Volume Objects A, B, and D, are congruent with Device Graph Objects V1, V2, and V4, respectively.

Upon receiving an error, the Bottommost Volume Graph Object will deliver the error to its corresponding Device Graph Object. The Device Graph Object as the owner of the error can decide how to handle, e.g. propagate the error up the Layer stack, or deal with it directly and not propagate it. Two goals are carried out in the error presentation: consistent presentation to the Host, and masking of errors which involves using independent capabilities of the FabricX architecture to solve problems for the Host at the unique middle-Layer level of a FabricX instance.

Figure 23:
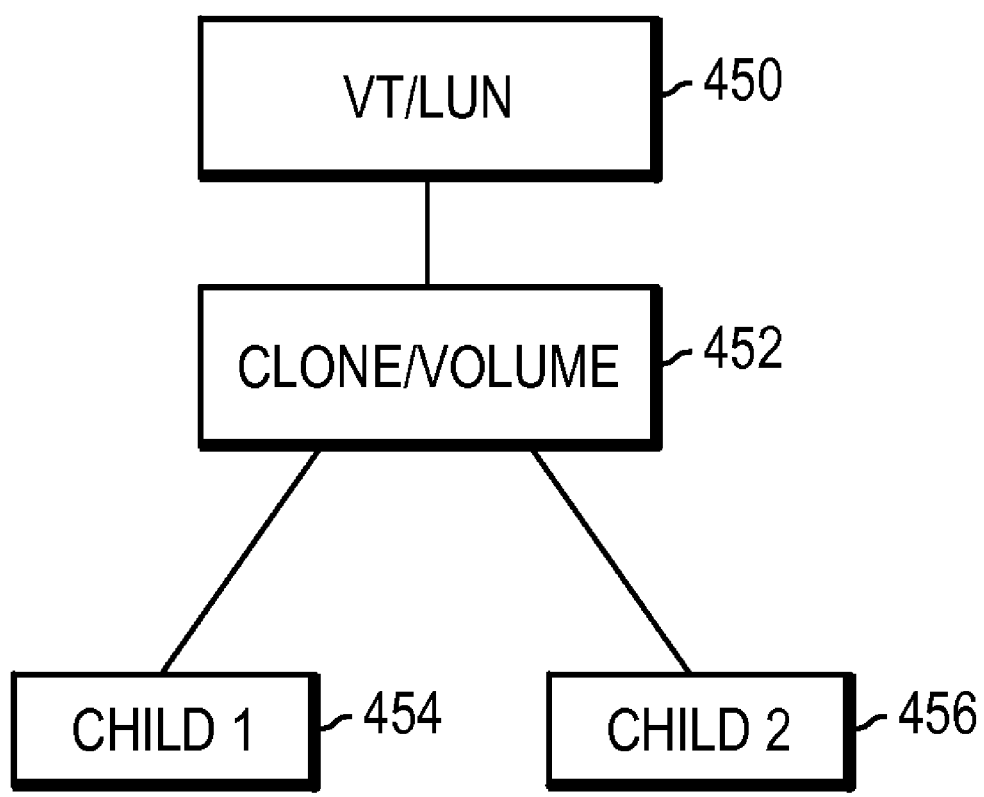
FIG. 23 is an example of a structure implementing error handling for consistent error presentation or handling, and which is a simplified version of the type of structure shown in FIG. 21.
Figure 24:
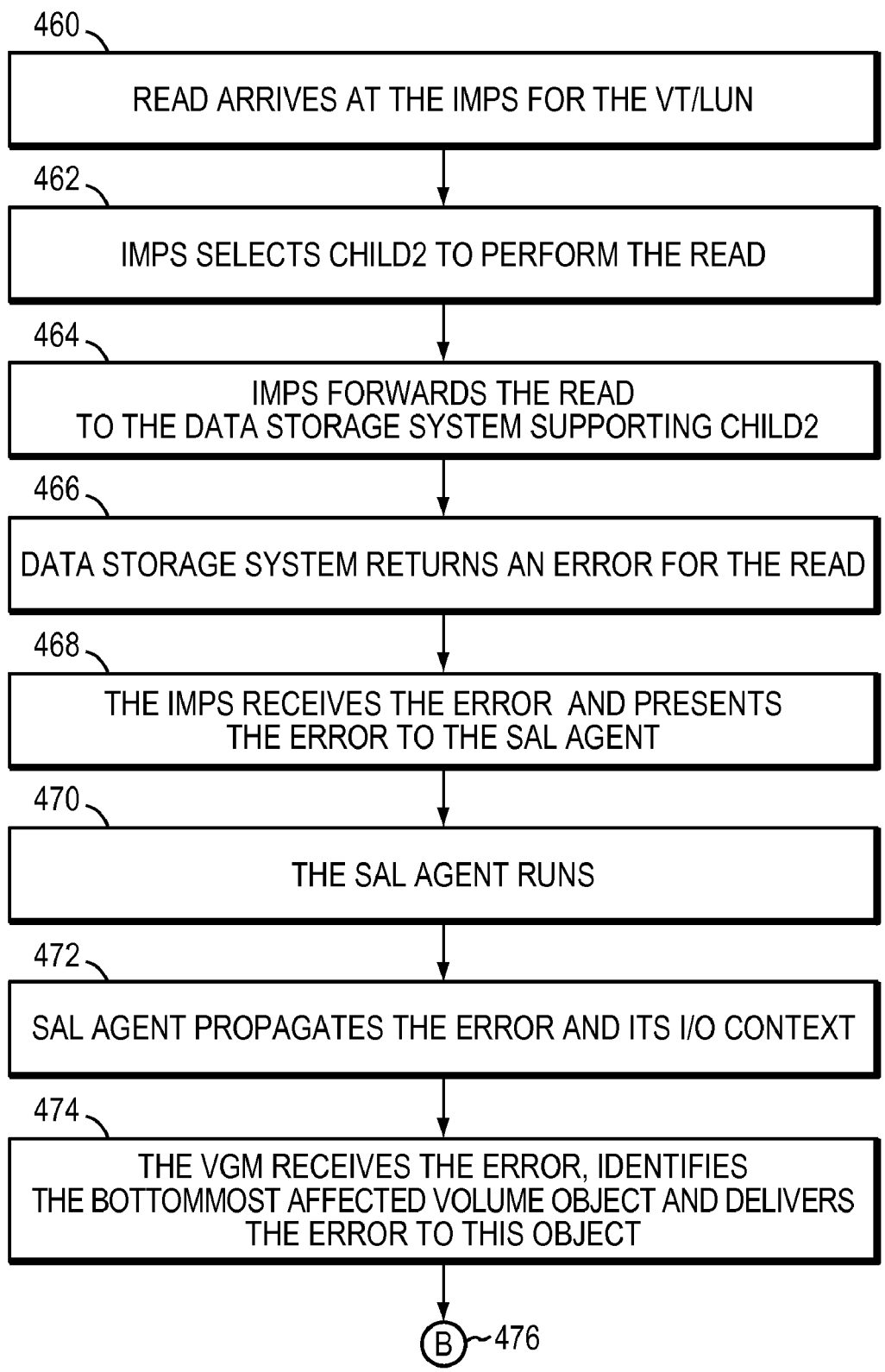
FIG. 24 show method steps for consistent error presentation or handling and using the example structure of FIG. 23.
Figure 25:
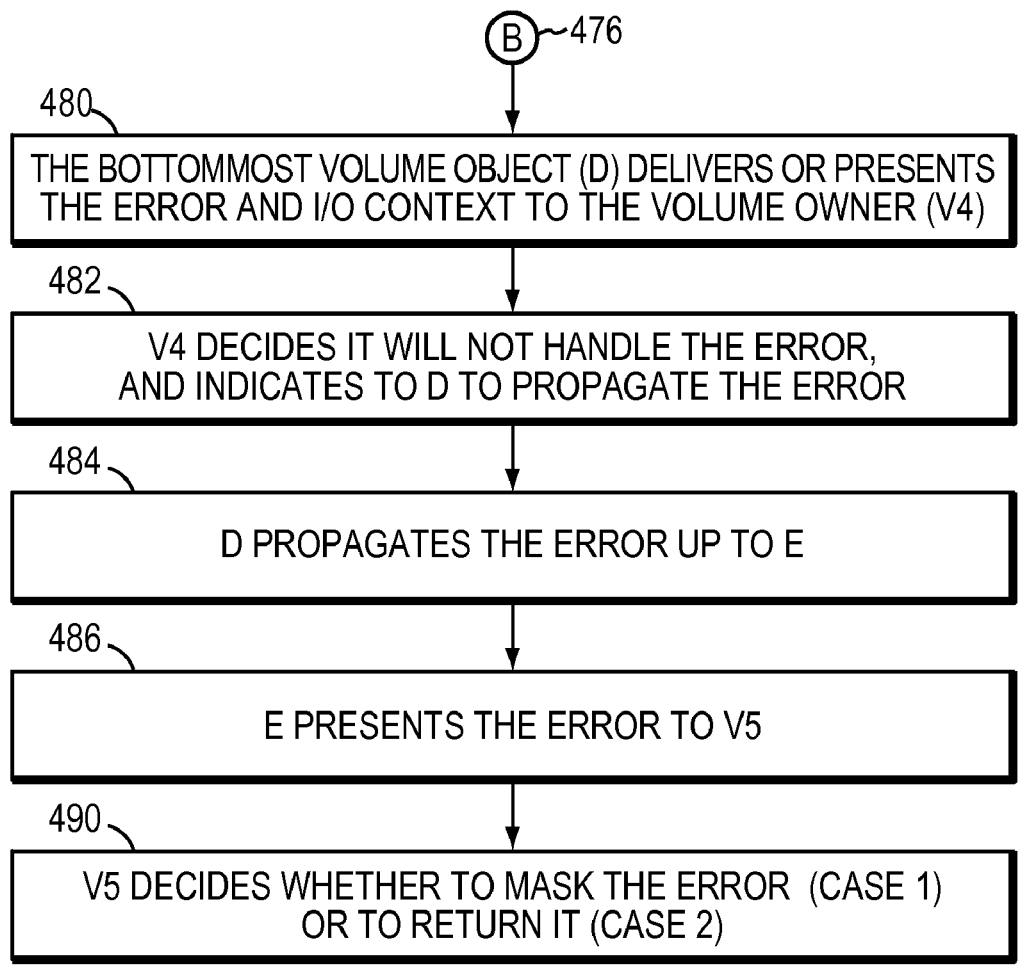
FIG. 25 show additional method steps for consistent error presentation or handling and using the example structure of FIG. 23.

Reference is made below to FIGS. 23-25, wherein an example of handling of an error for either consistent presentation to the Host or masking of the error while handling the error at the FabricX instance or middle switch level is shown. In the example shown in FIG. 24, Virtual Target (VT) LUN or VT/LUN 450 is loaded with a Volume presentation of a Clone or Clone/Volume 452 and having two Children Volumes, i.e. "Child1" 454 and "Child2" 456. In this example case, Child1 and Child2 are synchronized, Child1 represents storage for one type of Data Storage System, for example an EMC Symmetrix, and Child2 represents storage for another type of Data Storage System, for example an EMC Clariion.

In handling the error in this example, there are two cases for handling in keeping with the goals discussed above: (a) Case 1—error is not delivered back to Host but rather handled by a Device Object at the FabricX instance level; or (b) Case 2—error is transformed to have the error personality of FabricX. Each method of handling is explained in the example, continued with the flow-diagrams of FIGS. 24 and 25.

Referring to FIG. 24, in step 460, an I/O command in the form of a read arrives at an IMPS for the VT/LUN. In step 462, the IMPS selects Child2 to perform the read. The IMPS forwards the read to the data storage system supporting Child2 in step 464. That data storage system returns an error for the read in step 466. In step 468, the IMPS receives the error and presents the error to the SAL Agent in the IMPS in the preferred embodiment, but one skilled in the art will recognize that it could run elsewhere, including in an SP. In steps 468 and 470, the error is propagated from the SAL Agent running on the IMPS to the SAL CPP running on the SP. The SAL CPP then delivers the error to the Volume Graph Manager. The Volume Graph Manager VGM identifies the bottommost affected volume object and delivers the error to this object in step 474. Connecting step 476 labeled "B" connects with the identically numbered and labeled step on FIG. 25.

Referring to FIG. 25, in step 480, the bottommost object (D) delivers or presents the error and its I/O context to the Volume Graph Object Owner (V4). V4 decides it will not handle the error and indicates to D to propagate the error, which D does up to E, shown in steps 482 and 484. E presents the error to V5 in step 486. In step 490 V5 decides whether to mask the error (Case 1) and handle it itself at the FabricX level, or to return it to the Host (Case 2). If Case 2 is selected, then the error is transformed to have the error personality of FabricX. In this example, that means that V7 updates the error presented by the storage system and using the SAL Agent to modify the error on the switch via the IMPS API. This in turn causes the error to be returned to the Host with modified content, but from the switch or FabricX level.

Figure 27:
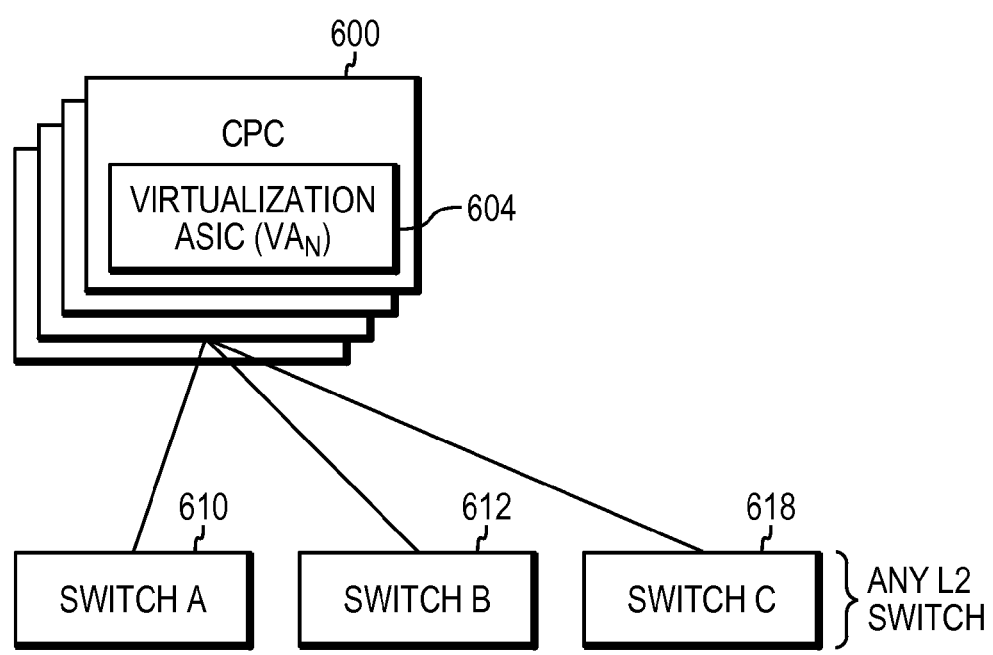
FIG. 27 shows an architecture including a plurality of control path processors and paired virtualization ASIC including intelligence for virtualization of storage units and switch management related to switches in a data storage environment.

FIG. 27 shows an architecture including a plurality of control path processors (CPC) 600, each with a Virtualization application-specific integrated circuit (ASIC) 604 on board. An ASIC is an integrated circuit customized for a particular use, rather than a general-purpose use. As feature sizes have shrunk and design tools improved, complexity and functionality possible in ASIC's have grown from 5,000 gates to over 100 million. The new architecture leverages the new ASIC technology for advantages discussed herein.

The CPC includes intelligence for virtualization of storage units and switch management related to switches 610-618 in a data storage environment. The CPC is essentially identical in functional capability to the CPP of FIGS. 2-3, and 5-6, and capable of interacting with the DAE of FIG. 4, and providing similar capability of the Instance 27 of FIG. 1. The CPC has advantages over the CPP because it includes the Virtualization ASIC that includes the intelligence of the IMPS of FIGS. 1-2, 5 and 7, essentially obviating the need for a separate IMPS from a switch vendor. The CPC has costs and reliability advantages over the architecture of the CPP. The CPC is capable of interacting with all of the components, hardware and software included, that the CPP interacts with providing all of the Functionality discussed in FIGS. 8-25, and can be represented, at least in part, by the Program Logic of FIG. 26.

In particular, as described above, the Architecture of FIG. 27 includes the capabilities discussed with reference to the embodiment shown in FIG. 1, including the following features. The new architecture also allows for management of resources to be moved off of storage arrays themselves, allowing for more centralized management of heterogeneous data storage environments. Advantages provided include: (1) centralized management of a storage infrastructure; (2) storage consolidation and economical use of resources; (3) common replication and mobility solutions (e.g., migration) across heterogeneous storage subsystems; and (4) storage management that is non-disruptive to Hosts and storage subsystems.

The Architecture of FIG. 27, includes the virtualization ASIC's embedded in the CPC node. Preferably there is one ASIC per CPC node. Storage Applications, such as those discussed in the FIGS. 8-26 port directly to the ASIC. Performance scales linearly with additional nodes, but the CPC may be managed and developed separately from the Virtualization ASIC. Low cost hardware and reduced components makes this viable for low-end solution. This embodiment is not dependent on a particular switch vendor, for a particular IMPS, and it functions well in an iSCSI or Fibre Channel protocol-directed data storage environment.

Figure 28:
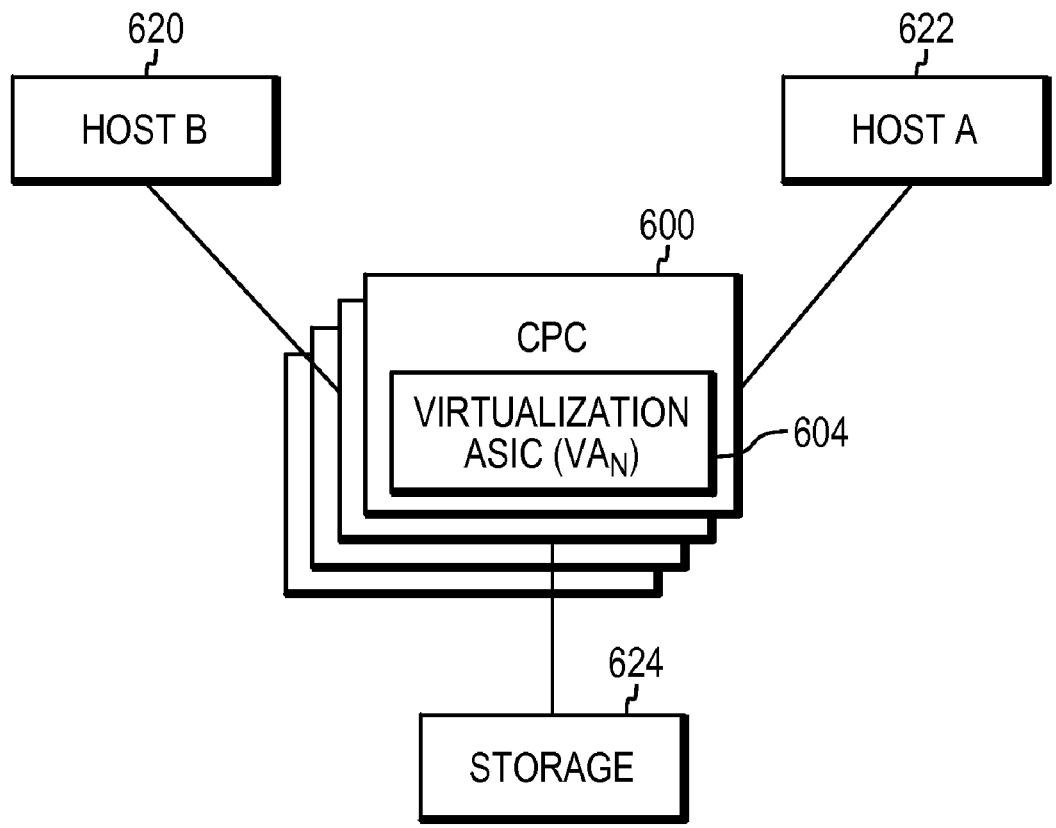
FIG. 28 shows another embodiment of an architecture including a plurality of control path processors and paired virtualization ASIC including intelligence for virtualization of storage units and onboard switch management and switches in a data storage environment including at least one data storage system.

FIG. 28 shows another embodiment of an architecture including a plurality of control path processors 600 and paired virtualization ASIC 604 including intelligence for virtualization of storage units and onboard switch management and switches in a data storage environment including at least one data storage system 624. The CPC can perform virtualization of logical volumes or LUNS on the storage system to present to Host A or B 620-622, acting as a so-called Storage Area Network (SAN) on a controller.

Figure 29:
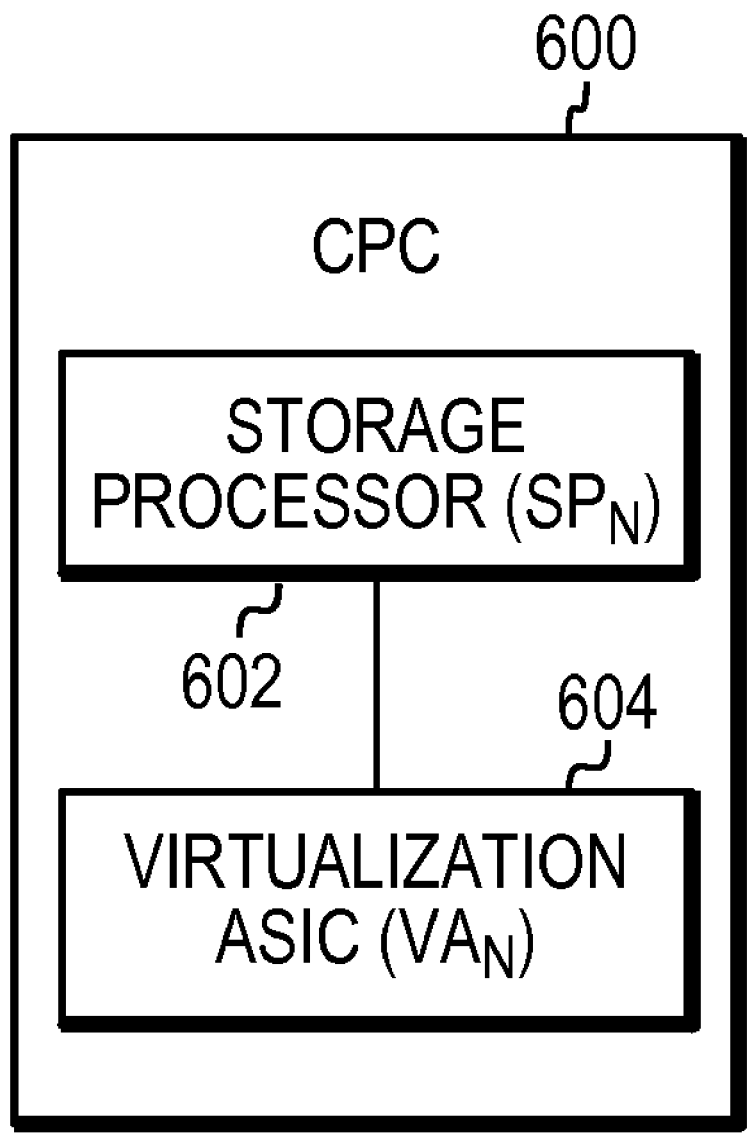
FIG. 29 shows an embodiment of a control path processor like the control path processor shown in FIG. 27 and the embodiment of the control path processor shown in FIG. 28 including paired storage processors and virtualization ASIC's.

FIG. 29 shows the 600 including paired Storage Processors (SP$_N$) and virtualization ASIC (VA$_N$) 604. This view is intended to show how the CPC is scalable to meet the needs of the storage network and can grow by simply adding CPC's with paired $SP_N$'s and $VA_N$'s.

Figure 30:
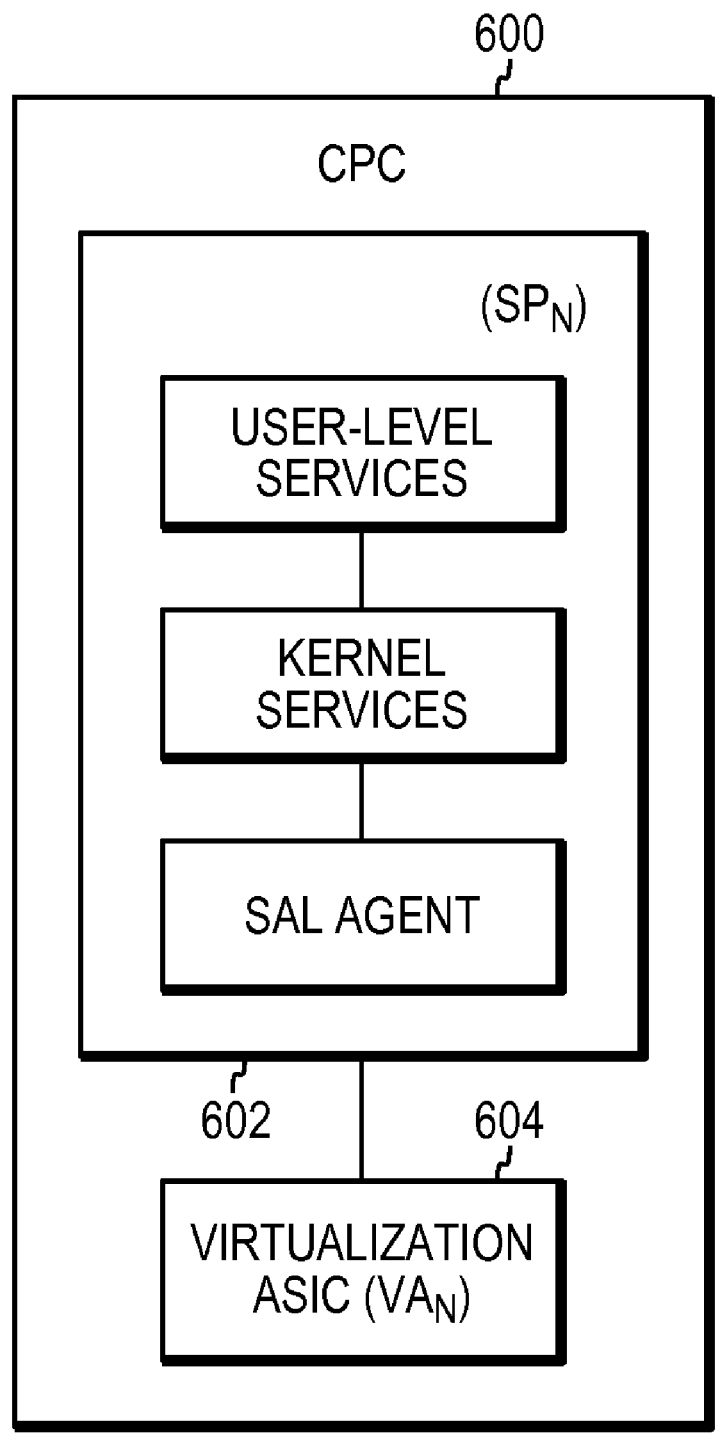
FIG. 30 shows more detail regarding functional elements of an embodiment of a storage processor on the control path processor of FIG. 29 and also shows the pairing of the storage processor with the virtualization ASIC's.

FIG. 30 shows more detail regarding functional elements of an embodiment of a SP on the CPC of FIG. 29 paired with the virtualization ASIC. The SP 602 includes, similar to the CPP and SP shown in FIG. 6, User-Level Services, Kernal Services, and a Switch Abstraction Layer (SAL) Agent. The Virtualization ASIC carries out at least some functionality that had been carried out by the IMPS in FIG. 7, while the CPC carries out other functions that had been carried out by the IMPS.

Figure 31:
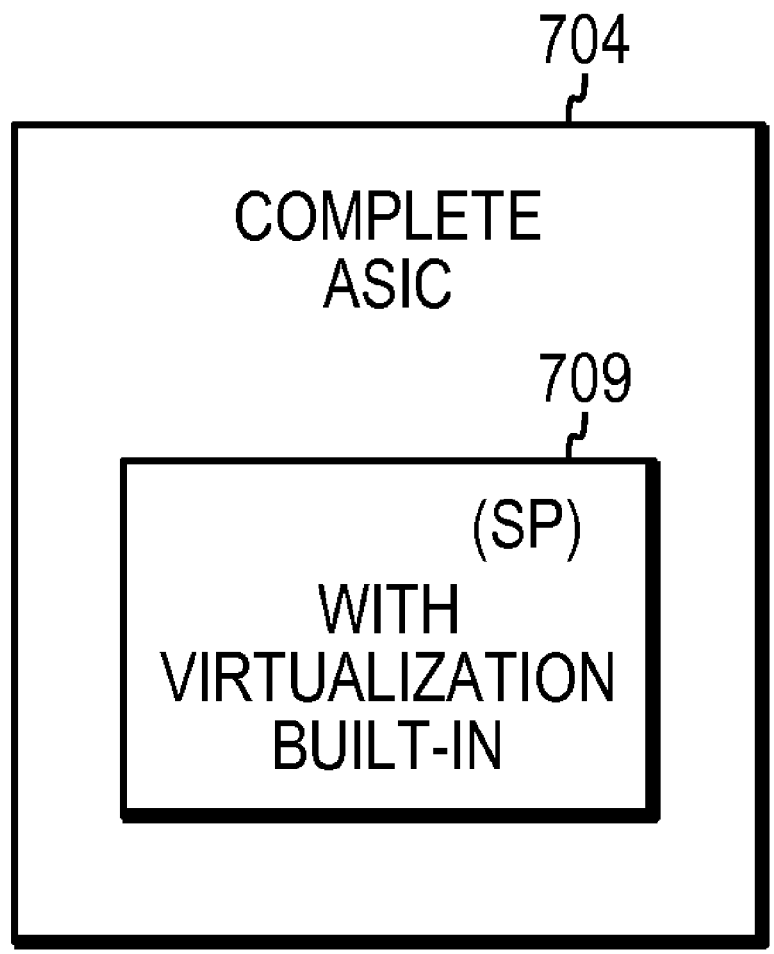
FIG. 31 shows an embodiment of a complete ASIC's including an integrated storage processor with virtualization circuitry built in to the complete ASIC's.

FIG. 31 shows an embodiment of a complete ASIC 704 including an integrated storage processor 709 with virtualization circuitry built in to the complete ASIC. In this embodiment one ASIC embeds circuitry that carries out the complete functionality shown in FIGS. 6 and 7, and can carry out all the functionality described in FIGS. 8-25, and may be executed by the Program Logic of FIG. 25.

Alternative Embodiment of Architecture

FIGS. 32 through 43A-G describe an alternatively embodied architecture for carrying out methodology described herein, including uses and methods described in reference to these figures. Some of the advantages of this alternative embodiment include significantly increasing the scalability to provide network-based block storage virtualization services that cover an entire enterprise data center and maintain that coverage as the data center grows. The architecture can support scale that allows an instance to grow as the data center grows. It increases the reliability and availability in a complementary and enhancement fashion to existing data storage systems, such as the preferred EMC Symmetrix or Clariion data storage system. It provides a single point of management for an instance that covers management of storage virtualization, and the network and array resources needed to provide this virtualization. It also yields an architecture that is flexible in accommodating new and disparate block storage virtualization technologies.

Figure 32:
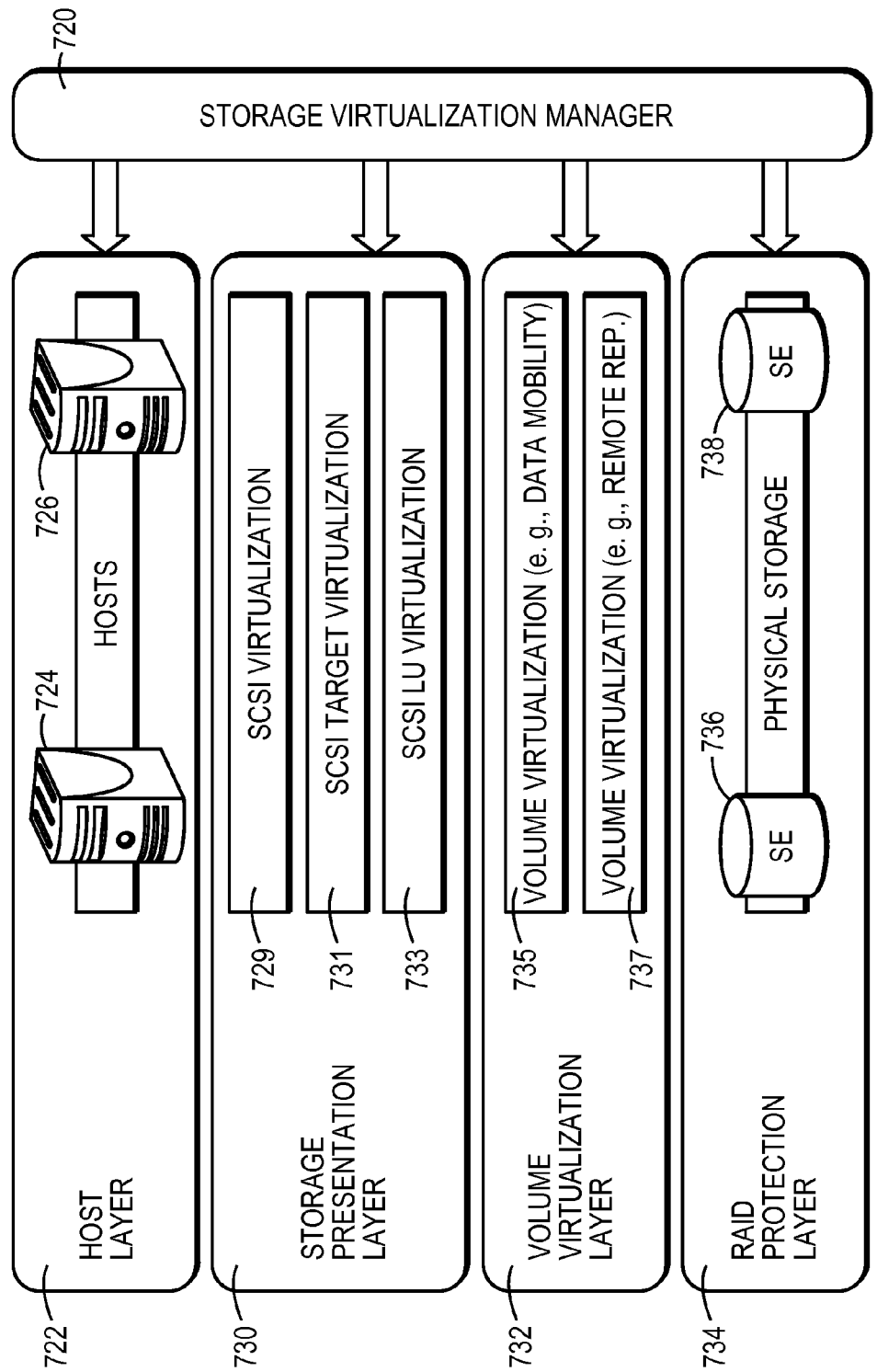
FIG. 32 shows an alternative embodiment of an architecture useful for virtualizing networked storage resources and including a virtualization manager that manages logical layers used for virtualizing and presenting resources.

Referring to FIG. 32, a logical structure of an alternative architectural embodiment is shown, which in a preferred embodiment can be implemented by hardware and/or software provided by EMC corporation. It is envisioned that it can be provided with EMC's preferred Invista system for storage management with virtualization. Thus, as used below, a preferred Invista entity, such as an Invista Instance may be forward looking in view of the teachings herein based on the critical recognitions of the inventors. Invista is merely one envisioned embodiment and many others will likely occur to one skilled in the art in view of the teachings herein.

FIG. 32 shows a logical structure of instances managed in an architecture that includes a Storage Virtualization Manager 720, including a Host Layer 722, Storage Presentation Layer 730, Volume Virtualization Layer 732, and RAID Protection Layer 734. The Host Layer includes Hosts 724 and 726. The Storage Presentation Layer includes SCSI Virtualization 729, SCSI Target Virtualization 731, and SCSI LU Virtualization 733. The Volume Virtualization Layer includes Volume Virtualization 735 (e.g. data mobility) and Volume Virtualization 737 (e.g. remote replication). The volume virtualization layer may include fewer or more volume virtualizations with data mobility and remote replication being only two such examples. The RAID protection Layer includes physical storage with storage elements (SE) 736 and 738. Although SCSI protocols are discussed throughout, one skilled in the art will recognize these are applicable to iSCSI protocols or the like as well.

The Manager 720 manages two major logical layers; the Storage Presentation Layer and the Volume Virtualization Layer. These Layers are realized by preferred EMC Invista hardware components including pairs of Service Processors (SP's) forming Control Processor Clusters (CPC's), Data Path Controllers (DPC's), and Appliances (APPL's), by Layer 2 FibreChannel switches, by IP switches, and by Physical Storage Arrays. These hardware elements and their associated software are discussed in reference to Figures described above, including FIG. 32, and also with regard to FIGS. 35 and 38 referenced below These components are managed by a highly-available management service called the preferred Invista Virtualization Manager 720 that maintains communication paths to the preferred Invista components, Fabric, and Array components via an IP service network and a SAN. Each Layer has its own requirements for the execution environments that support it. A key aspect of the architecture is its ability to realize these execution environments with different physical deployments. This allows the architecture to serve the needs of both small and large data centers with cost effective deployments for each.

The Storage Presentation Layer is responsible for exposing virtualized block-storage to Hosts and their applications. This Layer presents LUN's to Hosts on Virtual Targets. Each virtualized volume is typically presented to one or more Hosts on two or more independent fabrics in the SAN. This is the only Layer of the system directly visible to the Hosts and from the Host's perspective this Layer acts much like an array. The Layer implements the SCSI personality of the preferred Invista instance. Structurally, there are three pieces to this Layer; SCSI Virtualization 729, SCSI Target Virtualization 731 and SCSI LU Virtualization 733. The SCSI Virtualization component is responsible for interfacing with the Management Server's Mediation Layer (See FIG. 33) for provisioning data in the SCSI Target Virtualization and SCSI LU Virtualization components.

The SCSI Target Virtualization component is responsible for handling all requests at the SCSI Target level. Many non-read/write SCSI commands can be completely serviced at this level (in some cases after having obtained some initial information from the SCSI Virtualization and SCSI LU Virtualization components). The nature of a SCSI Target is that it exists in a single fabric. It can be reset and logged in or out of the fabric independently of other SCSI targets. The presentation of an LU to a Host must be made highly available by presenting the LU on two or more SCSI Targets that are placed in separate fabrics. While a SCSI Target should be reliable it does not need to be continuously available due to the replicated nature of the presentation.

The Volume Virtualization Layer 732 is responsible for preserving the Hosts' data while performing various transformations on the data. Typical transformations in this Layer include local replication for data protection across arrays, data mobility for array lease rollover and ILM functions, point in time data copies for archiving, and remote replication for disaster recovery.

Volume Virtualization typically includes the use of acceleration hardware, DPC's with ASIC's, to perform transformations on the layout of data at I/O speeds, but it can also be realized by the functions within a typical storage array or by virtualizations provided by an appliance. Some volumes may undergo multiple Volume Virtualizations. The ability to compose different network-based features together by linking these virtualizations together via routing is a key principle that achieves flexibility in the architecture and the ability to adopt new technologies quickly.

The Execution Environment for Volume Virtualization requires redundant processing components to ensure that I/O requests can be serviced in the presence of failure. Multiple Volume Virtualization Execution Environments can be added to an instance to scale the number of volumes that it supports. A typical Volume Virtualization Execution Environment consists of a CPC formed from a pair of Storage Processors and two or more DPC's with integrated ASIC's for accelerated virtualization.

The Volume Virtualization Layer 732 implements storage features in a Storage Area Network (SAN). It consists of Volume Virtualizers 735 and 737 which both consume and expose SCSI Logical Units (LU's), implementing one or more Volume Virtualizations (features). These Volume Virtualizations may range from simple volume management (partitioning and concatenation) to complex features such as asynchronous mirroring and snapshots. Various kinds of Volume Virtualizers may exist, with possible specialization for a specific set of tasks.

The Volume Virtualization Layer exposes a set of LU's to the Storage Presentation layer. In other words, the Storage Presentation Layer consumes LU's exposed by the Volume Virtualization Layer. The LU's are presented to the Storage Presentation Layer via Initiator Target LUN (ITL) data structures, which provides SCSI endpoint semantics. Each ITL represents a point of access from a Host initiator to a logical unit via a given target. Here, the ITL's only function is it to provide SCSI connectivity between the two layers.

For the Storage Presentation Layer, the Volume Virtualization appears as a SCSI Target to which it can login and send I/O. One skilled in the art will recognize that the SCSI Virtualization layer and the Volume Virtualization layer can be combined within the same processor (e.g. the DPC). In such a manifestation, the linkage between the two need not be via a SCSI routing and can be directly controlled by software (e.g. the embodiment shown in FIG. 38). The Volume Virtualization Target represents this entity. Depending on the type of the Volume Virtualizer, this could either be a virtual target or a physical target. Volume Virtualizers are configured by a Management Server (discussed in reference to FIG. 33 below), which controls which LU's they expose and consume. A typical preferred Invista instance will have multiple Volume Virtualizers functioning independently, which enables a high degree of scalability and also provides failure containment. A typical volume will be routed though multiple volume virtualizations, using one or more Volume Virtualizers. That is Volume Virtualizers can consume volumes from other Volume Virtualizers also in order to realize more complex virtualizations.

The inventors have critically recognized that Volume Virtualizers should be highly available devices, exposing volumes via multiple ports, and consuming storage using multiple paths, and well as having internal redundancy. In accordance with this recognition, this alternative architecture allows for Volume Virtualizer failover for increasing the availability of a volume.

Volume virtualizations can be grouped into two classes: pass-though virtualizations, where the consumed LU is mapped 1:1 to the exposed LU, and the contents of the two are identical, and transforming virtualizers, where this characteristic does not hold. Pass-through virtualizations can be removed easily without affecting the Host's view of the storage. Transforming virtualizations cannot be transparently removed without data reorganization. Another characteristic of a Volume Virtualizer is whether the state of the virtualization exists completely on the SAN, or whether parts of the state exist only within the Volume Virtualizer itself. Mirrors, although do not transform data, are considered to be transforming type virtualizations in the sense that they are not 1:1 mapping of the back-end.

Pass through virtualizations and virtualizations whose state completely exists in the SAN have the characteristic that the virtualization can be atomically moved from one Volume Virtualizer to another upon the failure of the first Volume Virtualizer without service interruption (provided that the new virtualizer can be brought online within I/O timeout limits).

Different kinds of Volume Virtualizers will have different performance characteristics. Some Volume Virtualizers may route all I/O through general purpose processors, providing functionality at the lowest price/performance. Other Volume Virtualizers will include special purpose hardware to optimize the common data paths, including hardware similar to that used for port virtualization. A special sub-class of this type of Volume Virtualizer is capable of leveraging the port virtualization hardware itself concurrently with the port virtualization Layer. Volume virtualizers used by preferred Invista may have been created with no awareness of preferred Invista, or were created specifically for preferred Invista, or may have initially been created without preferred Invista awareness, but have been retrofitted to be more integrated with preferred Invista.

Disk arrays consume SCSI LU's and expose SCSI LU's, and can therefore be classified as Volume Virtualizers. Appliances also can qualify as Volume Virtualizers. We can also have a Volume Virtualizer implemented as a set of DPC's controlled by CPCs. It is also possible to mix these up, so that part of the virtualization is realized on one type of Volume Virtualizer and other part is realized on another type of Volume Virtualizer.

Based on the above discussion, Volume Virtualizers can be volume virtualizers designed to work with SCSI target virtualizers; array Volume Virtualizers; and appliance Volume Virtualizers. The preferred Invista Volume Virtualizers (IVV's) are Volume Virtualizers designed to work optimally with preferred Invista SCSI Target Virtualizers and DPC's. IVV's leverage the performance advantages inherent in a DPC while providing a consistent feature set across various DPC vendors. Their main responsibilities include: handling R/W commands; performing volume virtualization transformations; providing I/O routing to back-end and other Volume Virtualizers; and managing back-end paths.

Additionally, storage arrays such as EMC's preferred Clariion can be used as Volume Virtualizers. These Volume Virtualizers may be used stand-alone or can be consumed by other Volume Virtualizers e.g. an preferred Invista Volume Virtualizer may use native CLARiiON to achieve snapshot capabilities. The main responsibilities include: handling R/W commands; performing Volume Virtualization transformations; and provide access to back-end storage.

Figure 33:
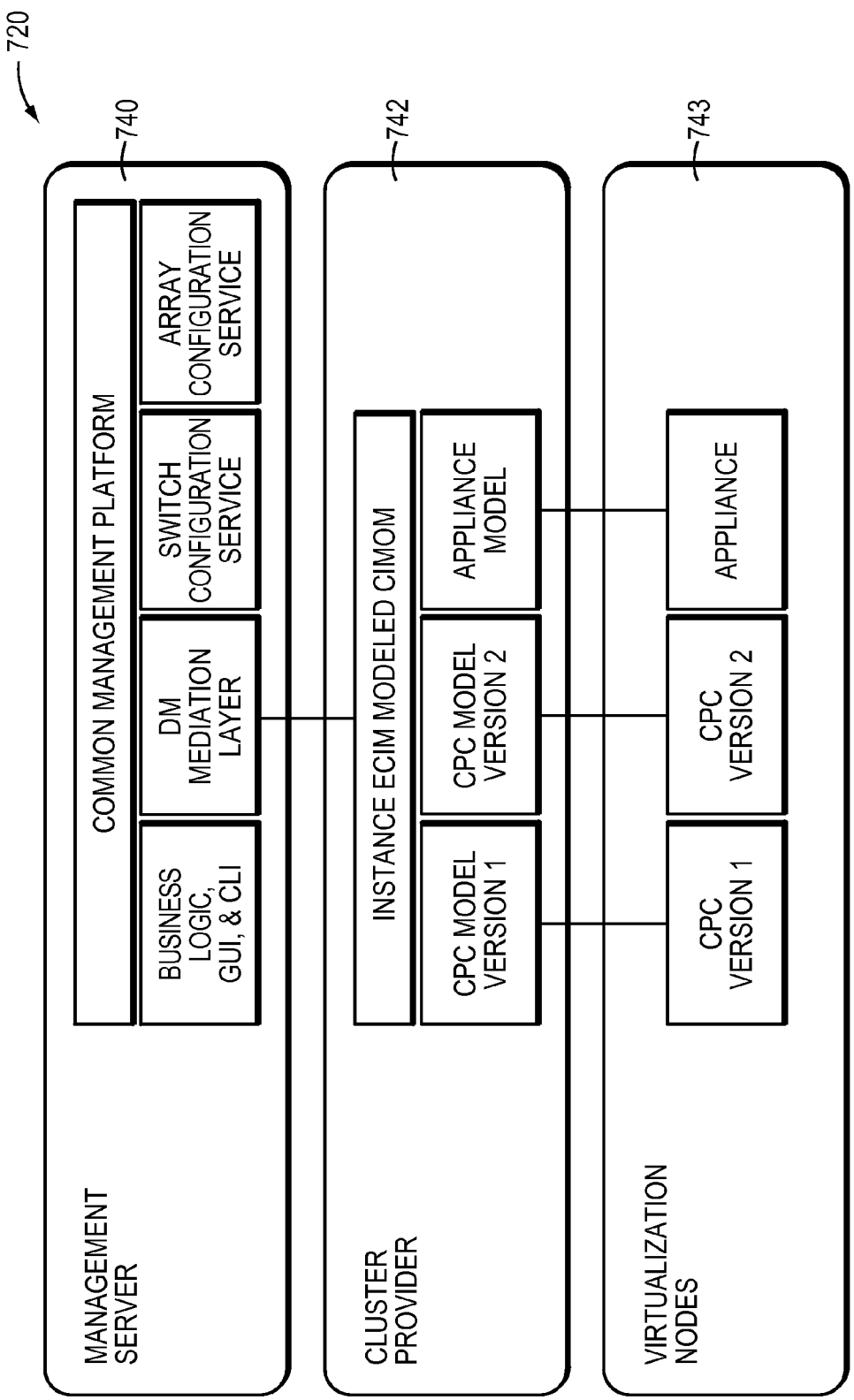
FIG. 33 shows a schematic of a functional block diagram of a virtualization manager that is part of the architecture of FIG. 32.

Appliance Volume Virtualizers are devices specialized to do certain virtualizations. They can be used in a stand-alone mode where the SCSI Target virtualization Layer directly connects to the appliance or can be consumed by another Volume Virtualizers e.g. an preferred Invista Volume Virtualizer may use a preferred Kashya appliance for replication available from EMC Corporation to achieve remote replication of its virtualized LU's. The main responsibilities include: handling R/W commands; performing Volume Virtualization transformations; providing I/O routing to back-end and other Volume Virtualizers; managing back-end paths FIG. 33 illustrate the layers of management using Storage Virtualization Manager 720. The layers of the preferred EMC Invista management are: the Management Server 740, the Cluster Provider 742 and the Virtualization Nodes 743. The Management Server 740 provides the centralized management elements organized as a collection of Web Services, these services provide: browser based GUI to achieve an active display; security services supporting embedded, Active Directory, and LDAPv3 directories to support authentication and authorization; services to manage licensing; common logging and auditing services compliant auditing of management events and actions. It also includes services to manage the configuration of zones on fabric switches; services to manage the provisioning of array storage to the Invista instance for virtualization; services to manage the configuration, provision virtual storage to hosts, configure and manage replication services (Clones and Mirrors), configure and manage Data Mobility, configure and manage Dynamic Storage Pools, and configure and manage ancillary capabilities such as Continuous Data Protection and Long Distance. Replication provided by appliances, e.g. a preferred EMC-owned RecoverPoint replication appliance, which may be virtualized by the Appliance Node of the Virtualization Nodes 743.

The Management Server 740 is preferably based on a so-called Common Management Platform (CMP), which is an architecture that supports services, such a Switch Configuration and Array Services, Interfaces, such as a Graphical User Interface (GUI) and Command Line Interface (CLI). The CMP architecture has a single Domain Manager component for each unique device type and also supports Business Logic Software, and a Domain Manager Mediation Layer.

The Cluster Provider 742 provides a single point of management from a preferred Invista instance to the Management Server 740 or other management entity. The interface from the Cluster Provider 742 to the Management Server 740 preferably conforms to Distributed Management Task Force (DMTF) standards for interfacing to the Common Information Model Object Manager (CIMOM). This interface presents a model conforming to the preferred EMC Common Information Model (ECIM) which is an extension to the Storage Networking Industry Association's (SNIA) Storage Management Initiative (SMI) modeled in DMTF modeling language (MOF). The Cluster Provider communicates with the various preferred Invista CPC's that are part of Virtualization Nodes 743 in the native management protocol for each CPC. These nodes are the SCSI and Volume Virtualizers of the Storage Presentation and Volume Virtualization layers.

The Cluster Provider 742 configures each CPC from a persistent repository (not shown) included as part of the Cluster Provider, collects the management state and status information for each CPC, and transforms management commands and responses between ECIM model and CIM protocol of the Cluster Provider 742 and Management Server 740 and the native object model and protocol of a preferred Invista CPC of node 743. The Cluster Provider also implements the CIM Indication service to pass filtered events from the Cluster Providers CIMOM to the Management Server 740 or any other registered and authorized management entity. The Cluster Provider communicates with each managed Invista CPC through an adaptor (CPC Model of 742) which understands the protocol and object model of each type of component (CPC of 743) as well as any version specific model differences of a particular CPC. The adaptor translates between the local object models of the CPCs and the ECIM. An Appliance Model also exists in the ECIM instance.

Each component CPC of nodes 743 of the preferred Invista has a local management agent; that agent communicates in its own protocol (CIM/XML over HTTP as defined in DSP0200 and DSP0201 or other protocol) and presents a CPC specific object model. Each CPC persists a copy of its own configuration data locally to facilitate local operation; this copy of the configuration data is reconciled with the Cluster Provider's persistent repository upon CPC initialization and if any discrepancies are found the Cluster Provider's (of 742) persistent version is used to reload the CPC (of 743) local repository. The management agent on the CPC (of 743) also sends CIM Indications (or other device specific events) to the CPC Model interface on the Cluster Provider (of 742) to notify the Cluster Provider of CPC state changes.

The Cluster Provider (of 742) is highly available, it runs on two separate executions platforms to insure availability of management in the face of a software or platform failure. The Cluster Providers communicate to coordinate management operations and to coordinate initialization and recovery of a Cluster Provider. The Cluster Providers can share the workload of a preferred Invista-based instance, the relational database used for the persistent repository of the Cluster Provider is used as the coordination point between management actions on the Cluster Provider instances.

The Management Server 740 is preferably made highly available; it runs on two or more separate execution platforms to insure availability of the management services in the face of a software or hardware failure. The Management Server instances are independent but share common persistent data. A CPC (of 743) may or may not be highly available. In highly available configurations the management agents of the CPC coordinate the updating of the local persistent repository and share the management of the CPC. In the event of a partial CPC failure the remaining management agent is capable of fully managing the CPC instance.

Figure 34:
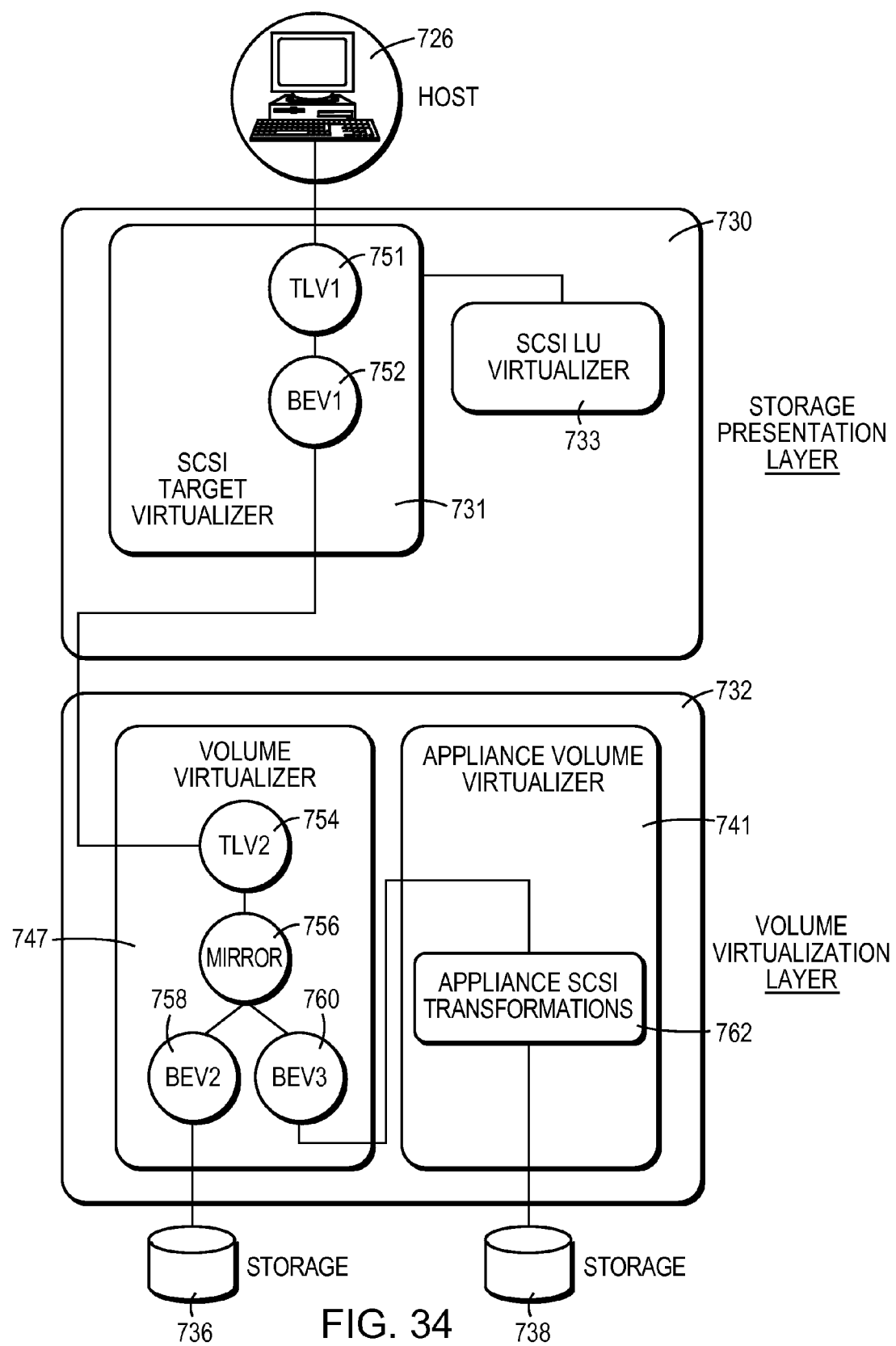
FIG. 34 shows how volume maps get distributed among the Storage Presentation Layer and Volume Virtualization Layers of the architecture of FIG. 32.

FIG. 34 shows how volume maps get distributed among the Storage Presentation Layer 730 and Volume Virtualization Layer 732, which itself includes Volume Virtualization 737, which is also a logical construction. Volume Virtualization 737 is realized by two physical components: the Volume Virtualizer 735 and the Appliance Volume Virtualizer 741.

FIG. 34 shows how volume maps get distributed among the Storage Presentation Layer 730 and Volume Virtualization Layer 732. Having a logical separation between the Storage Presentation and the Volume Virtualization layers and having the ability to stack different Volume Virtualizers means that the volume maps are also distributed in these layers. Each volume map will consume a lower level as if its connected to an SE or back-end disk. The volume maps in the Storage Presentation Layer will typically be very simple as they only provide SCSI endpoint semantics. The volume maps in the volume virtualization layer are more complex as they provide I/O transformation mappings and may possibly consume volumes from other Volume Virtualizers as well. The SCSI LU Virtualizer 733 is responsible for providing the virtualization of SCSI state associated with the logical unit (LU) where this state is specific to the LU and not the target through which this LU is accessed.

Having a logical separation between the Storage Presentation and the Volume Virtualization Layers and having the ability to stack different Volume Virtualizers means that the volume maps are also distributed in these Layers. Each volume map will consume a lower level as if its connected to an SE or back-end. The volume maps in the Storage Presentation Layer will typically be very simple as they only provide SCSI endpoint semantics. The volume maps in the Volume Virtualization Layer are more complex as they provide I/O transformation mappings and may possibly route to other Volume Virtualizers as well. The SCSI LU Virtualizer 733 is responsible for providing the virtualization of SCSI state associated with the logical unit (LU) where this state is specific to the LU and not the target through which this LU is accessed.

FIG. 34 shows an example of how distributed volume maps for Storage 736 and 738 would be realized on different logical entities thorough Layers 730 and 732 involving Host 726. Typically a BEV such as the BEV1 volume 752 will connect to the TLV, such as TLV 1 751 in the consumed graph as if it were connecting to a back-end. At every Layer, except the SCSI Target Virtualization Layer, the TLV's will be exposed via mid-layer ITL's, which provide SCSI endpoint semantics. The depicted example also shows a scenario where Volume Virtualizer 747 is mirroring data to a local storage as well as to an appliance based virtualizer. The BEV1 object 752, which represents a disk in the graph maintained within the SCSI Target Virtualizer 731, is consuming the TLV2 object 754 from the Volume Virtualizer 747. The SCSI Target Virtualizer is treating this TLV (Top Level Volume object) as though it were a disk. The fact that the volume virtualizer is further virtualizing the volume is of no concern to the SCSI Target Virtualizer.

The Volume Virtualization Layer 732 includes a mirror volume 756 that is responsible for replicating write I/Os to the legs of the mirror beneath it. Read I/Os can be serviced from either leg of a synchronized mirror. BEV2 758 and BEV3 760 represent back-end Volumes. These are logical representations of a disk and play the same role as BEV 1 in 731. In 732, BEV3 is bound to a virtual volume presented by an appliance. This appliance performs additional virtualizations on the volume. For example, the Appliance Volume Virtualizer 741 could be a preferred EMC RecoverPoint (from EMC-owned Kashya) appliance that provides a Continuous Data Protection virtualization on the volume. Appliance SCSI Transformations 762 exist in the Appliance Volume Virtualizer 737 for tracking changes made to the volume allowing the data of the volume at a given time to be subsequently presented to a host.

Figure 35:
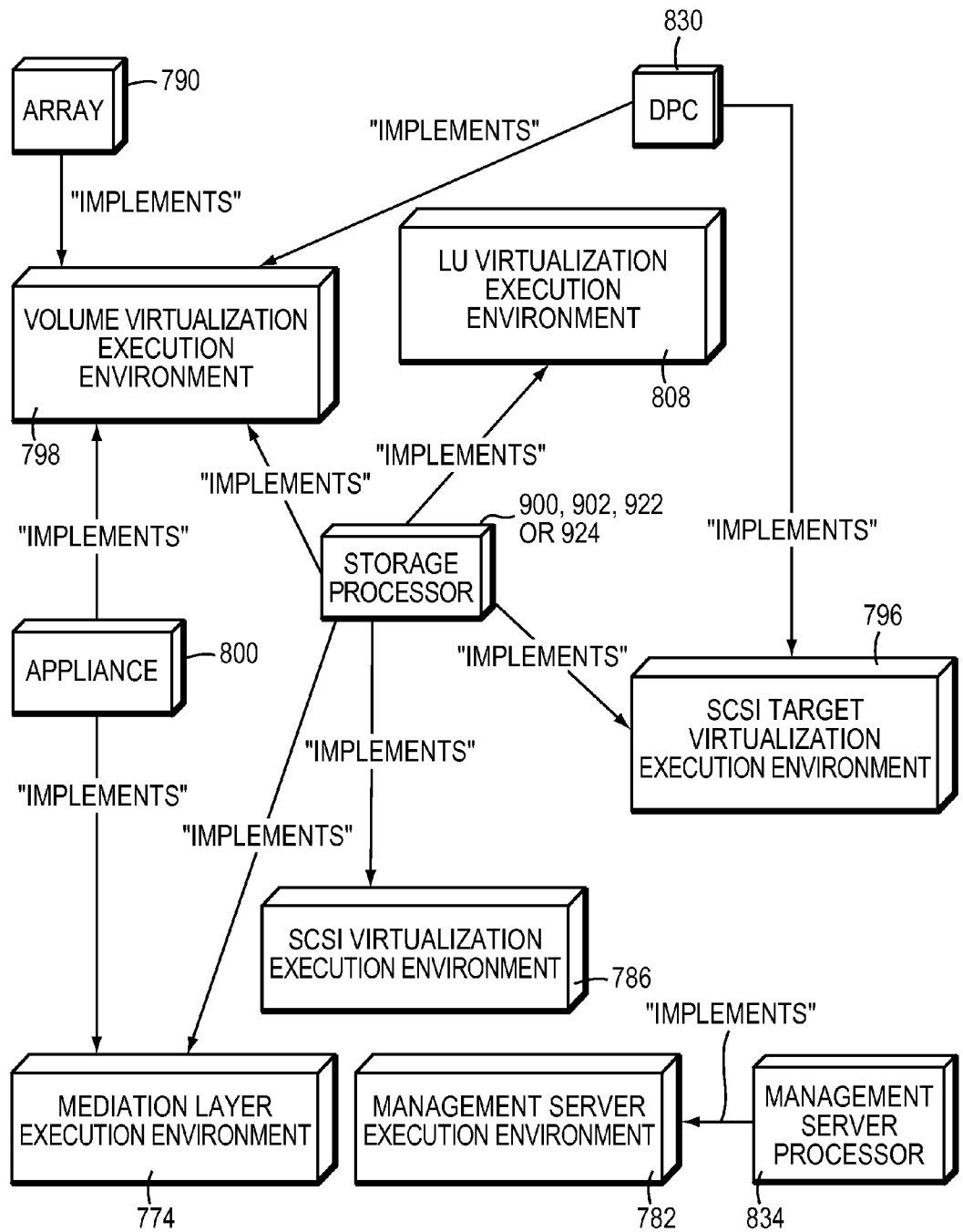
FIG. 35 shows preferred hardware deployments including ASIC's as shown in FIGS. 27-31 for the execution environments of the components of the alternative embodiment architecture of FIG. 32.

Referring to FIG. 35 the way in which various hardware platforms deployable within logical instance of the architecture of FIG. 32 realize software execution environments defined below is shown. FIG. 35 shows preferred hardware deployments including ASIC's as shown in FIGS. 27-31 for embodying the execution environments shown in FIG. 35. The following enumerates the main responsibilities of the software components depicted on FIG. 35, and makes reference to an exemplary hardware embodiment discussed with reference to FIG. 38 below.

Management Server Execution Environment 782 implemented by Management Server Processor 834 provides a management interface to the user. It also coordinates Invista instance's object model and coordinates dissemination of configuration information. It provides notification of state changes in the instance and Integrates with other preferred EMC SAN management tools. Mediation Layer Execution Environment 744 implemented by either Appliance 800 or one or more of the Storage Processors 900, 902, 922, or 925 mediates EMC CIM (ECIM) requests received from the Management Server and translates them to format(s) supported by the preferred Invista components. Environment 774 translates notifications received from Invista Gen2 components into events supported by ECIM object model and maintains the management object model for selected components, such as a database service, communications director, a cluster manager, and an instance manager.

Referring again to FIG. 35 with reference to hardware components described in reference to FIG. 38 discussed below, a SCSI Virtualization Execution Environment 786 implemented by Storage Processor 900, 902, 922, and/or 924 interfaces with the management mediation layer, coordinates provisioning and configuration of SCSI Target and Logical Units (LU) Virtualizers, and provides support for LUN mapping and masking. A SCSI Target Virtualization Execution Environment 796 implemented by DPC 830 and/or one or more of the Storage Processors exposes and manages Virtual SCSI Targets, handles logins, logouts, and other SCSI target based commands, processes SCSI non-READ/WRITE commands that do not require inter DPC coordination and handles ITL-based NACA. LU Virtualization Execution Environment 808 implemented by one or more of the Storage Processors coordinates SCSI reservations, handles non-READ/WRITE commands that require inter DPC coordination, and handles UNIT ATTENTION state. A Volume Virtualization Execution Environment 798 implemented by Array 790 handles READ/WRITE commands, performs Volume Virtualization transformations, provides I/O routing either to back-end storage or to other Volume Virtualizers, and manages back-end paths.

Figure 36:
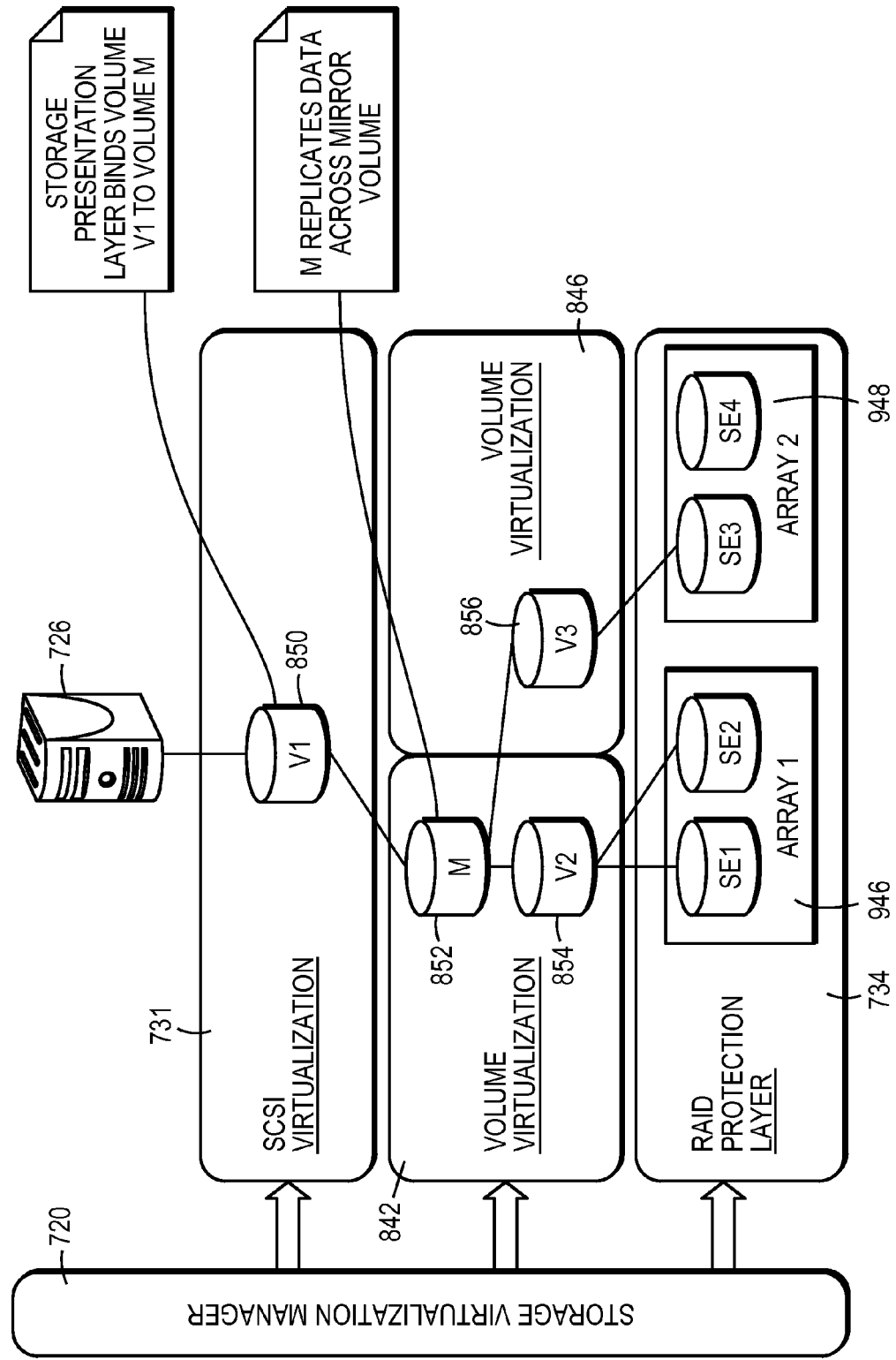
FIG. 36 shows an example case of a data flow for a volume configured for high availability in the presence of the loss of a Volume Virtualizer.

FIG. 36 illustrates an example data flow for a volume configured for high availability by Storage Virtualization Manager 720 in the presence of the loss of a Volume Virtualizer. In this example, the SCSI Target Virtualization 731 is presenting volume V1 to host 726. Volume V1 850 is bound to volume M 852 in the preferred Invista Volume Virtualization layer 842 and 846 by the Storage Presentation Layer. Volume M is a mirroring volume that is replicating writes to volumes V2 854 and V3 856. V2 and V3 are virtualizing volumes that each maintain the same data on separate physical storage. In this example, V2 maintains the data of the volume on the back-end array volumes in RAID Protection Layer 734 SE1 and SE2 of Array 1 946, by treating the storage of SE2 as a logical concatenation or extension of the storage on SE1. V3 is maintaining its copy of the data on SE3 of Array 2 948. The capacity of SE3 is equal to the combined capacity of SE1 and SE2. At this point in the scenario SE3 has the identical data of SE1 and SE2 combined.

Figure 37:
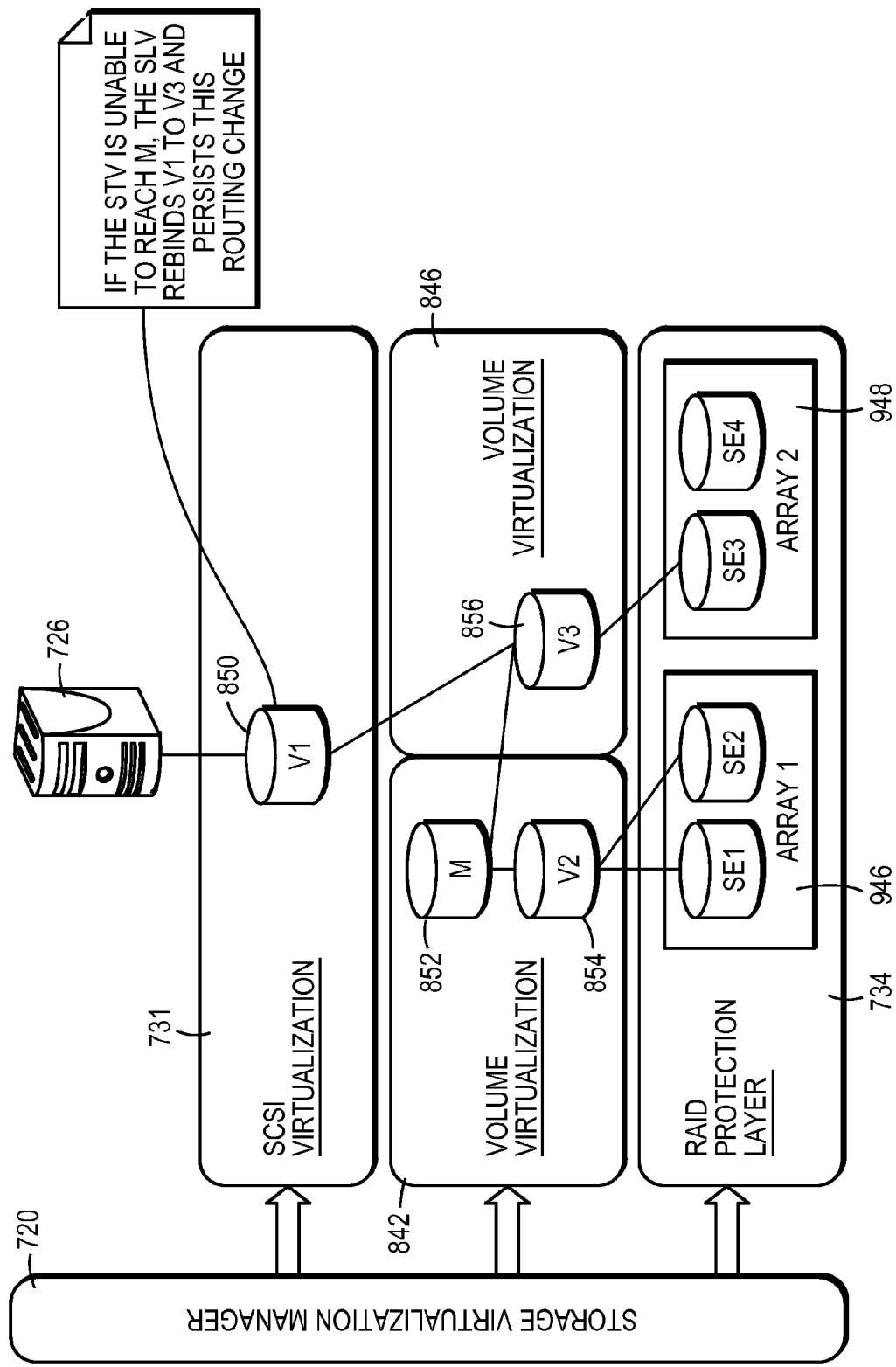
FIG. 37 shows more of the example case of FIG. 36.

FIG. 37 shows the data flow when an error has occurred on a Volume Virtualizer and M is no longer accessible from V1. In this situation the Storage Presentation Layer rebinds the data flow from V1 to V3 bypassing M. In this manner access to the Host's data can continue despite the failure of the Volume Virtualizer.

An alternative failure scenario (not shown) is a failure of the Volume Virtualizer including V3. In this scenario, the mirroring volume M, detects an inability to reach V3 and stops replicating writes to V3, all access is subsequently directed purely to V2 and the Host is able to continue accessing data despite the failure of another Volume Virtualizer.

Figure 38:
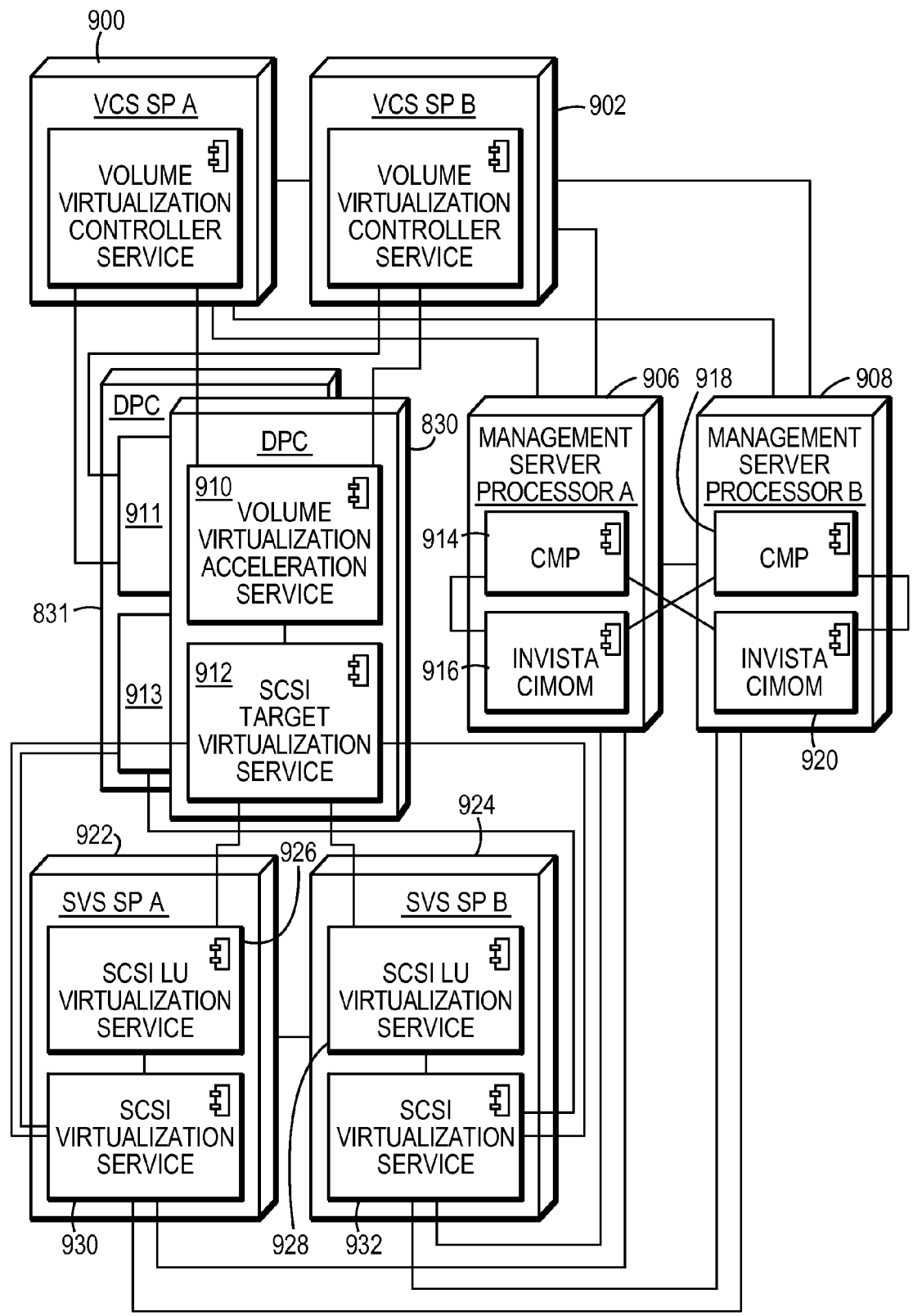
FIG. 38 shows an example hardware and software deployment of the alternative embodiment architecture of FIG. 32.

FIG. 38 shows an example hardware and software deployment of the alternative embodiment architecture of FIG. 32. In this deployment a Data Path Controller (DPC) 830 is hosting both the SCSI Target Virtualization Service 910 and the Volume Virtualization Acceleration Service 912. DPC 831 hosts 911 and 913, which are identical in function to 910 and 912, respectively. In this example each Data Path Controller is realized by Application Specific Integrated Circuits (ASIC's), such as the ASIC's described in reference to FIGS. 27-31 above, and that are managed by a line card within a FibreChannel Switch (not shown). The SCSI LU Virtualization Service 926 and 928 are running as highly available distributed applications on a pair of Service Processors; SVS SP A and SVS SP B, 922 and 924, respectively. The SCSI Virtualization Service 930 and 932 is also provided on the Service Processors for acting as a coordinator of management functions between the SCSI LU Virtualization Service, SCSI Target Virtualization Service, and the Virtualization Manager.

The Volume Virtualization Controller Service is also running as a highly available distributed application on a pair of Service Processors; VCS SP A and VCS SP B, 900 and 902, respectively. Other possible embodiments include having CIMOM on dedicated service processors and the CIMOM sharing SP with any one of the Virtualization services. Each of these components is managed by the preferred Invista Management Software running within the preferred Invista CIMOM 916 and 920 on a pair of Management Server Processors A and B, 906 and 908, respectively. The preferred Invista CIMOM processes are part of a highly available distributed application that operates within the framework of the Common Management Platform (CMP) 914 and 918.

Figure 39:
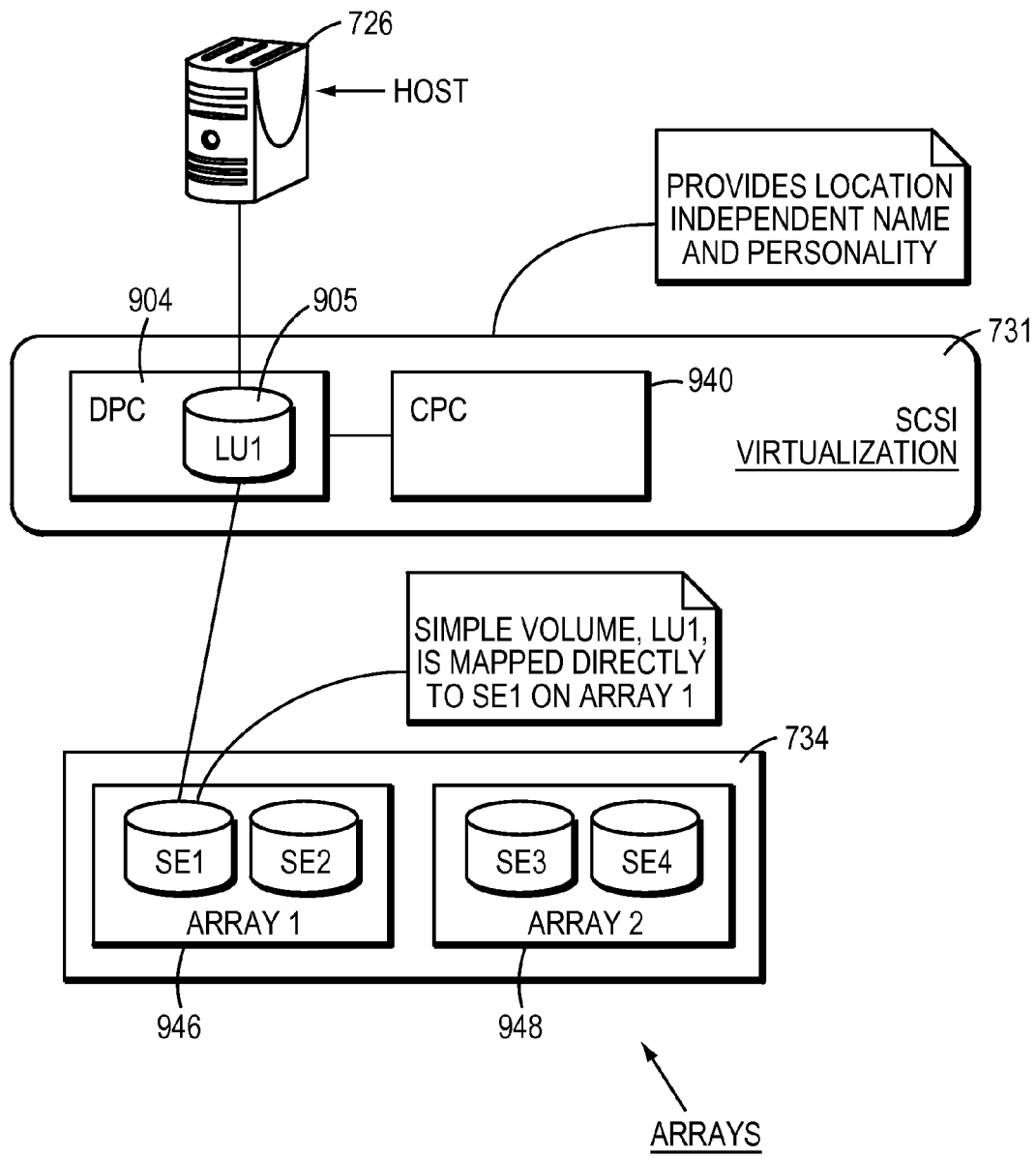
FIG. 39 shows an example case wherein a host accesses a volume, LU1, that is being virtualized.

FIG. 39 illustrates a host 726 that is accessing a volume, LU 1005 that is being virtualized. In this example, the volume maps entirely onto a single volume, SE1, presented by a storage array called Array 1 946 on the RAID Layer 734. L1 maps its contents byte for byte to the entire contents of SE1. At this point the Storage Presentation layer by providing SCSI Virtualization 840 is presenting LU1 to the host with the preferred Invista SCSI personality and a location independent identifier for the volume. This personality is independent of the storage arrays that contain the physical storage. Non-read and write SCSI commands from the host that act on the logical unit are serviced directly by the Storage Presentation layer and are not presented to the back-end array. Commands requiring coordination among multiple DPC's, such as Reservation requests, are serviced by the SCSI LU Virtualizer running on the CPC 940, which is the same or similar entity as item 58 in FIG. 3, and may include item 54 from FIG. 4. The SCSI Target Virtualizer running on the DPC 904 immediately services non-read/write commands that commands that do not require coordination among its peers. For Reads and Writes the SCSI Virtualization logic on the DPC passes these through to the array which services these with the data flowing between the host and the DPC and between the DPC and the array. Use for Array 2 948 present in the Raid Layer 734 is explained in reference to an example case shown in FIG. 40 below.

Figure 40:
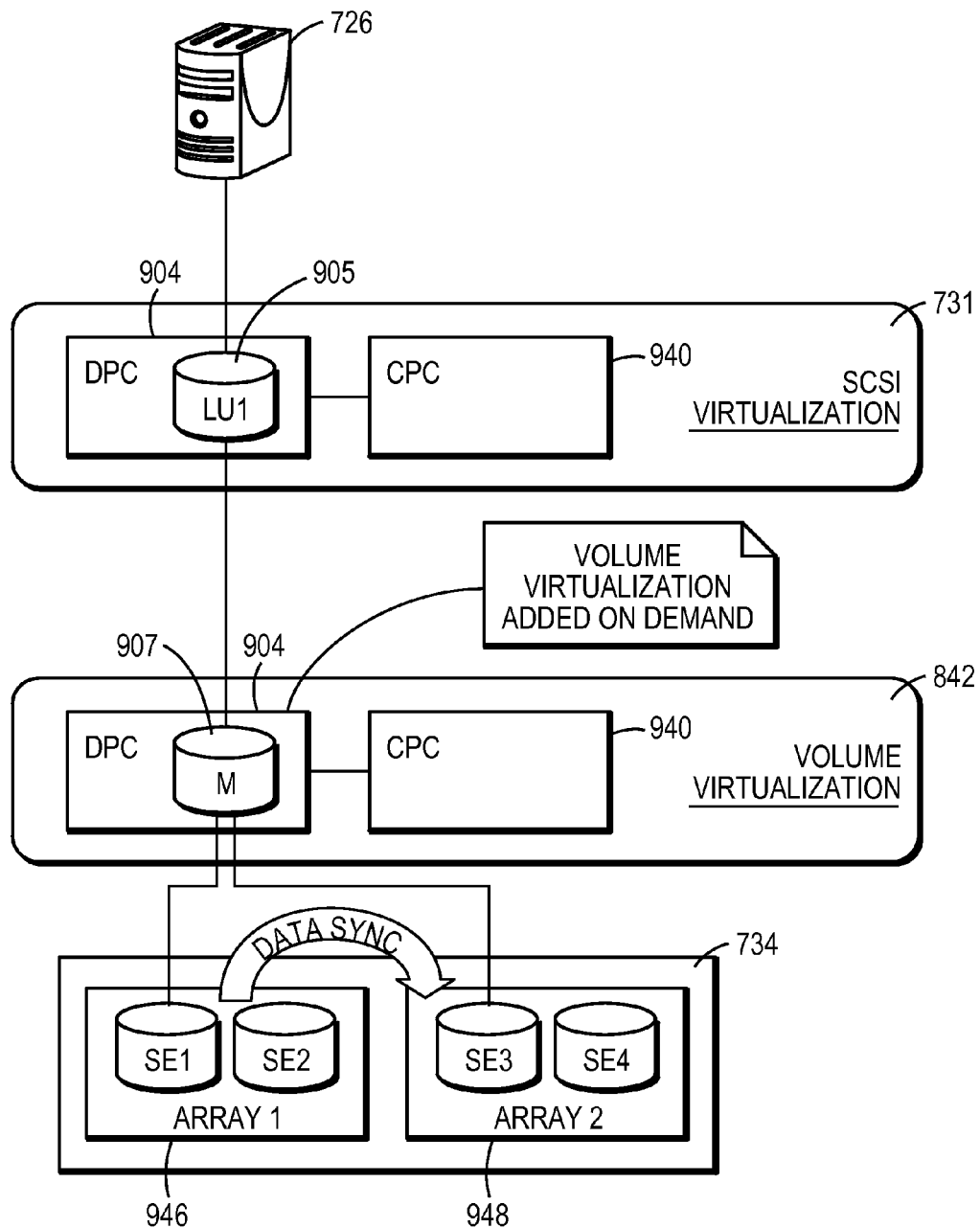
FIG. 40 shows another example case wherein the same virtual volume, LU1, as discussed in reference to FIG. 39 is being presented to the host while its data is being relocated.

FIG. 40 shows an example case wherein the same virtual volume, LU1, as discussed in reference to FIG. 39 is being presented to the host 726. At this point, in the example case, the storage administrator could be involved with moving data residing on volume SE1, from Array 1 to Array 2. The administrator wants to move this data between arrays without interrupting the access to this data from the host. Using preferred Invista's Data Mobility application, the administrator selects the new location for the data to be on volume SE3 which is presented to the preferred Invista Instance from Array 2. SE3 is same capacity as the source volume, SE1. To accomplish the data movement, the Data Mobility application inserts a Volume Virtualization layer 842 into the data path between LU1 and SE1. The Data Mobility application consists of software that runs on the DPC 904 and on the CPC 940 in this Volume Virtualization layer 842. This software inserts a mirroring volume M into the data path and starts to replicate write I/Os that arrive to both SE1 and SE3. Read I/Os are directed to SE1. The Data Mobility layer also starts a series of copy operations that read data from SE1 and write the data to SE3, with the purpose being to copy the entire volume SE1 to SE3. The Data Mobility layer performs this synchronization in a manner that prevents writes from these copy operations from overwriting more recent data written by the host. The Data Mobility layer consists of software running on the DPC and CPC of the Volume Virtualization layer. This software forms a part of the Volume Virtualization Acceleration Service and the Volume Virtualization Controller Service. The insertion of the volume virtualization layer is done transparently to the host in a manner allows I/Os from the host to flow to volume without the host observing any interruption of service.

Figure 41:
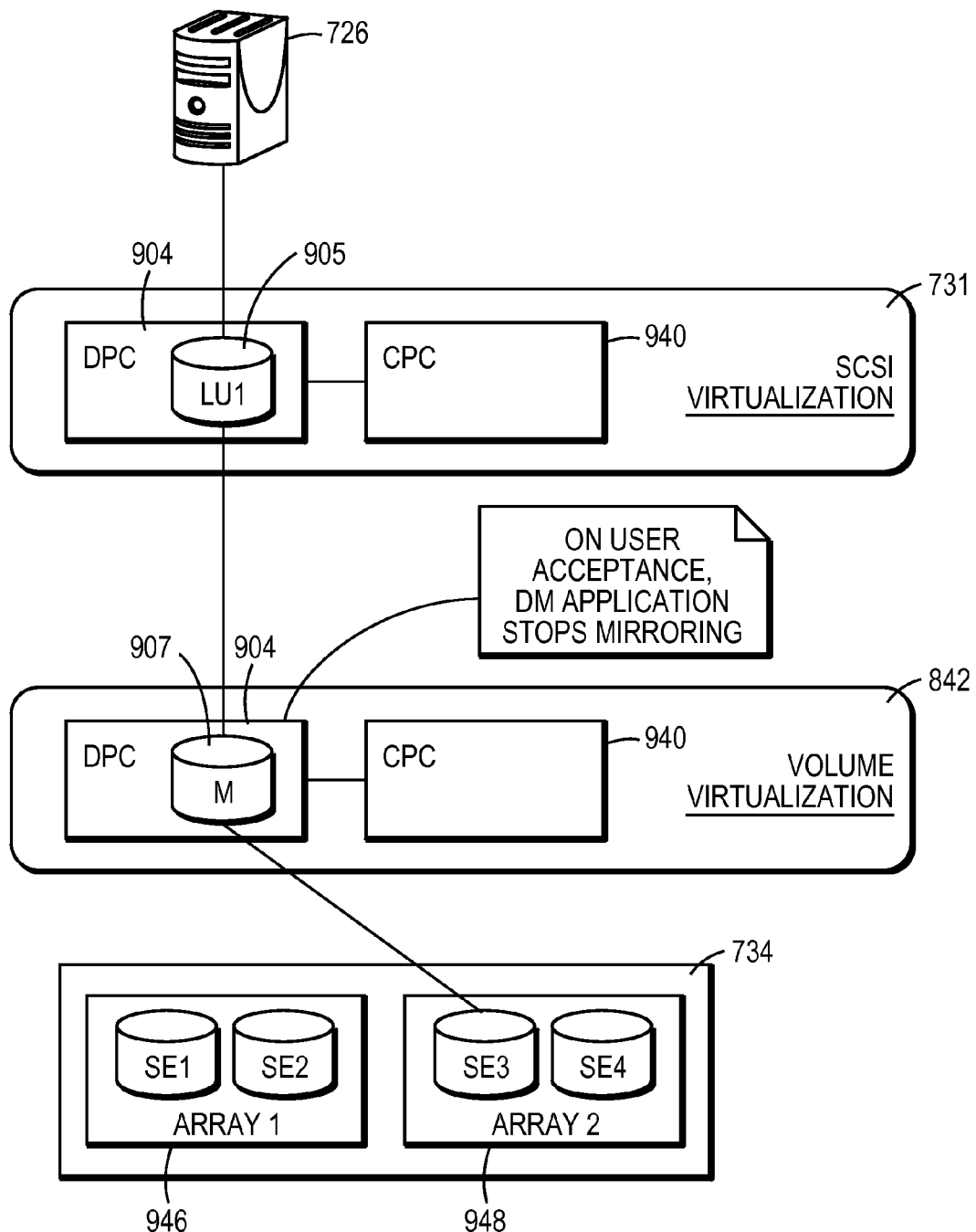
FIG. 41 shows more related to the example case of FIGS. 39-40.

FIG. 41 shows more in the example case, wherein upon completion of the synchronization of data from SE1 to SE3, the storage administrator is giving the options to either abort the operation or accept the new location of the data by committing the operation. In this example, the administrator accepts the new location and commits the tasks. Once the storage administrator has committed the job, the volume SE1 is no longer needed for this data and updates to volume SE1 from the host are no longer necessary. At this point the Data Mobility application stops the mirroring of data and directs all read and write traffic that it receives to volume SE3.

Figure 42:
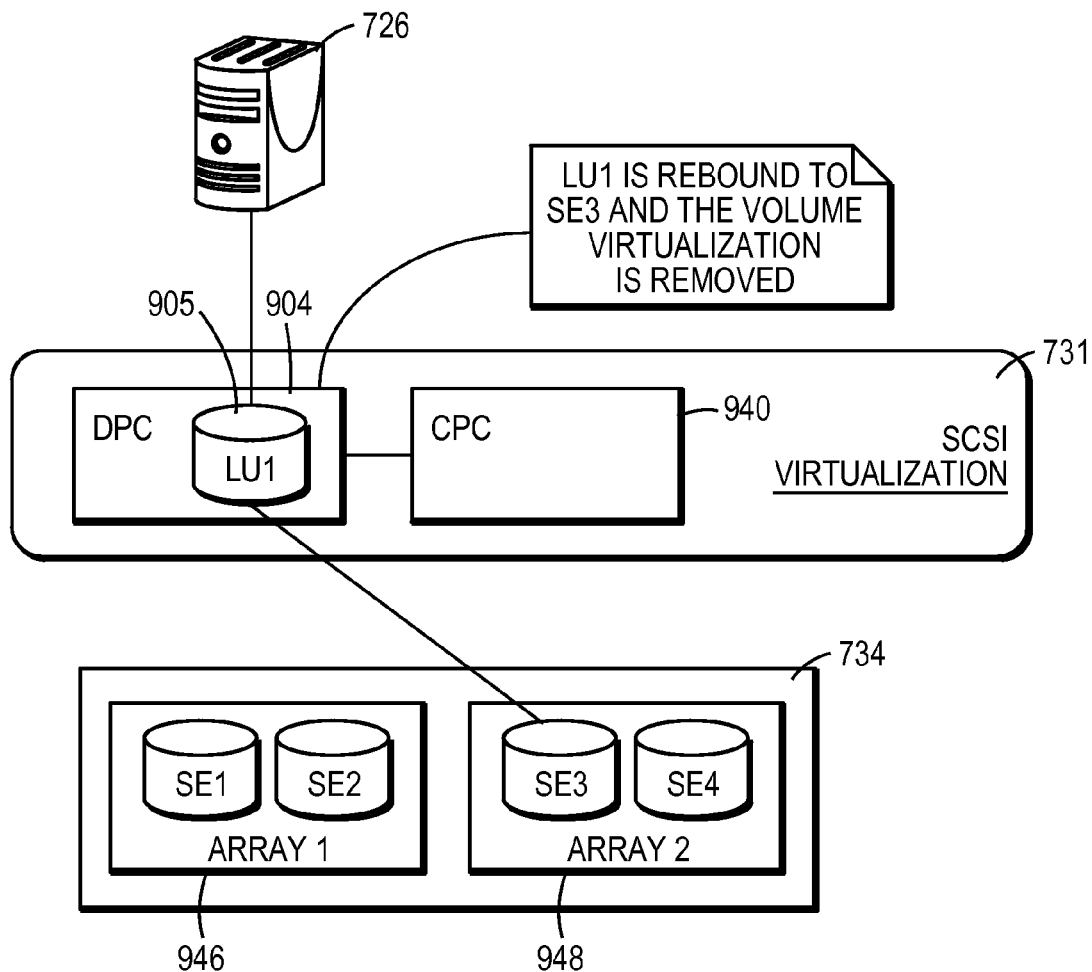
FIG. 42 shows more related to the example case of FIGS. 39-41.

FIG. 42 shows the final completion stage of the Data Mobility job. Since the data has been moved to its new location, and the storage administrator has accepted this new location, the virtualization being performed by the Volume Virtualization Layer is now complete. As a final step the Data Mobility application rebinds the volume LU1 to volume SE3 directly short circuiting the VAS volume. This step removes the overhead of the Volume Virtualization Layer since it now no longer has any useful service to provide to this volume.

Figure 43A:
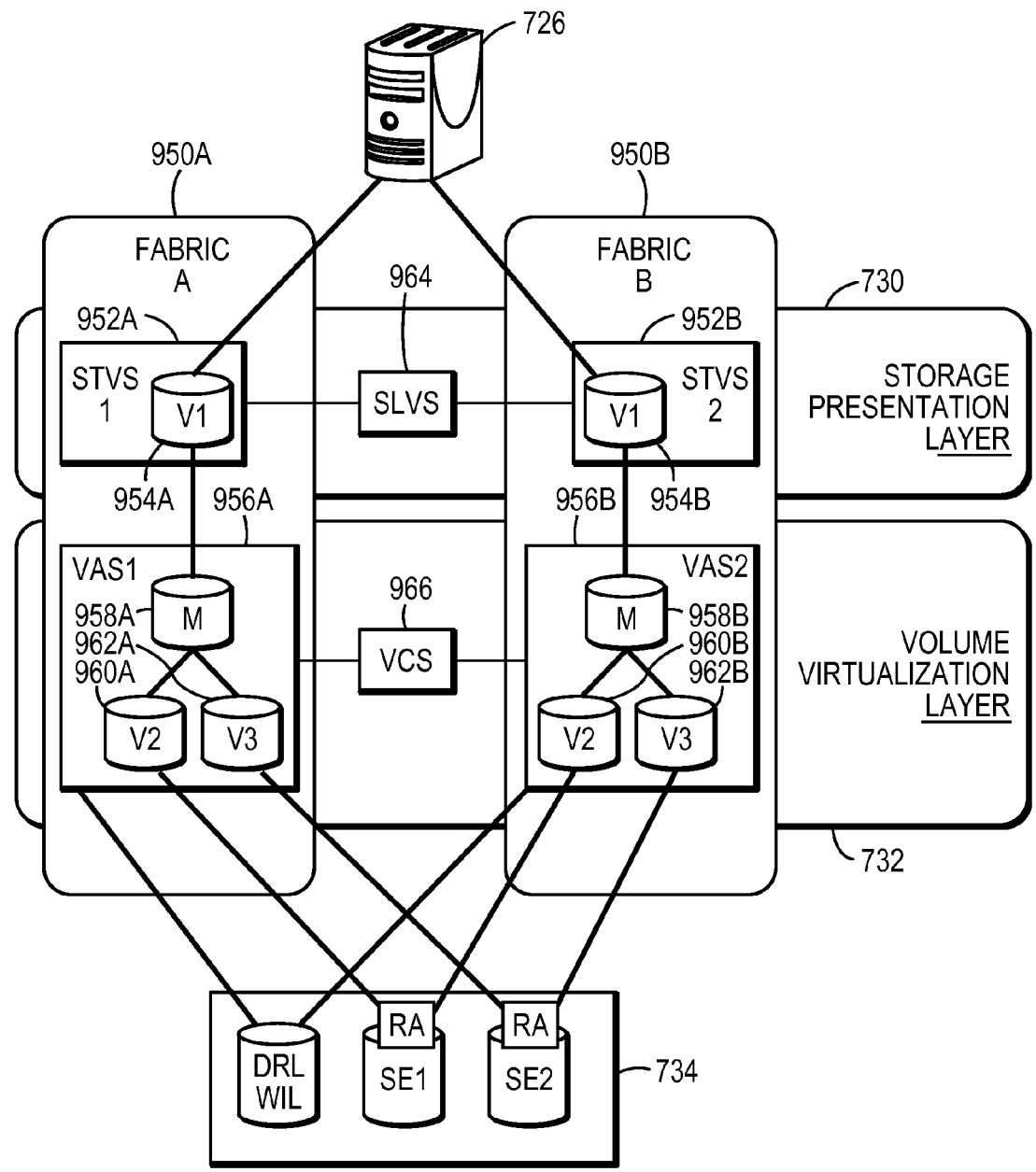
FIG. 43A shows an example case of the architecture of FIG. 32 being used to maintain high availability of storage resources in the event of a failure or problem.

FIGS. 43A-G depict a continuing example case where the alternative embodiment architecture enables high availability of function and services in the event of failures and problems. FIG. 43A shows Host 726 and Storage Presentation Layer 730 and Volume Virtualization Layer 732. RAID Protection Layer 734 includes storage elements SE1 and SE2. In the example case SCSI LU Virtualization Service (SLVS) 964 presents V1 954A-B to the Host on dual Fabrics A-B 950A-B employing the SCSI Target Virtualization Service (STVS) 1-2 952A-B. Volume Virtualization Controller Service (VCS) 966 coordinates virtualization on the Virtualization Accelerator Services VAS1-2 956A-B. The SLVS, STVS, VCS and VAS discussed in FIGS. 43A-G are identical or similar to those discussed in reference to FIG. 38, but have different reference numbers because, in the presented example cases, these elements are functioning present in a slightly different context. A VAS is also referred to as an Accelerator herein. All outstanding writes to Mirror M 958A-B are recorded in the Write Intent Log(WIL) stored in the RAID Protection Layer 734, and removed from WIL upon completion of I/O. A reservation key of READ ANY (RA) indicates that any mirror leg (V2 960A-B or V3 962A-B) can be used to service reads.

Figure 43B:
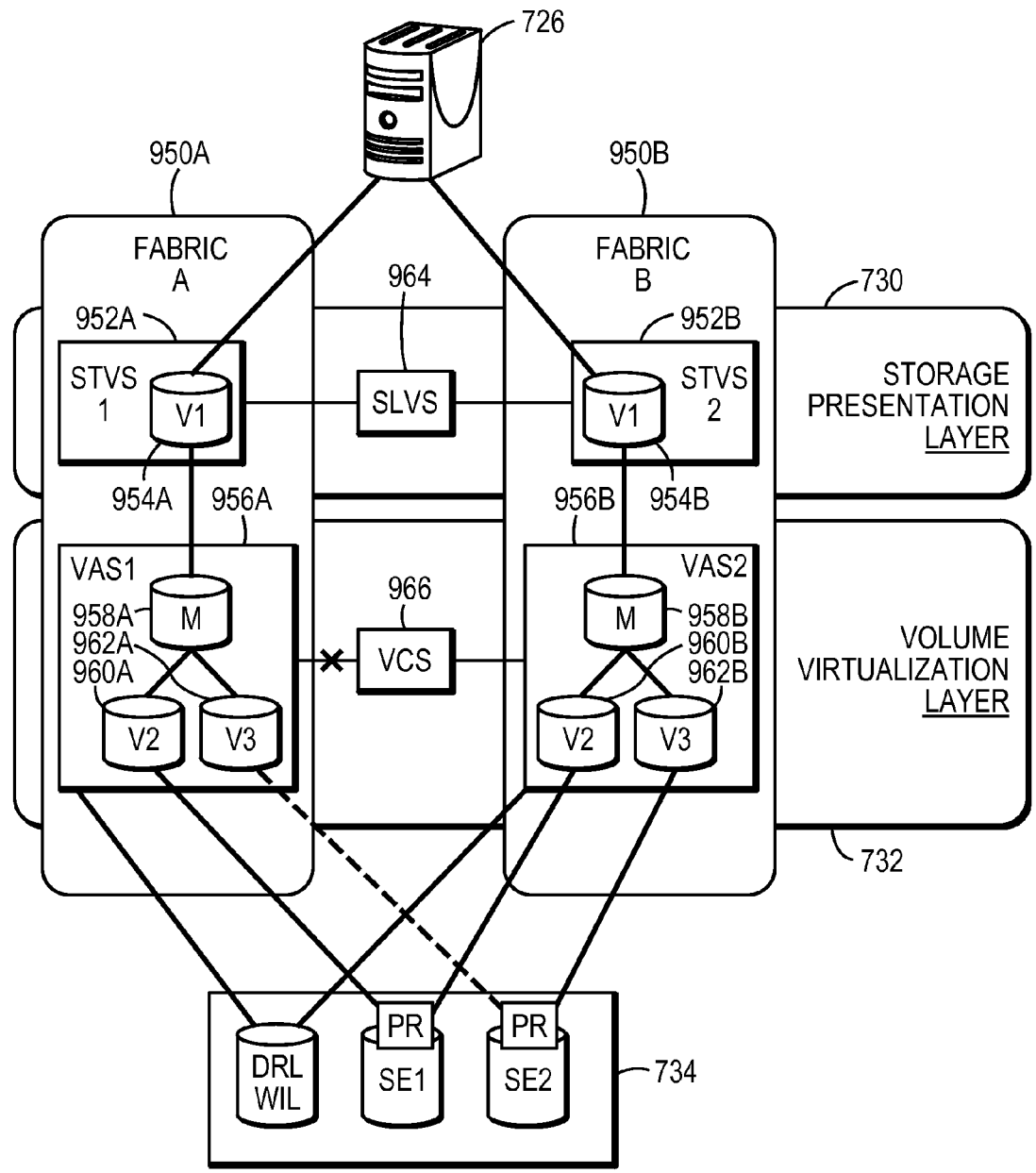
FIG. 43B shows another example case of the architecture of FIG. 32 being used to maintain high availability of storage resources in the event of a failure or problem.
Figure 43C:
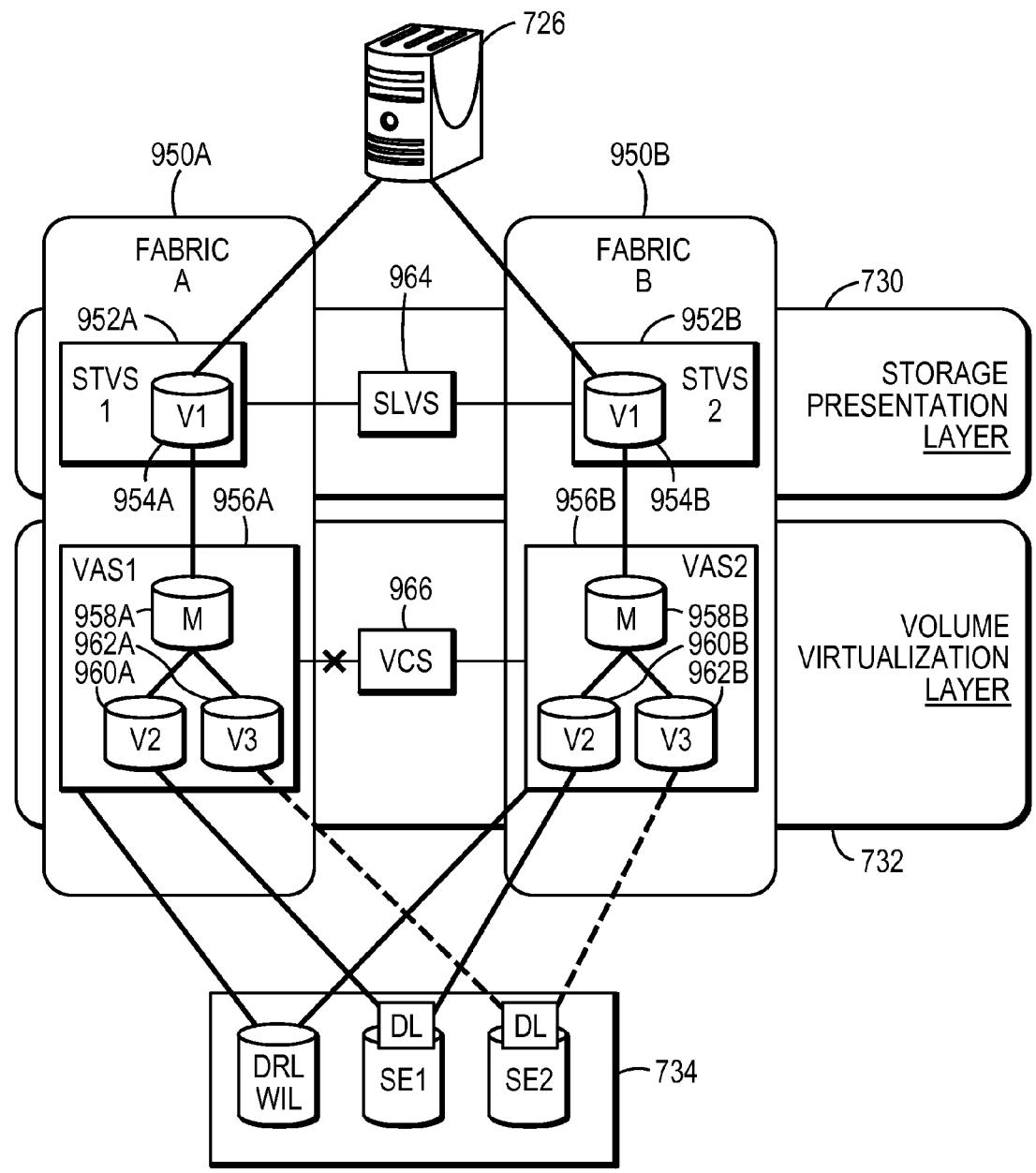
FIG. 43C shows another example case of the architecture of FIG. 32 being used to maintain high availability of storage resources in the event of a failure or problem.
Figure 43D:
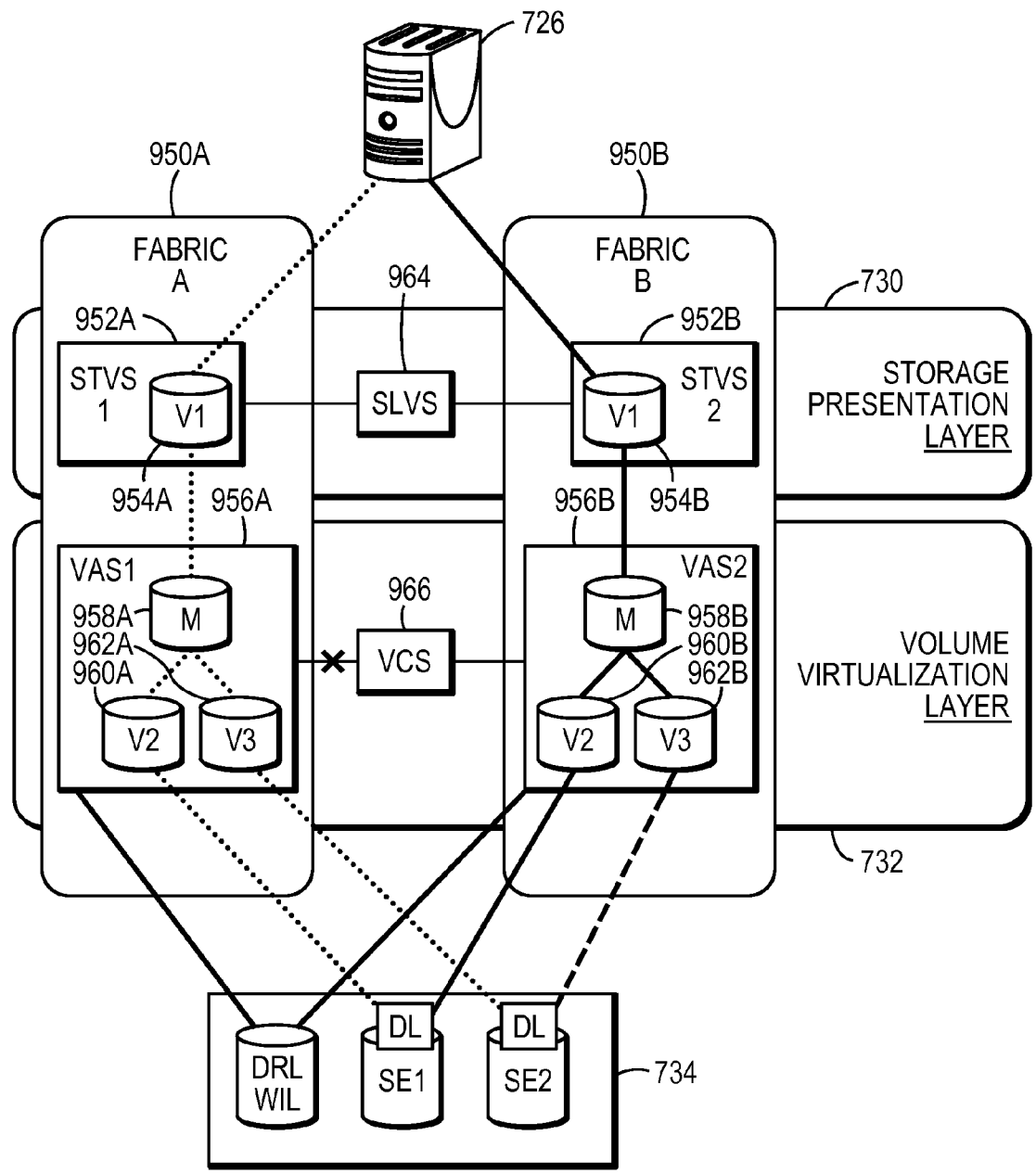
FIG. 43D shows another example case of the architecture of FIG. 32 being used to maintain high availability of storage resources in the event of a failure or problem.

FIGS. 43B-D show high availability in the presence of VCS failures is shown, by partitioning an accelerator from its controller. Referring to FIG. 43B, on loss of a communication link with its controller VAS1 sets Primary Read (PR) reservation key on SE1 and SE2. All Reads received by VAS1 are then directed to the primary volume SE1, while writes continue to both. Write errors are recorded in a Dirty Region Log(DRL) stored in the RAID protection layer. For these errors the WIL is updated as in the normal case. FIG. 43C shows that on loss of a communication link with Accelerator VCS, it sets DPCLoss reservation key (DL) on SE1 and SE2. DL key overrides the PR key. So all reads on VAS2 are directed to the primary volume (SE1). VAS2 updates DRL on write errors and the WIL is updated as in the normal case. FIG. 43D shows that on observing DL reservation key, VAS1 stops servicing the volume and returns CHECK CONDITION with a sense code of NOT READY to all subsequent IO's from the host.

Figure 43E:
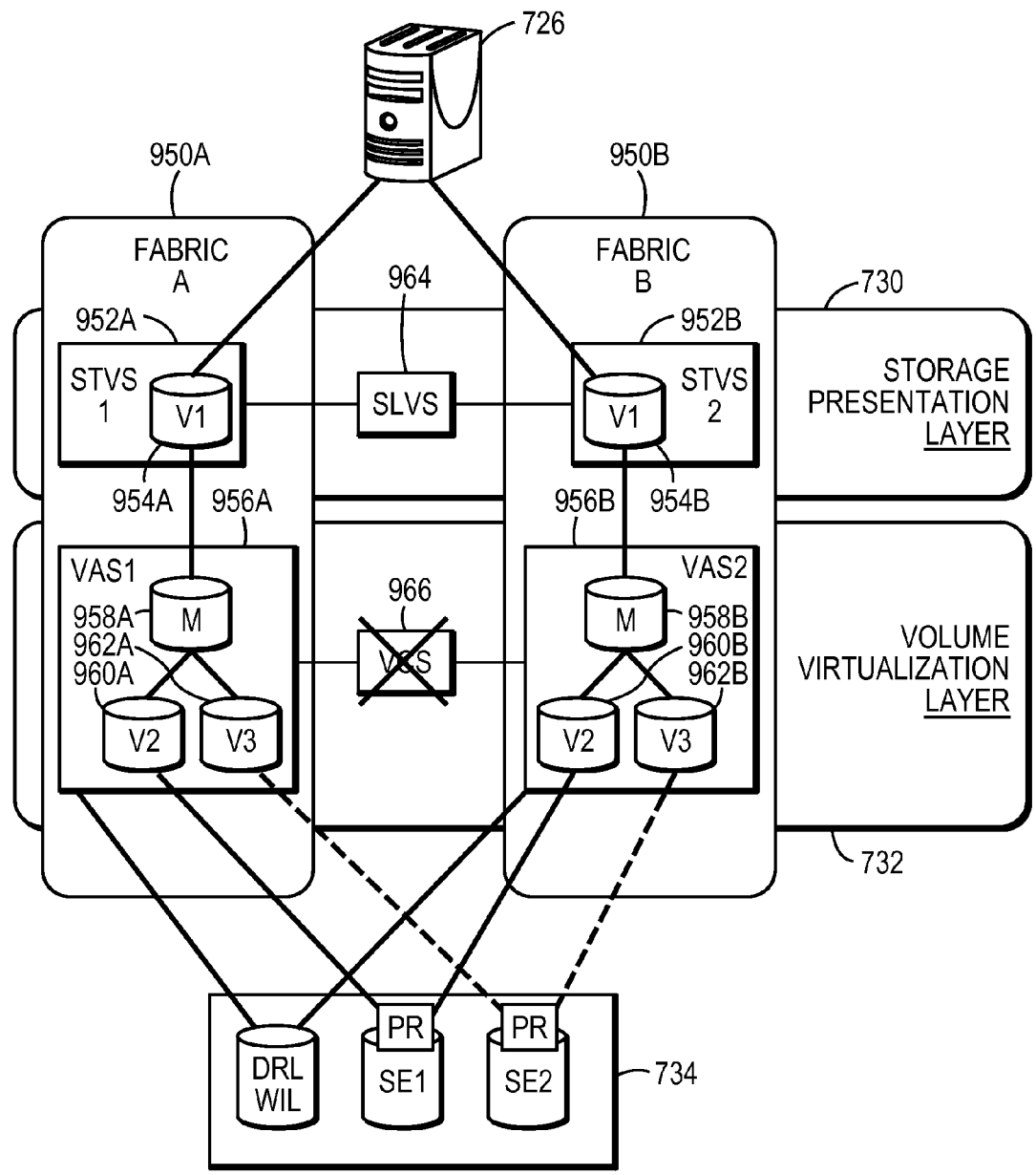
FIG. 43E shows another example case of the architecture of FIG. 32 being used to maintain high availability of storage resources in the event of a failure or problem.

FIG. 43E shows high availability in the presence of a VCS failure in a different scenario then that described above. FIG. 43E shows that on loss of communication link with the controller, VAS1-2 each set PR reservation key on SE1 and SE2.

All reads received by VAS1-2 are directed to the primary volume SE, and writes continue to both. Both of these Accelerators update DRL on write errors and update WIL as normal.

Figure 43F:
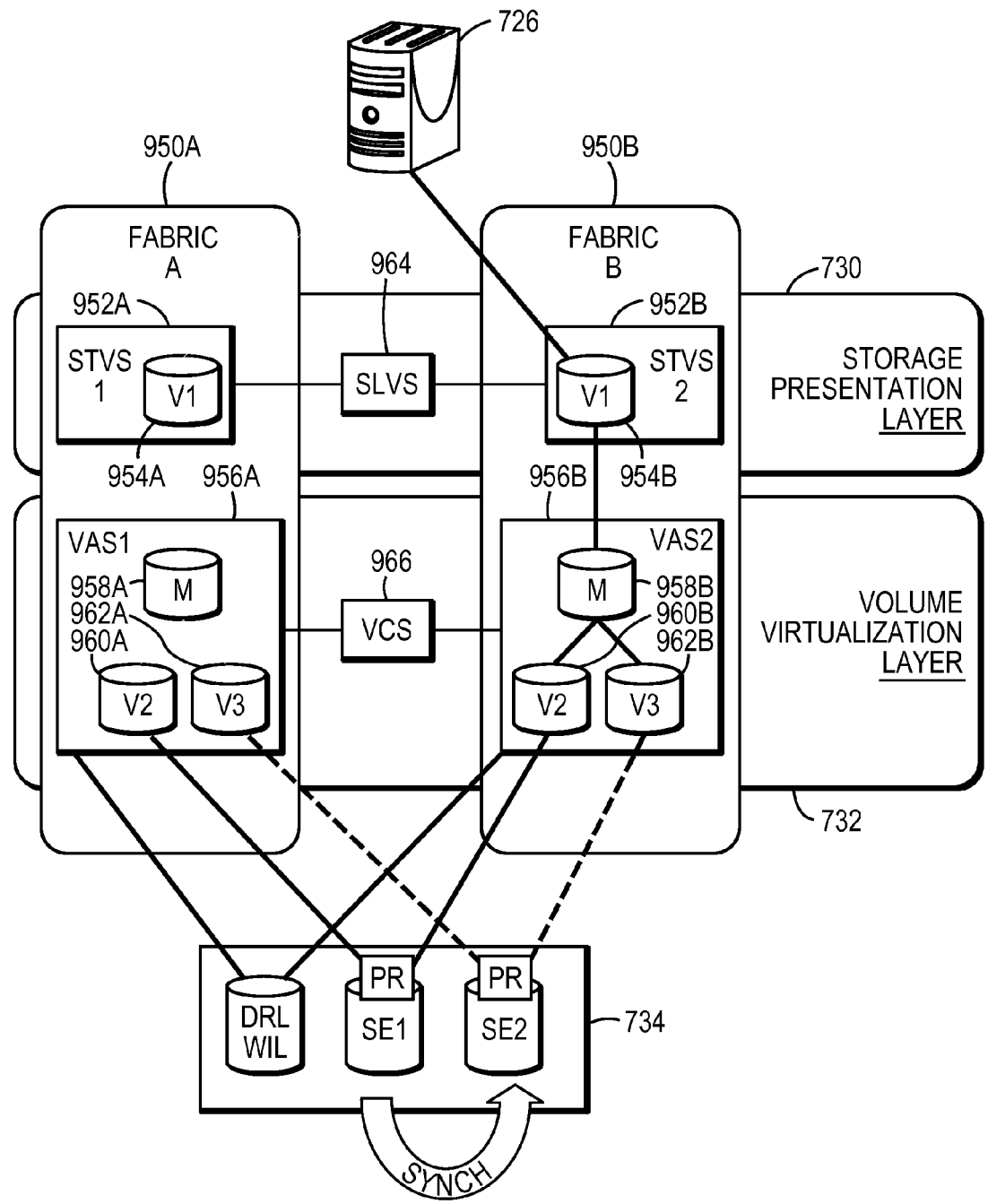
FIG. 43F shows another example case of the architecture of FIG. 32 being used to maintain high availability of storage resources in the event of a failure or problem.
Figure 43G:
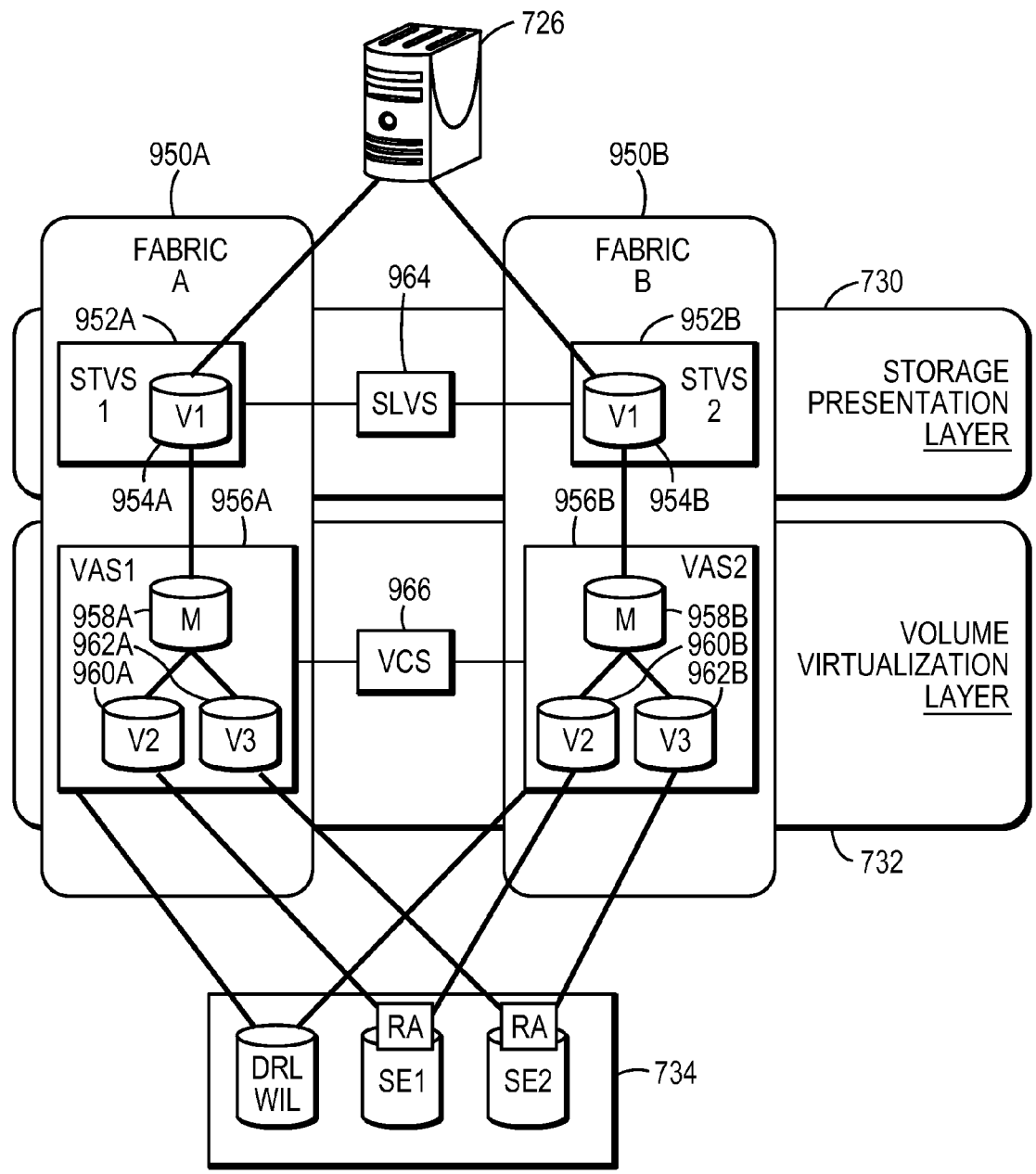
FIG. 43G shows another example case of the architecture of FIG. 32 being used to maintain high availability of storage resources in the event of a failure or problem.

FIGS. 43F-G show Recovery that augments high availability in the presence of VCS failures. FIG. 43F shows that on restoration of connections to VAS1 and VAS2, the VCS consolidates the out of synch region information recorded in the DRL's and synchronizes these regions between SE1 and SE2. FIG. 43G shows that upon completion of the synchronization, the full mirror service is restored to V1, the DRL is cleared, and the reservation key is set back to READ ANY.

A system, method, and architecture has been described for managing one or more data storage networks at a middle-Layer level and for managing failure. Method may be performed by Program Logic shown in FIG. 36 for any of the methods described above. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A system for protecting against failures in a plurality of storage area networks including a plurality of data storage volumes and one or more hosts, wherein the volumes are in a switched storage network in the storage area networks, the system comprising:
one or more processors in communication with switching capability for the switched storage network, wherein the one or more processors include program logic for carrying out failure protection by virtualizing data storage volumes and providing more than one virtualization service that can be related to each virtualized data storage volume, so that in the event of a failure of virtualization service, another virtualization service can substitute for the failed virtualization service and virtualized data storage volumes may be associated with the substituted virtualization service; wherein the more than one virtualization services enable virtual Storage Area Networks (SAN)s by parsing between front-end SANs and back-end SANs regardless of physical configuration of the SANs, to enable mapping from virtual volumes to back-end storage elements across virtual SANs.

2. The system of claim 1, wherein a substituted virtualization service is located on a different processor than the processor having the failed virtualization service.

3. The system of claim 1, wherein a minor volume that is a copy of the virtualized data storage volume and in the event that the virtualized data storage volume is not available, the minor volume can be substituted for the virtualized data storage volume.

4. The system of claim 3, wherein the mirror volume is associated with the substitute virtualization service in the event of the failed virtualization service.

5. The system of claim 2, wherein a minor volume is a copy of the virtualized data storage volume and in the event that the virtualized data storage volume is not available, the mirror volume can be substituted for the virtualized data storage volume.

6. The system of claim 5, wherein the minor volume is associated with the substitute virtualization service in the event of the failed virtualization service.

7. The system of claim 1, wherein the data is further protected by using RAID protection.

8. The system of claim 7, wherein a substituted virtualization service is located on a different processor than the processor having the failed virtualization service.

9. The system of claim 7, wherein a mirror volume is a copy of the virtualized data storage volume and in the event that the virtualized data storage volume is not available, the minor volume can be substituted for the virtualized data storage volume.

10. The system of claim 9, wherein the minor volume is associated with the substitute virtualization service in the event of the failed virtualization service.

11. A method for protecting against in a plurality of storage area networks including a plurality of data storage volumes and one or more hosts, wherein the volumes are in a switched storage network in the storage area networks wherein the switched storage network includes one or more processors in the switched storage network that include program logic capable of carrying out steps of the method comprising:
carrying out failure protection by virtualizing data storage volumes and providing more than one virtualization service that can be related to each virtualized data storage volume, so that, in the event of a failure of virtualization service, another virtualization service can substitute for the failed virtualization service and virtualized data storage volumes may be associated with the substituted virtualization service; wherein the more than one virtualization services enable virtual Storage Area Networks (SAN)s by parsing between front-end SANs and back-end SANs regardless of physical configuration of the SANs, to enable mapping from virtual volumes to back-end storage elements across virtual SANs.

12. The method of claim 11, wherein a substituted virtualization service is located on a different processor than the processor having the failed virtualization service.

13. The method of claim 11, wherein a mirror volume is a copy of the virtualized data storage volume and in the event that the virtualized data storage volume is not available, the mirror volume can be substituted for the virtualized data storage volume.

14. The method of claim 13, wherein the mirror volume is associated with the substitute virtualization service in the event of the failed virtualization service.

15. The method of claim 12, wherein a mirror volume is a copy of the virtualized data storage volume and in the event that the virtualized data storage volume is not available, the mirror volume can be substituted for the virtualized data storage volume.

16. The method of claim 15, wherein the mirror volume is associated with the substitute virtualization service in the event of the failed virtualization service.

17. The method of claim 11, wherein the data is further protected by using RAID protection.

18. A computer program product comprising:
a non-transitory computer readable medium encoded with computer executable program code for protecting against in a plurality of storage area networks including a plurality of data storage volumes and one or more hosts, wherein the volumes are in a switched storage network and wherein the storage area network includes one or more processors, the code enabling:
carrying out failure protection by virtualizing data storage volumes and providing more than one virtualization service that can be related to each virtualized data storage volume, so that, in the event of a failure of virtualization service, another virtualization service can substitute for the failed virtualization service and virtualized data storage volumes may be associated with the substituted virtualization service; wherein the more than one virtualization services enable virtual Storage Area Networks (SAN)s by parsing between front-end SANs and back-end SANs regardless of physical configuration of the SANs, to enable mapping from virtual volumes to back-end storage elements across virtual SANs.

19. The computer program product of claim 18, wherein a substituted virtualization service is located on a different processor than the processor having the failed virtualization service.

20. The computer program product of claim 18, wherein a mirror volume that is a copy of the virtualized data storage volume and in the event that the virtualized data storage is not available, the mirror volume can be substituted for the virtualized data storage volume.

* * * * *